Inventor:
Robert L. Rude.

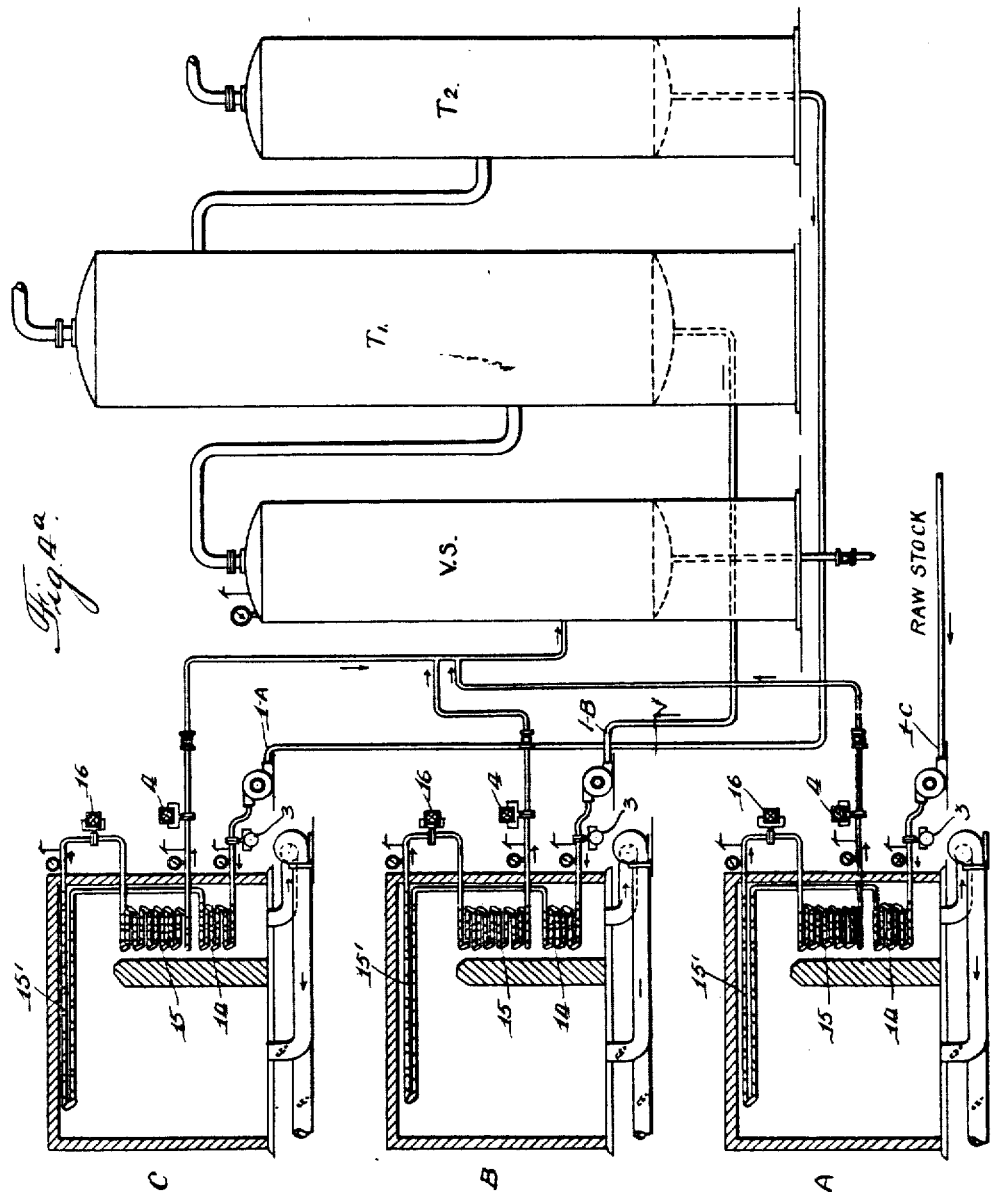

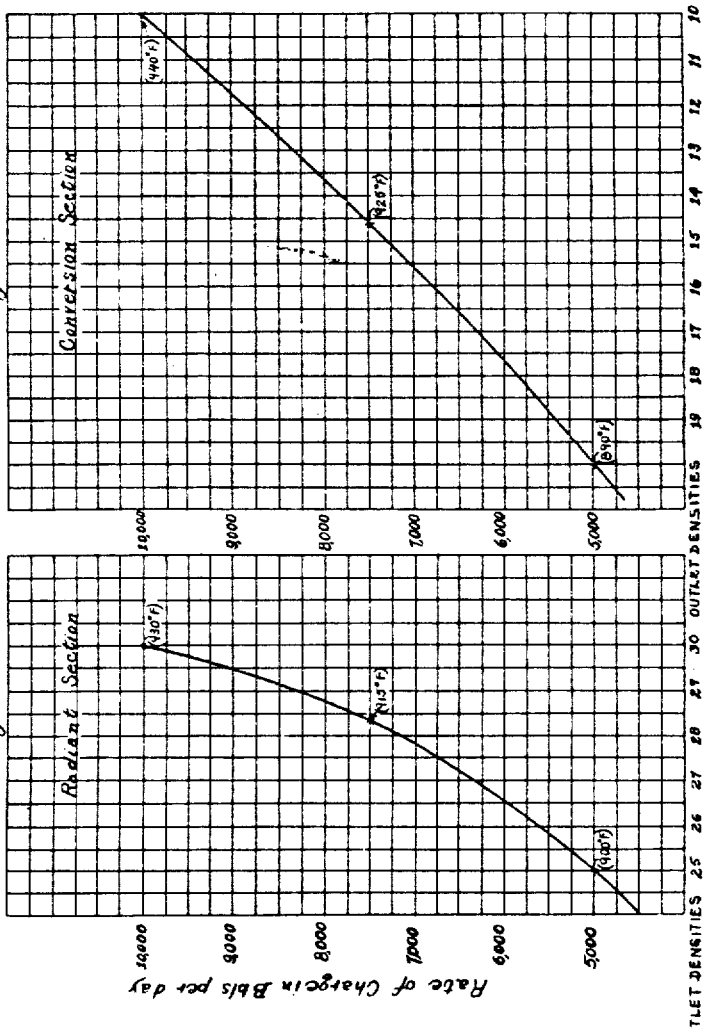

Oct. 8, 1940.                          R. L. RUDE                        2,217,634
  ART OF PROCESSING FLOWING FLUIDS OR MATERIALS WHICH ARE CAUSED
              TO PASS THROUGH A PROCESSING ZONE
                      Filed July 9, 1937            18 Sheets-Sheet 17

Inventor
Robert L. Rude.
By Ames, Phinn, Olson & Micklehurgen
Attys.

Oct. 8, 1940.   R. L. RUDE   2,217,634
ART OF PROCESSING FLOWING FLUIDS OR MATERIALS WHICH ARE CAUSED
TO PASS THROUGH A PROCESSING ZONE
Filed July 9, 1937   18 Sheets-Sheet 18

Inventor
Robert L. Rude.
By Ams, Theen, Olsen & Mecklenburger.
Attys.

Patented Oct. 8, 1940

2,217,634

UNITED STATES PATENT OFFICE 2,217,634

ART OF PROCESSING FLOWING FLUIDS OR MATERIALS WHICH ARE CAUSED TO PASS THROUGH A PROCESSING ZONE

Robert L. Rude, Toronto, Ontario, Canada, assignor to The British American Oil Company, Limited, Toronto, Ontario, Canada, a corporation of Canada Application July 9, 1937, Serial No. 152,860

47 Claims. (Cl. 122—448)

This application is a continuation in part of an application previously filed on December 1, 1933, by Robert L. Rude and identified as Serial No. 700,485.

This invention relates to the art of determining the state or properties of, and the art of, processing flowable materials, flowing fluids (such as liquids), gases (including vapor), or mixtures thereof, regardless of the state of the material or materials from which the flowing medium may have been derived, and has particular relation to the ascertainment of certain variables in such flowing fluids and the control of the processing of the fluid as based on those variables.

There are a number of factors arising during the processing of fluids which may either be measured in absolute figures or which, without such absolute figure determination, may be used as a basis for control. Such control may be either manual, in response to an observation of such variations, and the correlation of the same on a mathematical device such as a chart or graph, or the variations themselves may, either with or without translation into absolute figures, effect certain control elements to carry out the processing in accordance with a predetermined method. Such method may, for instance, be outlined as a result of what is known in the art as the "exploration" of a system with the ascertainment for certain conditions of certain figures, wherefrom, as the latter figures vary, the processing is concordantly modified in accordance therewith.

One aspect of the invention, therefore, may be said to relate to the art of measuring and/or controlling the magnitude of a variable quantity, condition, relation, etc., and particularly such a variable condition as, for instance, the density of a fluid or material under treatment, although it is to be understood that the variable might be temperature, pressure, or any physical, chemical, electrical, hydraulic, thermal, or other characteristics. The variation in the flowing fluid under treatment may be epitomized as a "condition" change and, for the purpose of this application, it will be understood that a condition change may be either a physical or chemical change, or both, and that the methods hereinafter outlined and the apparatus specified is designed to be effective for all such conditions.

"Condition change" refers to a change in the character or quality or condition of a fluid or material as distinguished from a quantity change such as rate of flow, or change in a position as, for instance, movement of the fluid from one tank to another. Moreover, whenever herein the word "treating" or "treatment" is used, it is to be understood that any acting upon or in connection with a fluid or material is intended; a fluid or material is treated when it is heated, when it undergoes chemical change, when two or more varying-characteristic fluids or materials are brought together, when a fluid or material is electrolyzed, or when its degree of ionization is changed, as for instance by dilution, change of temperature, etc., and, in general, when anything is done in connection with a fluid is qualitative as distinguished from quantitative, the terms "qualitative" and "quantitative" being employed in the sense in which they are used in the flow-metering art. Again, the term "process" as employed in the specification and the appended claims may be understood to include any change in the properties of a system and, if such process is one which is roughly called "chemical," it may be called a reaction or chemical "process."

It will be noted that the term "fluid or material" has frequently been employed above; such alternative term has been deliberately used because, while the invention is first described in connection with a fluid, nevertheless the hereinafter described ssytems may be adapted to operate even though the entering material is a solid which is processed, or with respect to which it is desired to measure certain incidents or control certain results. Or, a solid and a fluid may enter a zone and be withdrawn therefrom; or a solid and gas; or a solid, a liquid and a gas. All such processes are within the scope of the present invention; the ability to determine in situ the value of a variable having a functional relation to weight rate and density of a flowable material emerging from a certain zone (whether said flowable material is a true fluid, or a suspension of a solid in a fluid or the like), coupled with a knowledge of the material or materials which entered said zone, are the only necessary elements to insure advantageous application of the herein described invention.

These terms "qualitative" and "quantitative" have reference to the broadest meaning thereof when used in connection with a definition of what is meant by "condition change"; for instance, the addition or subtraction of heat from a fluid may merely cause it to expand or contract in size per unit of weight, but this change is nevertheless considered as qualitative rather than quantitative. Similarly, passage of electrical current from one electrode to another immersed in a fluid is considered to effect a qualitative change therein within this disclosure; in short, any phenomena in a flowing fluid which so evidences itself as to be measured in the manner herein disclosed or in connection with a density determination is deemed to be a "condition change."

From the above it will be seen that a condition change, within the purview of this application, is one which results in a density manifestation. If it is desired that control be exercised when the density changes, the invention here described may be expeditiously applied to that end. It must not, however, be overlooked that this invention will find desirable applicability in many systems wherein a constant density of the fluid may be the desideratum.

Having in mind the aforesaid definitions, it will be seen that condition changes may occur as a result of several different operations. For instance, considering the change in density which occurs in the flowing fluid, such change may be the result of the heating of the fluid, or of an alteration in the chemical composition of the fluid without heat being imparted thereto, or of an expansion or contraction of the fluid while flowing through a treating zone, for instance by changing the volume per unit lineal distance of the space in which the fluid is travelling, or a combination of these effects may cause changes in the density of a flowing fluid with consequent production of a variable which may be used as a basis for fluid processing control. It should not, of course, be overlooked that similar differing conditions may also result in variations in temperature, pressure, and the other factors hereinbefore set forth. Moreover, a temperature change may ocur in a fluid entirely because of internal action and without any external subtraction or addition of heat, i. e., as a result of chemical action, change in pressure, or the like.

Accordingly, the invention is hereinafter described as applied to the control of certain processes when the fluid being processed undergoes a density change.

While the invention is illustrated to show its application to a system wherein the fluid being treated does in fact undergo a change in density, the change being employed as a method of control thereover, it is apparent that the invention may also be employed for the purpose of ascertaining if, as, and when a density change does occur, whether or not this fact is subsequently employed to control the processing of the fluid, or to indicate the end of the treatment or even to indicate that a dangerous condition has arisen in the flowing fluid. In other words, it may be employed for analytical purposes merely (and not as a factor in control) i. e., solely for the purpose of determining whether or not the system is in fact undergoing a "condition change." Thus it may be employed to determine the maximum amount of energy which can be introduced into flowing fluid to produce a certain desired effect without also producing a density change, as where the product of the treatment should have the same density as the materials undergoing treatment and the undesired by-products of the reaction should have a different density. In such a system the desired product would be formed while the system is undergoing treatment without any change in density. However, when the reaction proceeds too far, and the by-product reaction becomes appreciable, the system as a whole exhibits a changed density which may or may not be employed to actuate control apparatus.

Another important and practical application of the invention which readily suggests itself is in the transportation of fluids through conduits, which fluids occasionally decompose spontaneously to produce dangerous conditions. Thus, in the transportation of nitroglycerin, as such, or in the form of emulsions, through conduits, the density of the flowing fluid will remain substantially constant as long as no incipient decomposition of the material takes place. If, however, decomposition of the fluid nitroglycerin occurs, a density change will take place in proportion to the extent of the change. This density change may then be used to open suitable valves, etc., to discharge the decomposing material into a "drowning" tank, and thus avert a disastrous explosion.

In the last example, the normal condition of the fluid is one wherein substantially no density change should occur, and the abnormal or dangerous condition which is coincident with a density change is automatically indicated by the apparatus, and proper precautions are automatically taken to avert disaster.

Thus the discovery of the aforesaid practical method of an instant-to-instant determination of the density of a flowing fluid, as compared to the heretofore necessity of depending upon sample determination of this value, may be used to assure safety and preservation of human life—a desideratum of utmost importance—one cannot "take samples" while nitroglycerin is dangerously decomposing.

Still another field in which the invention may be used is in the ascertainment of certain values not heretofore ascertainable because of the limitations of the available methods of measurement. For instance, the herein described novel method of ascertaining density by the use of observations made at two points along the path of a flowing fluid stream permits the ascertainment of such values and the subsequent preparation of tables in ranges of temperatures, pressures and other figures entirely beyond the ranges within which it was previously possible to ascertain values. Accordingly, the invention will find ready use in the exploration of the conditions existing in fluids in the aforesaid heretofore unexplored ranges not only in checking the accuracy of the presumed values listed in many tables, which values because of the limitations of the methods heretofore employed to ascertain the same are in many cases approximations, but will also permit the extension and amplification of the present tables and values.

Anyone skilled in the chemical arts will readily appreciate that practically any continuous chemical process which operates in a liquid or vapor or mixed liquid-vapor phase can be subjected to control by means of my invention.

It is therefore apparent that this invention is useful not only for the purpose of control as, for example, in changing the rate of heat input, or increasing the amount of refrigerant supplied to remove the heat from the exothermic reaction, but as indicated above, it is also applicable to systems which normally undergo no change in density for the purpose of warning the operator that a density change—which in a given instance may indicate danger—has occurred in the flowing fluid. It is also applicable not only where an operation is performed on the flowing fluid according as a density change occurs therein, but also it may be employed solely for analytical purposes, in order to determine one of the properties of the flowing fluid itself undergoing experimental study. Just as a thermometer can be used either for the purpose of determining when an operation should be performed or solely for the purpose of ascertaining a property of a system, so the present invention is applicable to any flowing fluid for purposes which vary, depending upon the object of the operation which is performed thereupon. The apparatus and process disclosed is therefore a most useful tool which the process engineer may have at his disposal since, in effect, it practically opens up a new field of investigation, and in a very real sense permits the dynamic study of systems which undergo change. In other words, the process and apparatus disclosed renders it possible for the engineer to study a system in four dimensions.

While, as stated, the fluid being processed may be either liquid or vapor or a mixture of the two and the processing may comprise an alteration in the flowing fluid by application of heat, modification of chemical composition, changes in unit volume, etc., it is practical here to illustrate the invention in connection with the art of converting hydrocarbons, and accordingly the system shown is one in which gasoline is produced from hydrocarbon charging stock. The use of hydrocarbon processing as illustrative is particularly convenient because, in connection with such a field, the hereinafter-described invention is directed to the utilization of factors, which have not heretofore been appreciated, in the control of certain essential operations during such conversion. Since the cracking of hydrocarbon embodies both physical and chemical change, the processing thereof forms a desirable vehicle or medium in connection with which to describe the discovery of a method of ascertaining desirable indicating values and additionally the method of utilizing such obtained values, either when determined absolutely or when merely used as bases for control, in the processing of such fluid, neither of which methods is effected by the composition of the fluid under treatment, because it must always be remembered that the invention is not limited to the control of any particular fluid; all fluids undergoing a physical and/or chemical change resulting in, caused by, or accompanied with a variation in density can be processed within the scope of the present invention.

For this purpose the invention is described in connection with the utiliaztion of variations in density—of a hydrocarbon undergoing conversion—to control the conversion of such hydrocarbon at continuously substantially optimum conditions. However, it cannot be too emphatically stated that the illustration in connection with the conversion of petroleum is only illustrative and not limiting. The variations in petroleum undergoing conversion find their counterparts in many other liquid processing variations, but it is not thought necessary to indicate the herein claimed method as individually applied in the processing of other fluids because the method generally is sufficiently hereinafter outlined that those skilled in the art may readily apply the teaching thereof in the processing of all flowing fluids which exhibit equivalent variations in their different attributes during similar processing.

Accordingly, for convenience, the invention will be described as above indicated as applied to the processing of a hydrocarbon. An improved method will be described whereby the heating and cracking conditions in the heating elements of the cracking furnace can be definitely and positively controlled so as to obtain and maintain optimum efficiency in cracking conditions. Furthermore, in view of the illustration here used, the invention is shown as applicable to a furnace of the radiant and convection type in which the oil to be treated is rapidly heated in the radiant section to raise it to its cracking temperature and in which the ultimate amount of cracking to be obtained is procured in the convection section. The invention, however, is not limited to a furnace of the radiant and convection type since it can likewise be used with beneficial results with any type of furnace construction.

By means of the method herein described, it is possible so to regulate the heating in the radiant section that substantially optimum conditions of heat input, depending upon the construction of the furnace, can be obtained in this section without encountering carbon troubles or exceeding the allowable stresses of the material.

The control of the radiant section is such that the heat input will be subtsantially the optimum and will be held at this optimum by definitely controlling the density and temperature of the hydrocarbon in said radiant section.

The amount of cracking obtained in the convection section is definitely controlled by this improved method, by virtue of density readings which will acquaint the operator at all times during the operation with the amount of conversion which is going on in this section.

Accordingly, by utilizing this method in a cracking furnace, the amount of cracking and heat input during the cracking operation can be controlled at all times so as to avoid excessive cracking or heat input as well as insufficient cracking or heat input in the respective parts of the heating elements. In other words, this method insures the maintenance of optimum heat input and cracking conditions throughout the furnace.

In order properly to appreciate the possibilities inherent in the use of density as hereinbefore suggested in the control of fluid processing, it must be initially understood that it is not possible merely to take samples at selected points from a flowing fluid stream undergoing condition change and, following a determination of the gravities, densities or specific volumes (as the case may be) of such samples, to utilize such determinations as a basis of control. The invention herein, therefore, does not relate to any method wherein cold specific gravities, densities or specific volumes are used in the control of an operation of a fluid treating system or of the operation of the illustrative system disclosed herein, i. e., a modern cracking plant. Cold specific gravities and related physical properties are of no value in practical control because it is impossible to arrive at the time of detention and/or treatment from such properties. Inasmuch as time of treatment is a vital factor in processing, the shortcomings of "cold sampling" should be immediately understood because in many of its aspects applicant's method of control is based directly on the co-ordination of time of treatment with temperature of treatment.

The literature has recognized the failure of the industry to provide a method whereby such co-ordination may be obtained. The article entitled "Application of physical data to high pressure processes" by W. K. Lewis of the Massachusetts Institute of Technology and beginning on page 257 of the February, 1936, issue of Industrial and Engineering Chemistry, demonstrates the contribution which applicant's process has made in those industries which are called upon to determine the condition changes which fluids under treatment are undergoing.

The article emphasizes that the use of high pressure conditions has upset entirely the former assumption that the perfect gas laws may be applied to determine the influence of pressure on chemical and physical equilibria in general. Accordingly, the density determinations of a flowing fluid as proposed by applicant are of definite value because they enable one to make satisfactory correlations of data available for engineering use. Again, it is emphasized that whereas the illustrative examples discussed in the present application emphasize the outstanding value of its availability, so far as petroleum processing is concerned, such disclosure is only an example of the use to which such density determinations may be generally applied. Particularly in connection with the aforeidentified Lewis article, it will be realized that the examples mentioned therein, namely, oil conversion processes and the process of synthetizing ammonia under elevated temperature and pressure, are among those wherein the broad invention disclosed by applicant herein finds ready application.

Reverting now to the inadequacy of the so-called "cold" or sample determinations to solve the problem as has been solved by applicant; in short, the discussion of why physical properties obtained by withdrawing and measuring samples cannot be utilized in control. Such "cold" sample figures are primarily inaccurate because they are not taken at the time during which the actual condition change is occurring, i. e., because the density of a flowing stream is not measured and therefore in no case can such cold sample figures be utilized to calculate time of detention and/or treatment.

The figures obtained from cold sampling and the trend thereof are moreover in themselves likely to be inaccurate; in fact, the difference in the value of such sample gravities, densities or specific volumes is so small, although quite a material change occurs in the condition of the material in the apparatus, that no practical use can be made of the physical properties obtained by sampling even though they were characteristic of the conditions existing. As illustrative of this latter proposition, an example may be cited (which for the sake of clarity expresses the figures in round numbers) to demonstrate that, with a given fluid under treatment and at the same rate of charge to the treating zone in each case, there would be a yield of 15% per pass with an outlet density of three pounds per cubic foot, two hundred pounds pressure, and 930° temperature. The example given and the figures used are in connection with a test made on a certain petroleum treating apparatus hereinafter more fully described; but the figures derivable from the operation of such apparatus are illustrative only because the same inadequacy exists in cold sampling a fluid undergoing condition change in any of the other industries referred to herein or in connection with any of the other condition changes which are mentioned.

Another set of conditions, where the yield is still 15% per pass, showed an outlet density of 10 pounds per cubic foot, 400 pounds pressure, and 920 degrees temperature, and a third set of conditions, at the same yield per pass, showed an outlet density of 19 pounds per cubic foot, 600 pounds pressure, and 910° temperature. Inasmuch as there is the same yield per pass in all three of these cases, one would expect very close agreement in the densities as arrived at by sampling the stream in each case when determining the same property at atmospheric temperature and pressure.

In the aforesaid discussion, the data used was collected during certain tests which were conducted at the same yield per pass but with varying pressures and temperatures resulting in marked differences in densities of the flowing stream of approximately the same order of magnitude as assumed in the illustrations above. Thereafter, a series of tests were conducted to check these facts and wherein the pressure, temperature, rate of charge, and density values occuring during the aforesaid operation were carefully recorded.

Fig. 1 of the drawings shows a curve sheet on which both the flowing stream (the upper three curves) and cold determined (the lower curves) densities are plotted. These demonstrate graphically the order of magnitude of the changes in density determined by cold sampling as compared with changes in density determined by measuring this factor in the flowing stream.

A tabulation of densities indicating the conditions in the refinery of applicant's assignee, and from which the curves of Fig. 1 are plotted, is set forth below, and it will be noted that the flowing condition densities, which are the true densities of the fluid that must be measured in order to have an accurate basis for control, vary in different proportion and amount from the same properties determined at atmospheric conditions:

*Tabulation of gravities and densities*

|  | Sample at atmospheric conditions | | | Flowing conditions | | |
|---|---|---|---|---|---|---|
|  | A. P. I. gr. | Sp. gr. | Density #/cu. ft. | Density #/cu. ft. | Temp. | Pressure |
| *No. 1 test* | | | | | | |
| Furnace charge | 12.7 | .982 | 61.2 | 49.2 | 630 | 460 |
| Conversion sec. inlet | 12.4 | .983 | 61.25 | 27.3 | 903 | |
| Conversion sec. outlet | 13.4 | .977 | 60.9 | 8.3 | 923 | 320 |
| *No. 2 test* | | | | | | |
| Furnace charge | 11.6 | .989 | 61.6 | 49.85 | 630 | 490 |
| Conversion sec. inlet | 11.0 | .9935 | 61.9 | 22.1 | 920 | |
| Conversion sec. outlet | 10.7 | .9955 | 62.0 | 6.6 | 940 | 320 |
| *No. 3 test* | | | | | | |
| Furnace charge | 12.0 | .979 | 61.0 | 49.2 | 627 | 445 |
| Conversion sec. inlet | 14.0 | .973 | 60.6 | 29.5 | 888 | |
| Conversion sec. outlet | 13.7 | .975 | 60.8 | 12.0 | 912 | 320 |

These figures demonstrate the impossibility of utilizing the "cold" or "determination by-sample" densities as a basis for control purposes in processes wherein the difficulties outlined in the Lewis article are so definitely and admittedly still being daily encountered.

The fundamental reason that applicant can effect the control he does resides in the fact that applicant determines the density of a flowing fluid stream. Throughout this application, for convenience and simplicity, the ascertainment of the density of a flowing fluid stream has been referred to; it will nevertheless be understood that the reciprocal of density, i. e., specific volume, may be ascertained and may as readily be used in all of the various modifications which are described herein. This can be done by applying one or more of the principles specified by applicant. Applicant's process includes as a novel conception the measurement of the density in a flowing fluid stream wherein the fluid passes through the metering elements and wherein the measurements which are used to determine the density are made while the fluid is in the form of a flowing stream. It is emphasized that in processes where a change of condition occurs in a flowing fluid it is essential that the density of the flowing fluid be taken during the time such condition change is occurring or immediately after the change, and that one cannot wait until a withdrawn sample has cooled and then measure the same at atmospheric pressure even though such a withdrawn sample could give a correct determination of conditions existing in the flowing stream, which it obviously cannot, as clearly demonstrated in Fig. 1.

The results of the above tests conclusively demonstrate that the worker who endeavors to utilize cold sampling as a basis for his research is stumbling up a "blind alley." Not until the heretofore unrevealed method of "flowing fluid density determination" was proposed was a proper research basis available. Therefore no previous worker who did nothing more than take cold samples, even though he may have expressed a "hope" that some day someone would measure flowing stream density in situ, has contributed anything to the proposal made herein. The expression of such a hope and the admitted failure of the art to teach a fulfillment thereof may, for instance, be found in a bulletin by Dean et al., entitled "Production of gasoline by cracking heavier oils" (Technical Paper No. 258, Dept. of Interior, Bureau of Mines, Government Printing Office, 1922).

The outstanding value of the just-referred-to ability to determine time of treatment may be exemplified, again for purposes of illustration only, in connection with a hydrocarbon treating apparatus in which it has long been recognized that optimum conversion per pass cannot be properly maintained unless one has available some control factor in addition to, or in place of, temperature, pressure and rate of charge.

The present specification illustrates the application of the herein described invention as attaining this object by controlling the cracking operation and conditions through the utilization of the density of the hydrocarbons while in process of treatment. Therefore, when temperature and pressure readings are augmented by a density reading as herein disclosed, one can readily obtain optimum conversion per pass by changing the relative amount of flue gas recirculation, excess air used, etc.

Having determined that the aforesaid density can be utilized to effect control of the cracking operations, it is further necessary to determine at what points in a cracking or conversion process the densities are of sufficiently definite character and sufficiently responsive to operating conditions as to be utilizable for effecting the aforesaid control.

For the purpose of clarifying the application of the discovery herein described and claimed, it will be of advantage to explain what is meant by the term "optimum" operating conditions as herein referred to. It is understood that optimum operating conditions may be dictated by the locality of the plant to which this density equipment is applied, or the marketing conditions of that locality, or the charging stock of that locality, or the extent to which it is desirable to treat the fluid. For example, it might be desirable to carry the decomposition of a hydrocarbon to a sufficient degree to produce the highest practical yield of anti-knock motor fuel, irrespective of the uncondensable gas produced and the shortness of the stream days per cycle. However, in another installation, it might be more desirable to operate to obtain the highest possible recovery of gasoline boiling fractions in a specified period of continuous operation of that particular cracking equipment and on the particular charging stock available.

Before going into the particular manner in which the aforesaid invention may be practiced, it is convenient here to discuss the reasons which have been discovered why control in response to density indication within the cracking unit results in the maintenance of the cracking unit continuously at optimum operation and, further, why the density indication which has been found utilizable to this end is an accurate and understandable instant-to-instant measure of the conditions within the tubes themselves.

The density figures permit an accurate determination of the time factor, and this in turn permits the control of the cracking reaction in response to definite density figures, temperatures, pressures, etc., remembering, of course, that the density figures are a means of arriving at and maintaining the optimum conversion per pass which is then utilized for control purposes. From the above it will be gathered that one of the greatest handicaps in the operation of cracking equipment today is the lack of knowledge of the extent of density change in the oil during the process of treatment and particularly when the oil, as in cracking, undergoes fundamental chemical changes rendering it impossible expeditiously to ascertain the composition of the material in the coil and consequently making it impossible to measure the degree of conversion. This invention accordingly includes the appreciation that those density changes, being direct indications of the extent to which the reaction has been carried, may be utilized to determine the length of time to which the oil within the coil has been subjected to treatment.

An example of how the time of cracking in the conversion section may be calculated from the measured densities of the flowing stream at the inlet and outlet of the conversion section will be understood from the following example:

Assume:

| | |
|---|---|
| A tubular conversion section having a capacity of | 104 cubic feet |
| A throughput rate, as arrived at from the furnace charge meter, of | 28.1 lbs. per second |
| A conversion section inlet density of | 27.3 lbs. per cu. foot |
| A conversion section outlet density of | 8.3 lbs. per cu. foot |

From which the arithmetical mean density equals $$\frac{35.6}{2} = 17.8 \text{ lbs./c. f.}$$

Then from these conditions it is found that the mean cubic feet per second flow through the conversion section equals $$\frac{28.1}{17.8} = 1.58 \text{ cubic feet per second}$$

And therefore that the time of treatment equals $$\frac{104}{1.58} = 65.8 \text{ seconds}$$

Likewise, the velocity of flow in the aforesaid conversion section can be computed. Assuming that this section comprises two tubes in parallel, each of which is three inches internal diameter, the cross sectional area of the two tubes is equal to .098 square feet. The velocity and feet per second at the point of the arithmetic mean density in the conversion section is then equal to the mean cubic feet per second divided by the cross sectional area of the section, i. e., $$\frac{1.58}{.098} = 16.15 \text{ feet per second velocity}$$

In cracking there is a progressive change in the physical and/or chemical characteristics of the fluid under treatment after it has reached a cracking temperature, which said changes are responsible for the change in vapor pressure of the fluid under treatment at that particular point, and this change in characteristics of the fluid in process of treatment is reflected in the change in density of that particular point. It should be further here explained that density determination as used in commercial operation of the still in accordance with the herein disclosed invention is in no way dependent upon an analysis of the product existing at any point in the apparatus (such as might be required in determining rate of charge), or the determination of the molecular weights, or deviations from the perfect gas law, or whether or not the fluid exists as a vapor, liquid, or a vapor-liquid mixture.

As pointed out when the apparatus used in the practice of the invention is described, the above-noted progressive change in the characteristics of the fluid under treatment may, if desired, be utilized to determine a point in the conversion section where the mean density may be directly measured. It has heretofore been indicated that the invention outlined herein may be many times conveniently applied by first exploring the system with which it is to be used. Such exploration may be accomplished in many ways, the convenience of which is dependent upon the particular type of reaction system being investigated. The principle of the method to be followed may be outlined as follows: A series of flow meters is inserted at intervals along the path of the fluid in the reaction system. A sufficient number of meters is used to enable a plot of density against position in the system to be made with the necessary degree of precision. In other words, the function $d=f(x)$, is experimentally determined, where $d$ is density and $x$ is distance along the reaction system, assuming the system to be tubular, for the sake of simplicity. Having thus by exploration, in accordance with this inevntion, determined mean density (which may be defined mathematically as the mean of $f(x)$ over the length of the reaction system), time of detention may then be exactly determined as disclosed herein. After the mean density is determined in the foregoing manner, the meters introduced for the purpose of locating the mean density point within the system need not form a permanent part of the installation. The meters may be employed solely for the purpose of calibrating or exploring the system in cases where the actual time is of interest, and they may be removed after the desired information has been obtained. Thus, through exploration one may find that with a certain apparatus, the mean density point, or a point where the density is sufficiently representative of or substantially equal to the mean density for control purposes in the section, can be obtained by exploration, and the hereinafter described instrumentalities may be located at the thus determined point.

In the foregoing, or by any other convenient manner the point in the system where the existing in situ density is substantially equal to, or representative of the mean density of the fluid in the section under investigation, may be empirically established when desired.

Accordingly, it should be understood that either one of these methods is applicable dependent upon the conditions which are met with or ascertained to be present during the exploration of the system with which it is desired to use the invention. There may be some cases where the ascertainment of mean density will require a meter at both the inlet and outlet of the conversion section and, contrawise, there may be situations where one meter intermediate the ends of the section may be used. This feature is emphasized at this point because it would too greatly encumber this description to make, in connection with the various illustrations and drawings, an alternative showing in every case in connection with the ascertainment of mean density, and it must, therefore, be understood that the claims are to be interpreted to cover either of the situations just described.

The density of the material may vary between wide limits without any appreciable change in temperature. This is due to the fact that the heat input to the coil containing the hydrocarbon in process of conversion is absorbed in the cracking reaction and/or in latent heat and consequently, nothwithstanding the fact that heat units in large amounts may be absorbed by the oil, there may be no appreciable rise in the temperature of the hydrocarbon.

However, the absorption of these heat units by the heated hydrocarbon changes its physical and chemical condition and accordingly materially changes the density of the hydrocarbon in process of treatment. Thus, for example, a hydrocarbon which has a density of, say, 25 when it enters the conversion section at 920° may have a density of 12 when it leaves the conversion section at substantially the same temperature. In other words, there has been a change in the density of 100% with no appreciable change in temperature.

The understanding of optimum conversion per pass becomes increasingly more important as the complications in furnace design increase, as temperatures rise, as the use of a multiplicity of furnace coils are necessitated because of the requirement of economy in construction and in the treatment of selected charging stocks. Because of these complications the operator in charge of a cracking unit finds himself in a position as these complications multiply where his knowledge of what is occurring to the hydrocarbons in the coils is increasingly becoming more vague. Accordingly, it is highly essential that, with these complications in furnace design, means should be provided whereby the operator will be able to appreciate at all times what is occurring in the coil where latent heat is absorbed and cracking is occurring, in the same manner that he knows what is occurring in the coil where these reactions do not occur and where temperature is an absolute and true index.

In the foregoing the invention hereinafter broadly claimed has been discussed as it is applicable with advantage in the processing of fluid such as petroleum hydrocarbon, but it is to be understood that such discussion is illustrative only. However, petroleum is a desirable example in connection with which to discuss the invention because, as indicated, a hydrocarbon undergoing treatment may be converted either physically or chemically or both. At this point it is deemed proper, however, to emphasize that the use of the invention for the processing of petroleum is illustrative only and that all other flowing fluids,—which in their processing require the controls hereinafter described and which by reason of the condition changes therein produce such variations in certain calculations as to form bases for the control, are understood as coming within the scope of the present description.

Figure 1 is the coordinate chart necessarily heretofore referred to in discussing the inadequacy of cold sample determinations.

Figs. 2a, 2b, and 2c illustrate schematically some of the illustrative influences which may produce variations in certain functions of a flowing fluid, particularly emphasizing the manner in which density of the flowing fluid may vary and be utilized as a measure of condition change.

Fig. 3 is a schematic showing of the manner in which a flowing fluid may pass sequentially through a treating zone (shown for illustrative purposes only as a heating section) and another zone (here shown as the conversion section of the apparatus embodying the just-indicated heating section); this figure being similar to the showing in Fig. 2a with the addition that instruments are shown wherefrom mean density may be obtained.

Fig. 4a is a schematic showing of a petroleum cracking apparatus comprising three furnaces, each of which is supplied with a selected charging stock and in which the cracked products of synthetic crudes from a plurality of conversion sections are combined in a single vapor separator V. S. The "stocks" are considered, for purposes of illustration only and to exemplify the flexibility of the invention, as (1) a raw charge fed to furnace A, (2) a stock from the bottom of a first fractionating tower T₁ fed to furnace B, and (3) a stock segregated in the bottom of second tower T₂ (as the result of a side cut derived from the first tower) and fed to furnace C.

Fig. 4b is a curve in which rate of charge is plotted against densities empirically determined as being the optimum conditions for the operations of a radiant section of one of the furnaces shown in Fig. 4a, the temperature for the respective points on the curve being recorded thereon.

Fig. 4c is a curve in which rate of charge is plotted against densities empirically determined as being the conditions which will give optimum conversion per pass in the conversion section of one of the furnaces shown in Fig. 4a, the temperature for the respective points on the curve being recorded thereon.

Fig. 7a illustrates a modification of the manner of indicating and using as a control basis one of the functions the measurement and recordation of which is illustrated in Fig. 7.

Figure 6:
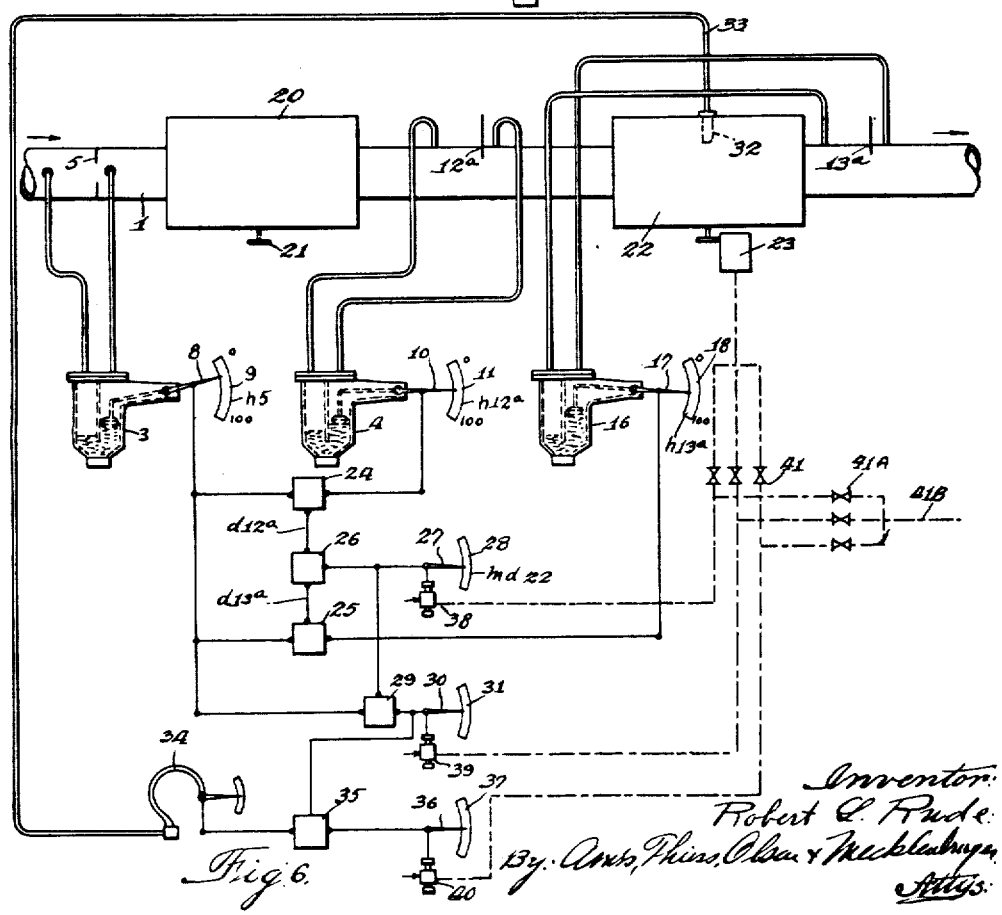
Fig. 6 is a further development of the showings of Figs. 1 to 5 inclusive, and indicates diagrammatically only the embodiment of the invention in connection with the control of the processing of a heated fluid stream.
Figure 7:
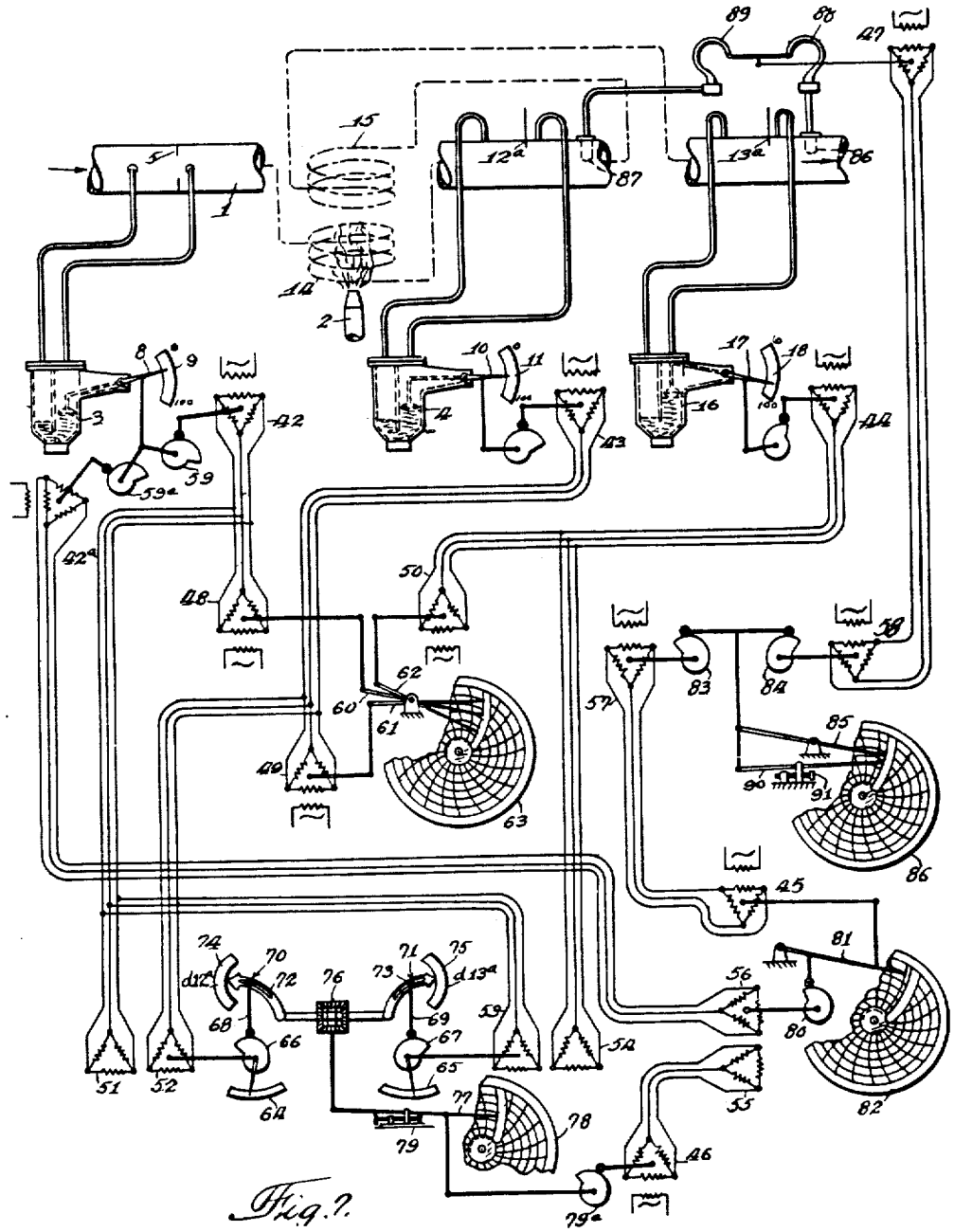
Fig. 7 is a detailed diagrammatic illustration including all of the measuring instrumentalities and indicating the manner in which they are correlated to record operating conditions.
Figure 8:
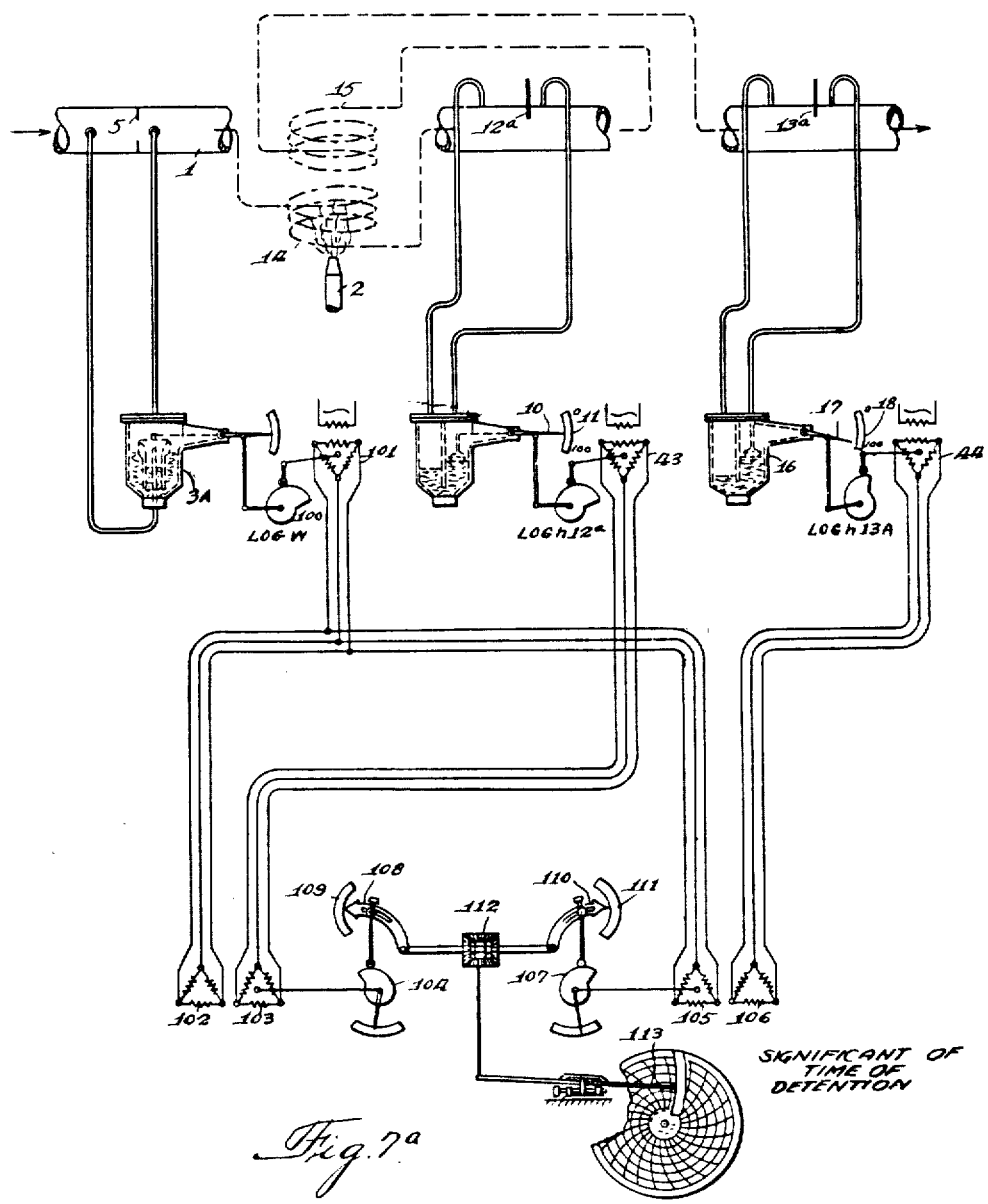

In order to avoid complication of the control showings because of the extensive intricacy which arises in connection with a showing thereof, additional figures are utilized to illustrate not so much the measuring instrumentalities, as for instance shown in Figs. 6, 7, and 7a, but rather to diagrammatically emphasize the flexibility of the control method which is possible in utilizing the herein discussed invention. Accordingly, Fig. 8 illustrates the manner of controlling the heating of a flowing fluid stream wherein the density in a conversion section dictates the temperature standard to be maintained at the inlet to the conversion section, and this showing contemplates the control of the heating by alteration of the amount of fuel feed or of the air admitted for combustion purposes. or both.

Figure 9:
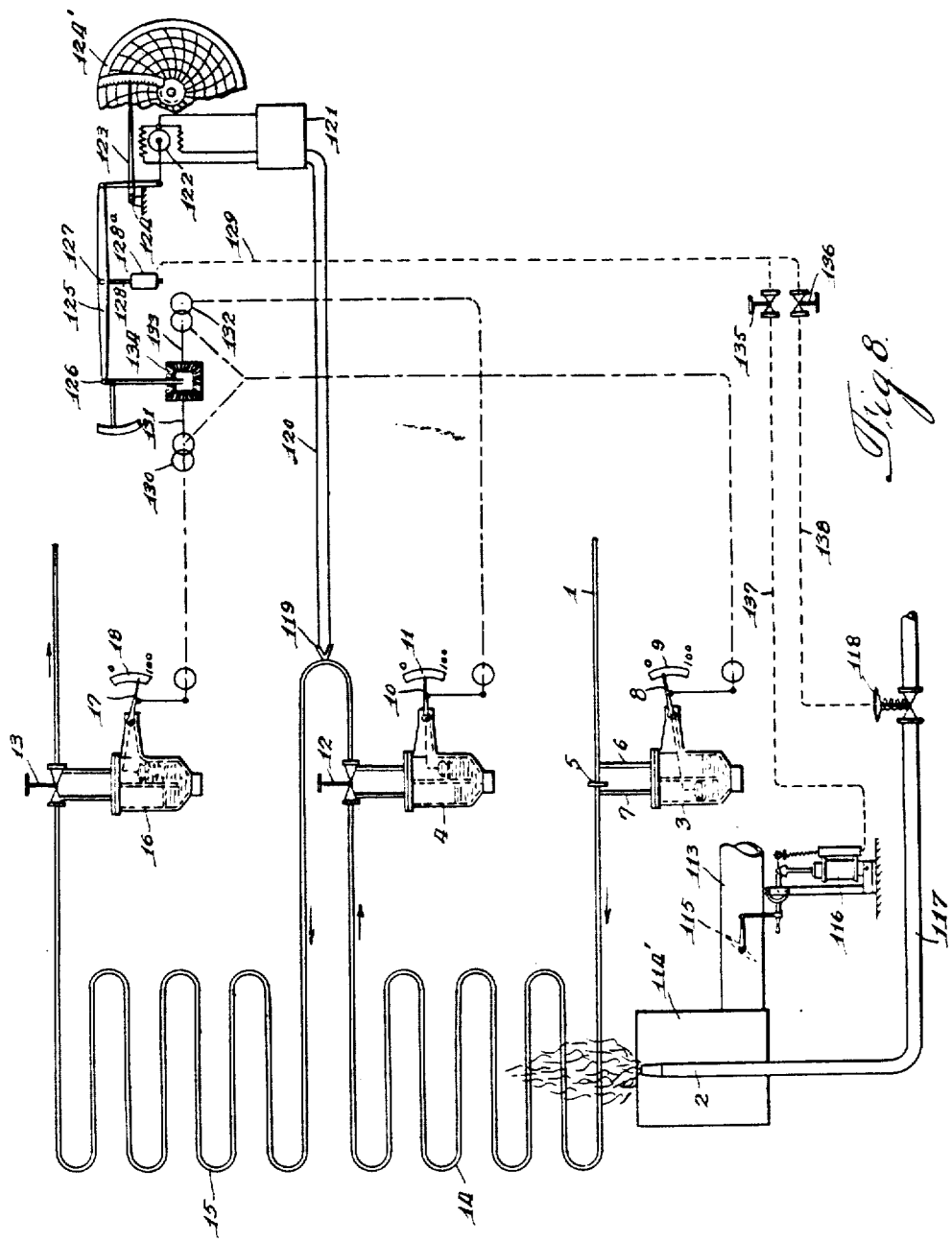

Fig. 9 is a showing of a system (here again, for illustration, only a cracking apparatus is shown) wherein the variable factors are utilized to control the recirculation of the products of combustion around the bridge wall in the furnace, it being understood, of course, that recirculation may be similarly varied in other apparatuses having an equivalent structure.

Figure 10:
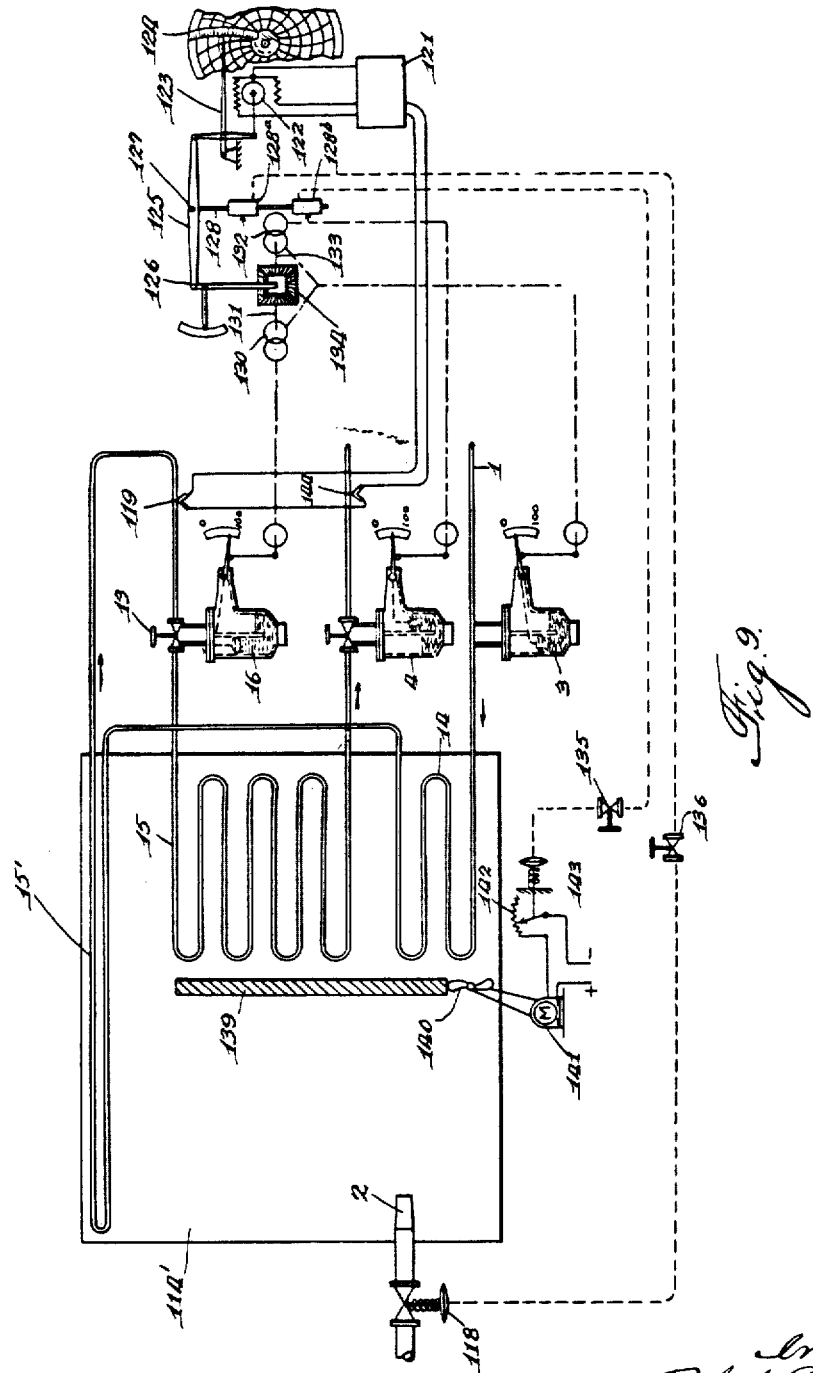

Fig. 10 illustrates a control system somewhat similar to that shown in Fig. 9, but in the latter figure the mean density is shown as measured by a single metering device, the latter being located at a point intermediate the ends of the conversion section as predetermined by preliminary exploration. This figure also illustrates an alternative control of firing. i. e.. fuel control or recirculation, or of utilization of the two simultaneously.

Figure 11:
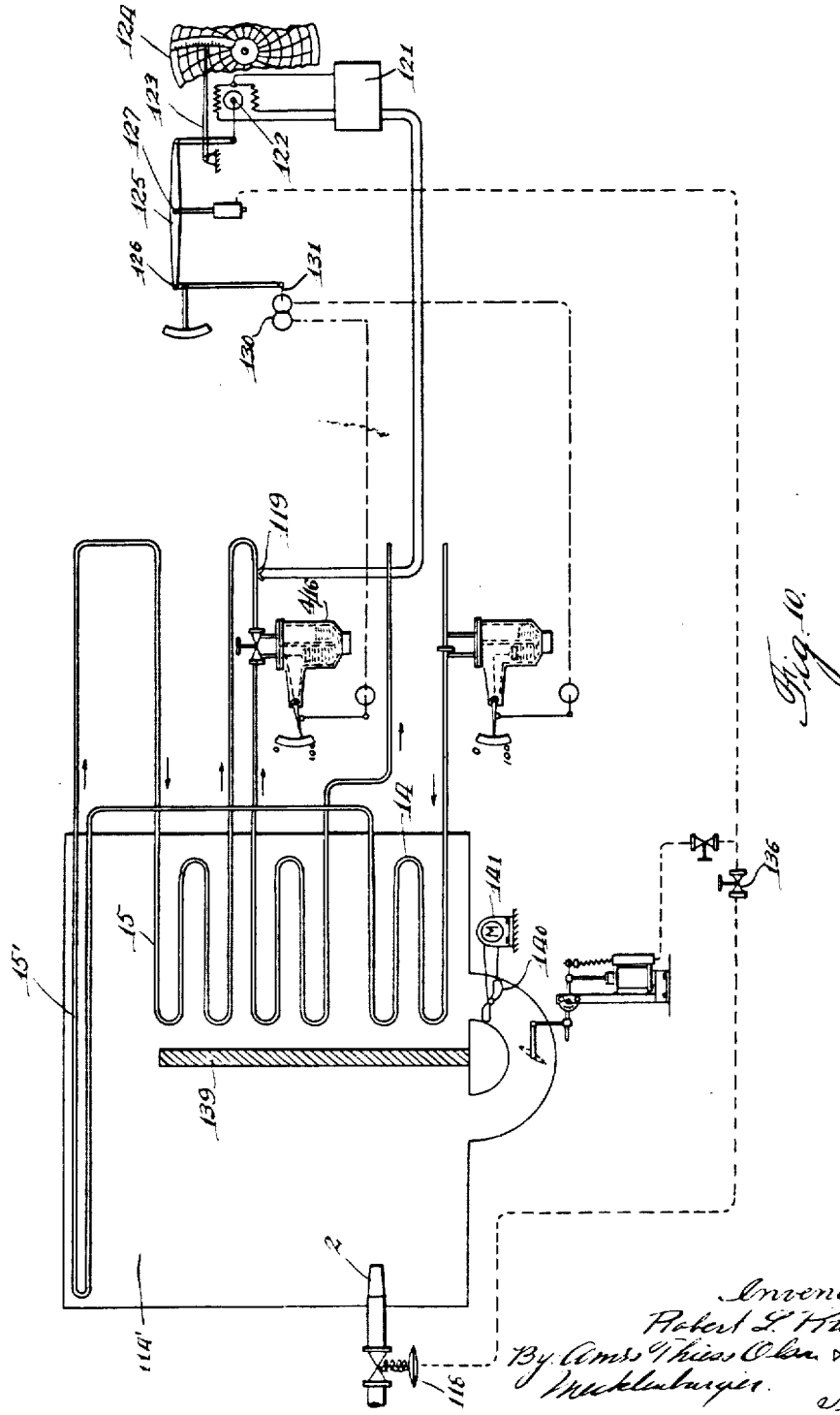

Fig. 11 illustrates a system wherein a reaction chamber is used and the controls are arranged to provide for the operating factors present when such a chamber is employed.

Fig. 11a is included to insure an understanding of the manner of operating the system of Fig. 11 when the reaction chamber is omitted.

Fig. 11b illustrates several curves wherein density in pounds per cubic foot is plotted against total heat in B. t. u.'s these being referred to in the discussion of the invention disclosed herein.

Figure 12:
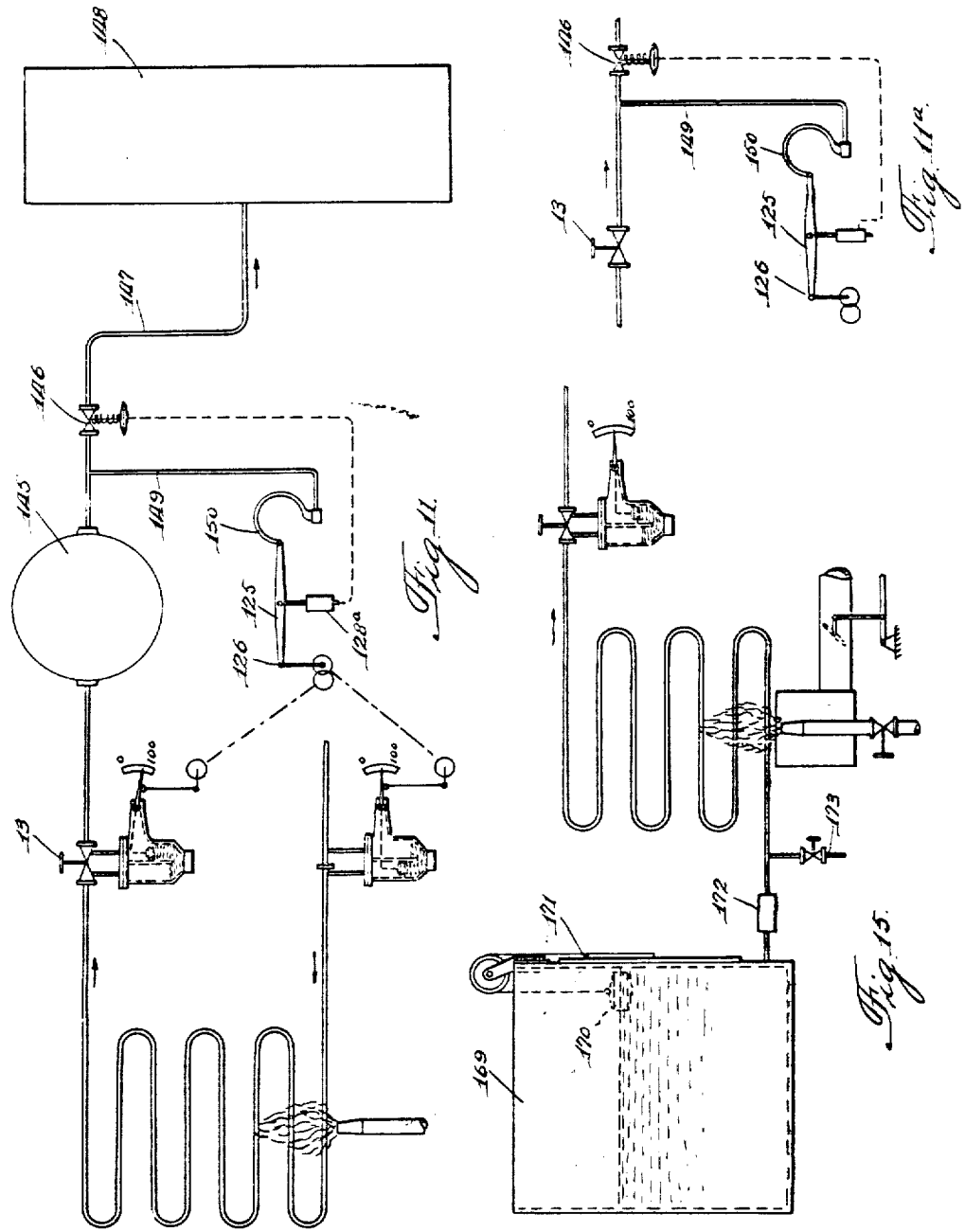

Fig. 12 illustrates the arrangement of the controls when it is desired to arrive at the time of detention and both to record such time of detention and to control in accordance therewith.

Figure 13:
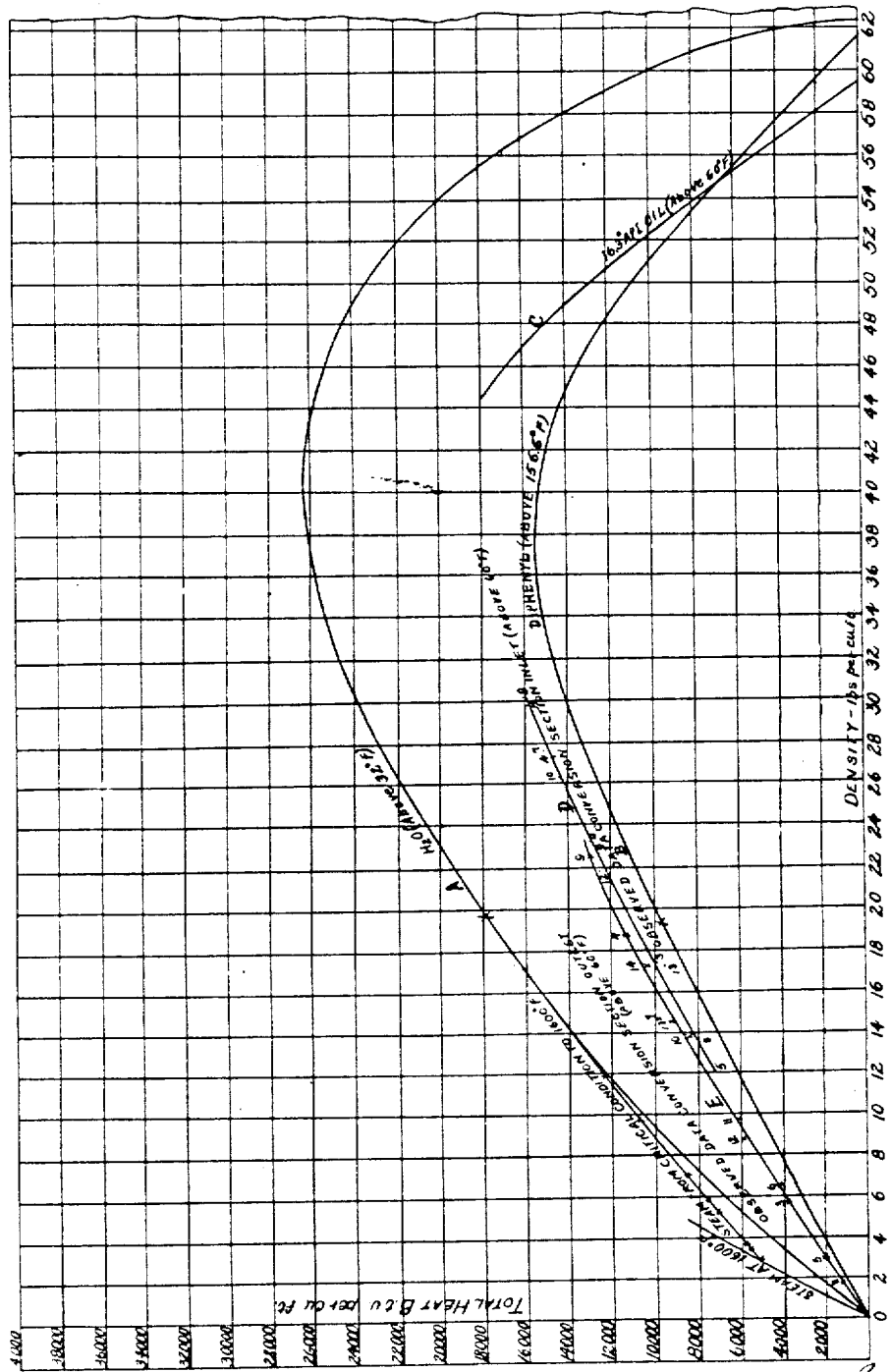

Fig. 13 illustrates a variation of the control system illustrated in Fig. 12.

Figure 14:
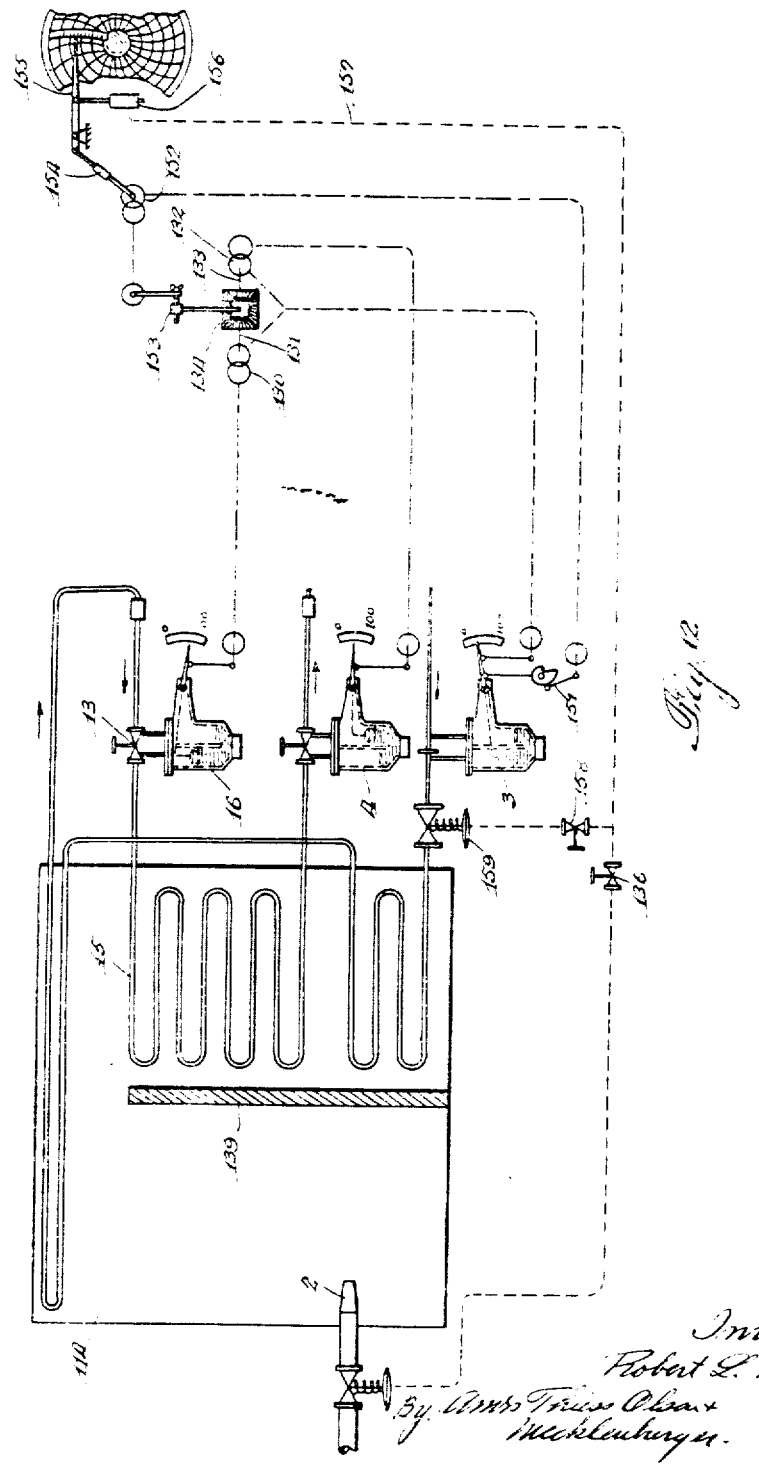

Fig. 14 illustrates a further development of the system illustrated in Figs. 12 and 13.

Figure 15:
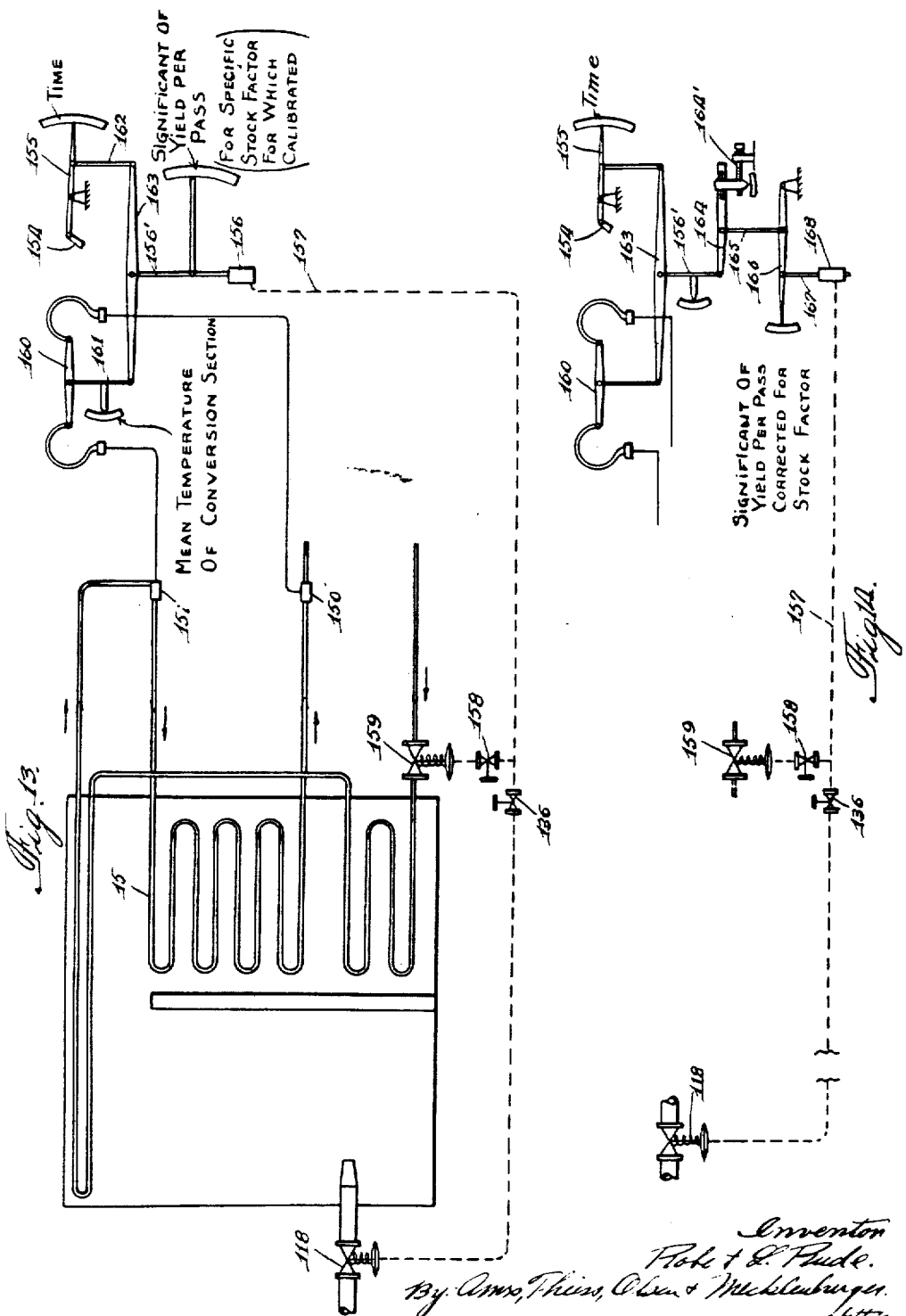

Fig. 15 illustrates the application of the herein described invention, particularly in connection with hydrocarbon treating systems, when the practice to which the invention is applied includes the use of tank gaging as a basis for determining the charge or throughput of the furnace.

Figure 16:
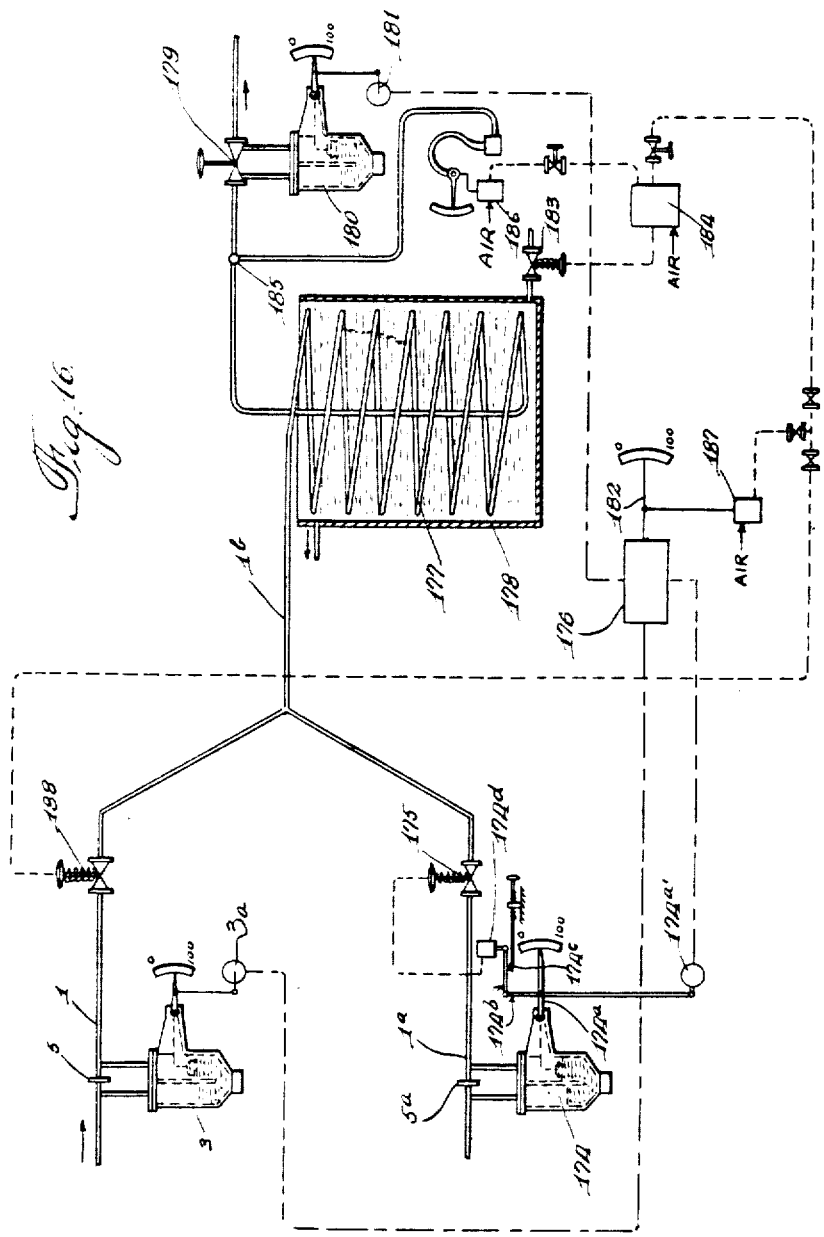
Figure 17:
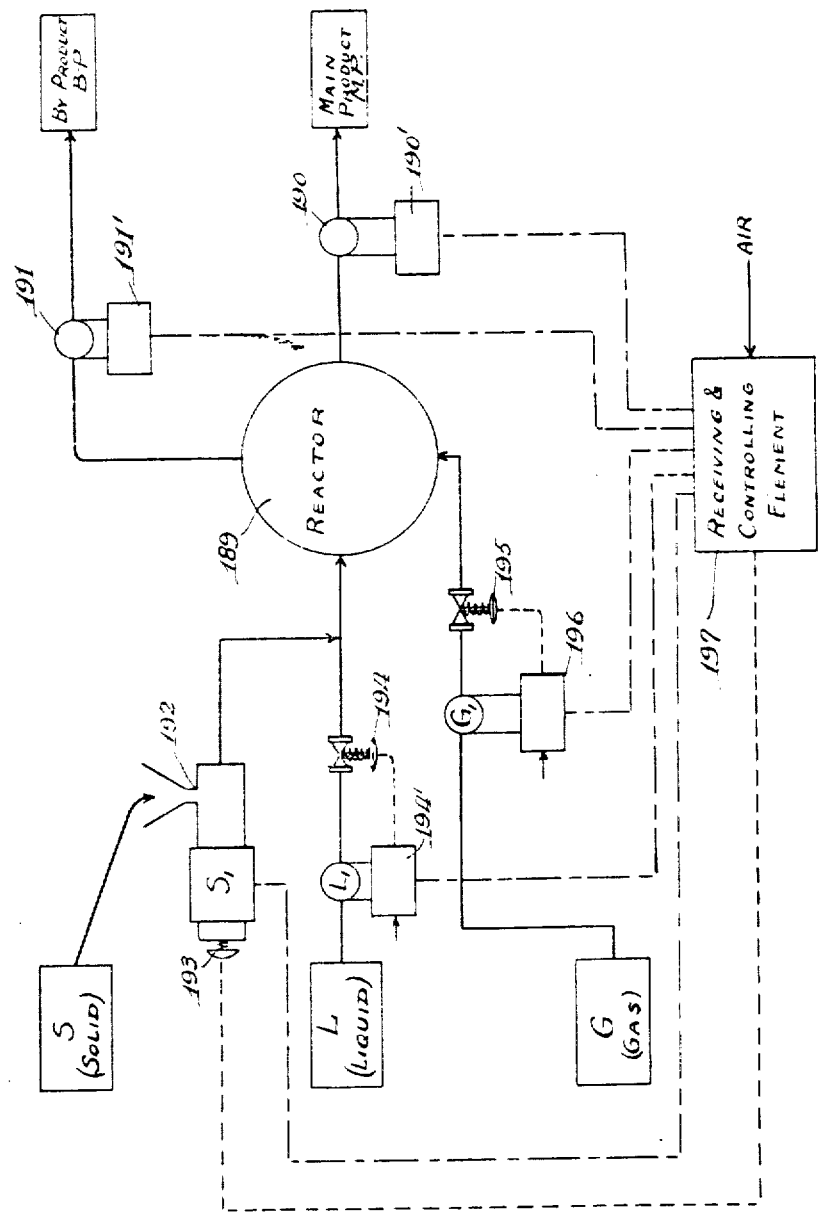

Figs. 16 and 17 illustrate the application of the present invention in chemical process.

Figs. 18, 19, 20, 21, and 22 illustrate in some detail, although still diagrammatically, those instrumentalities which are referred to in connection with the description of the manner in which the various controls are made effective, and, while certain of these automatic control instrumentalities are not a part of applicant's invention, it is nevertheless thought desirable to illustrate them here so that this application may constitute a convenient illustration of all the features which are used in connection with the invention.

Before proceeding with a description of the invention in connection with the above-referred-to drawings, it will be understood that, as to such methods and apparatus as are not herein claimed, the same is covered in copending applications of Robert L. Rude, Serial No. 700,485, filed December 1, 1933; and Serial No. 152,859, filed July 9, 1937: of Robert L. Rude and Carlyle D. Read, Serial No. 152,861, filed July 9, 1937: of John F. Luhrs, Serial No. 152,855, filed July 9, 1937; Serial No. 152,856, filed July 9, 1937; and Serial No. 152,857, filed July 9, 1937: and of Raymond D. Junkins, Serial No. 152,858, filed July 9, 1937, and that the incorporation in the present application of the apparatus is to promote a ready understanding of applicant's invention which it is not believed would be had if mere cross reference to the apparatus of the aforesaid copending applications were made.

Attention is initially directed to Figs. 2a, 2b, 2c, and 3, an understanding of the principles in connection with which is believed desirable before proceeding to the discussion of the invention per se. It will be recalled that the invention herein is directed to the ascertainment of the density of a flowing fluid undregoing a condition change and to the control of the processing of such flowing fluid stream and that, while several variables in such a stream may vary and these variations may be used as bases of control, the particular variable which is emphasized for illustrative purposes herein is the density of the fluid.

Figure 1:
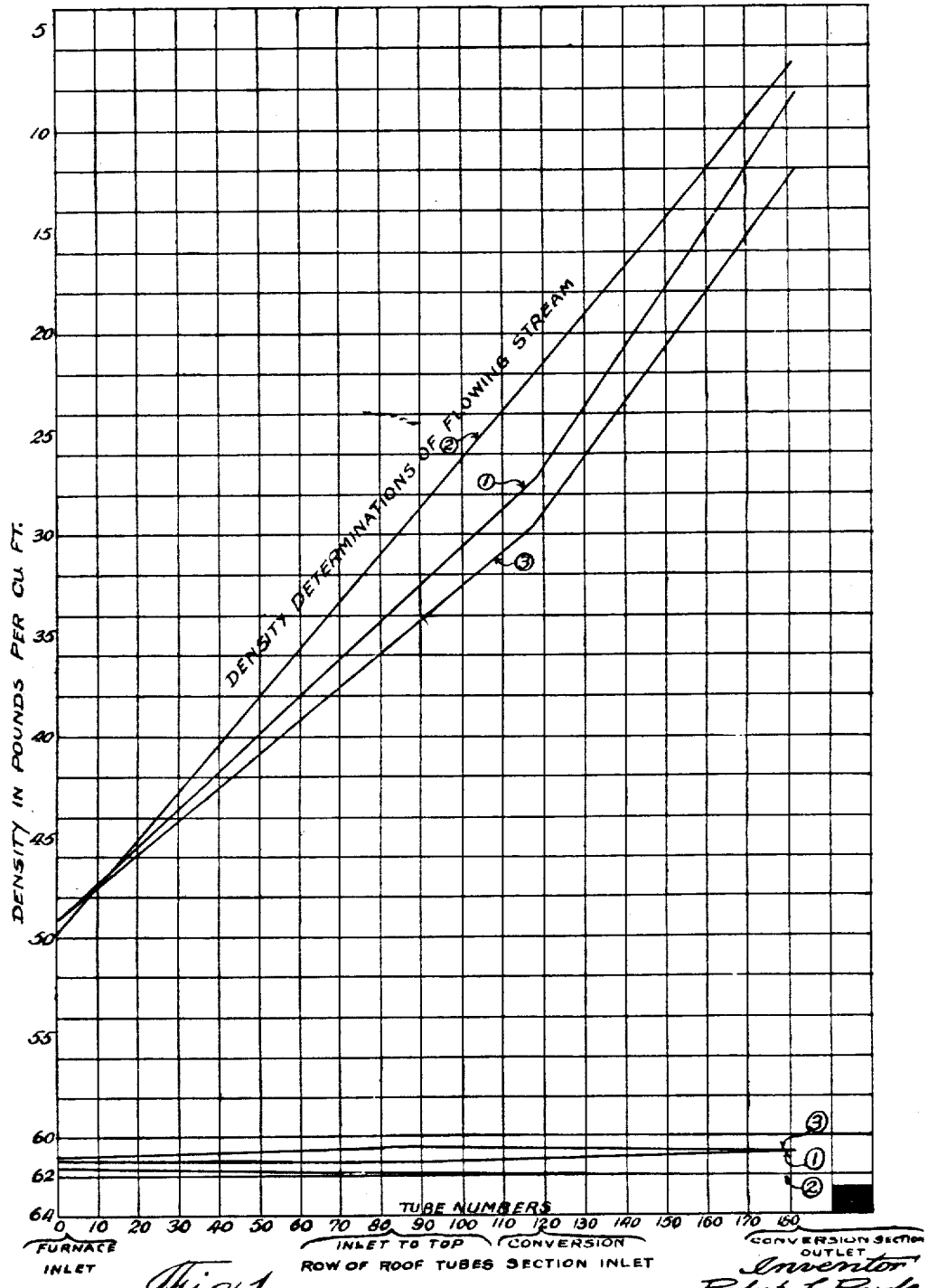
Figure 2A:
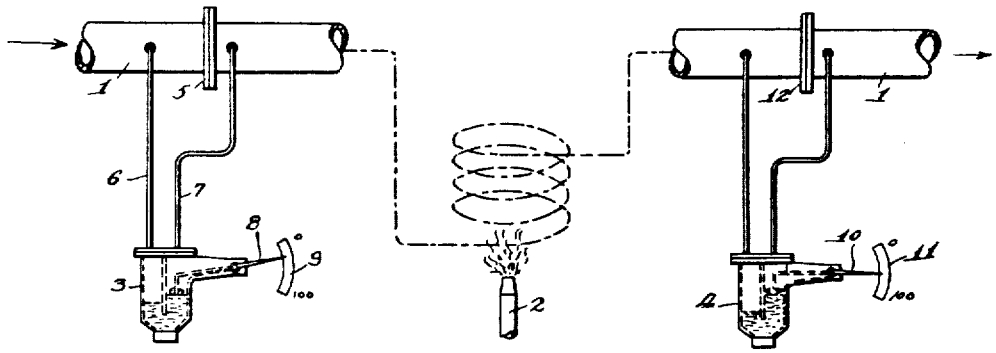

Accordingly, in Fig. 2a a fluid is understood to be flowing through the left-hand or inlet portion of a pipe 1, thence through the diagrammatically shown heating section, to which heat is applied by the burner 2, and then through the portion of the tube 1 beyond the burner, which la ter portion may be termed the outlet of said pipe. With such an arrangement the fluid will undergo a condition change and, during such condition change, the density of the fluid will change so that the density at the outlet of the section which is being heated will be different from the density at the inlet of that section. If the section in question is the conversion section in an oil cracking furnace, the condition change brought about by the application of heat may be a physical change or a chemical change or a combination of both.

Figure 2B:
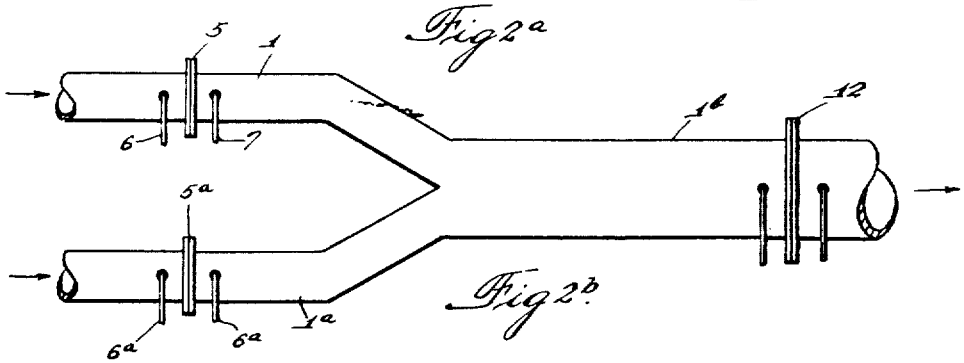

However, the term "condition change" also contemplates that modification which may occur in a flowing fluid stream when it undergoes a change in chemical composition only, which might result in a change in the density of the fluid. It is necessary to emphasize the possibility of such a change because, without such emphasis, one may overlook the possibility that a condition change and concurrent alteration in density would result when the chemical composition of a fluid flowing through a section changes by reason of any one of a number of chemical phenomena; for instance, by the addition of one fluid to another, as illustrated in Fig. 2b, wherein two substances are shown as fed through the pipes at the left and are commingled in the single pipe.

As an example of a flowable material undergoing only a physical change, the material entering the conduit 1 may be water, heated and/or vaporized by the heating means 2. Fluids or flowable materials other than water may, of course, be treated or processed, or undergo a physical condition change, which latter is manifested by a change in density. The apparatus arrangements of Figs. 2a and 3 clearly exemplify the invention regardless of the type or nature of the flowable material being processed and regardless as to whether the "condition change" is physical, chemical, or both, in nature. Likewise other figures of the drawings illustrate apparatus readily adaptable to the processing of fluids other than petroleum hydrocarbons and wherein the condition change may be of a strictly chemical or of a strictly physical nature, or a combination of the two.

It is also, of course, entirely possible that in some fluids a condition change may occur by reason of the passage of an electrical current through the fluid. This has been diagrammatically illustrated in Fig. 2c. Here it is, however, again to be noted that the recording flow metering devices have, for sake of simplicity and compactness, been only fragmentarily indicated.

Figure 3:
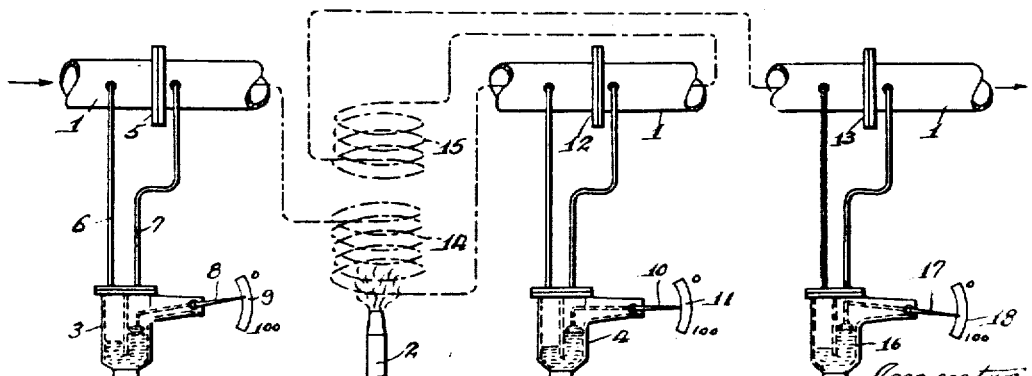

Inasmuch as the invention is here discussed in connection with the processing of a flowing stream of hydrocarbon, Fig. 3 illustrates a simple form of hydrocarbon treating apparatus in which the method of the present invention is employed. As hereinbefore stated, while a partially satisfactory control of a cracking operation may be had from a knowledge of the temperature, pressure, and rate of charge of the fluid stream being treated, yet a knowledge of the density of the flowing stream at different points in the path is of markedly increased value to the operator. This situation has been emphasized previously hereto and will be again stressed when the apparatus of Fig. 4a is more specifically discussed.

In this connection it may be observed that the invention, particularly the determination and use of density, finds ready application in fields other than petroleum treatment. For instance, although in the treatment of water below the critical pressure as in a vapor generator, a knowledge of temperature, pressure, and rate of charge may be sufficient for proper control, inasmuch as definite tables have been established for interrelation between temperature and pressure and from which tables the density of the liquid or vapor may be determined, nevertheless, there are no available tables for mixtures of liquid and vapor.

Moreover, in the processing of a liquid such as hydrocarbon, there are particular factors which so complicate the situation that it has heretofore been impossible to establish reliable tables correlating the required values. Vapor and gases are released or formed in the treatment of a flowing fluid by several causes, among which are the change in state from liquid to vapor, the liberation of dissolved or entrained gases, and the chemical change or reaction taking place during the treatment, such as cracking or polymerization. All of these variations, however complicated, may produce changes in the density of the fluid undergoing treatment. There are many other fluids which alter their condition under treatment in similar complicated manner.

Because of the conditions just outlined, it has been found impracticable or impossible to establish temperature-density tables for the liquid, vapor or liquid-vapor conditions of such fluid and, as outlined herein, it is only through actual measurement of the density of such a fluid that one obtains reliable knowledge as to the condition of the fluid stream at various points along its path of treatment. Of course, the actual measurement of the density in figures is not always necessary because in many instances flow metering elements are responsive to the same change as that which could be used to calculate density and these changes are such that they may be used in controlling the processing.

Those skilled in the art will, after a reading hereof, appreciate that a continuous determination or reflection of the density of a flowing fluid stream is of outstanding importance in that it enables an operator to control the heating, the density, the time of detention, and/or treatment of the fluid in a given part of the treating path and also provides bases of control which, when arranged in accordance with the invention herein outlined, provide for the utmost flexibility in automatic operation of a fluid treating system as herein described.

As above indicated, marked changes in density may occur in a flowing fluid stream, particularly one which is heated with the resulting formation of indeterminate mixtures, causing changes in the velocity of the fluid, and the consequent heretofore indeterminable changes in the time of detention or treatment of the fluid in the various parts of the path of flow. A determination of the density of the fluid in the portion with which one is concerned is an outstanding desideratum because it enables a determination of the time that the fluid remains in that portion of the path.

Referring now to the other figures of the drawings and particularly those dealing with the manner in which certain instrumentalities are arranged, not only to permit a visual indication of the aforesaid density changes, but also to insure automatic control of certain operating characteristics in response to the same modification or changes which were translated into density readings and figures, attention is however again briefly directed to the showing in Fig. 2a wherein the hereinbefore-referred-to conduit, which may be considered as comprising the once-through fluid path of an oil cracking apparatus, has a portion of its path heated by the burner 2. It cannot be too frequently emphasized that the explanation of the invention, or of any of the figures by reference to hydrocarbon process, is not intended as a limitation of the described process to the treatment of such a substance.

The rate of flow of the charge or the relatively untreated hydrocarbon is continuously measured by the rate-of-flow meter or differential recorder 3, and a similar differential recorder 4 is positioned in the conduit 1 beyond the section of the tube to which heat is applied from the burner 2. In short, the last mentioned recorder 4 is located at a point where the fluid has been already subjected to heating or other processing.

While the fluid flow measuring instrumentalities 3 and 4 are illustrated and described as differential pressure responsive devices, it will be understood that such showing and description are illustrative only and not to be taken in a limiting sense because fluid flow measuring devices, such as displacement meters, volumetric meters, Thomas meters, or the like, may be used in the determination of fluid density in practicing the invention herein disclosed.

The float actuated meter 3 is sensitive to the differential pressure across an obstruction, such as an orifice, flow nozzle, Venturi tube, or the like, positioned in the conduit for effecting a temporary increase in the velocity of the flowing fluid. Such an orifice may be inserted in the conduit between flanges as at 5 (see Fig. 18 for a detailed sectional view of an adjustable orifice which may be conveniently used). The meter 3 is connected by pipes 6, 7 to opposite sides of the orifice 5 and comprises a liquid sealed U-tube which, by reason of its connection across the orifice, is subject to the differential pressure produced by flow through said orifice. The greater pressure at the inlet to the orifice depresses the mercury on that leg of the U-tube connected to the inlet while the mercury in the other leg rises, in one leg of which is a float operatively connected to position an indicator 8 relative to an index 9. In similar manner the indicator 10 of the meter 4 is positioned relative to an index 11.

The relation between volume flow rate and differential pressure (head) is:

$$Q = CM\sqrt{2gh} \qquad (1)$$

where
Q = cu. ft. per sec.
C = coefficient of discharge.
M = meter constant (depends on pipe diameter and diameter of orifice hole).
g = acceleration of gravity—32.17 ft. per sec. per sec.
h = differential head in ft. of the flowing fluid.

The coefficient of discharge remains substantially constant for any one ratio of orifice diameter to pipe diameter, regardless of the density or specific volume of the fluid being measured. With C, M, and $\sqrt{2g}$ all remaining constant, then Q varies as $\sqrt{h}$. Thus it will be seen that the float rise of the meters 3, 4 is independent of variation in density or specific volume of the fluid at the two points of measurement and that the reading on the indexes 9, 11 of differential head is directly indicative of volume flow.

If the conduit size and orifice hole size are the same at both meter locations, then the relation of meter readings is indicative of the relation of densities and specific volumes. This may readily be seen, for if it were desired to measure the flowing fluid in units of weight, Formula 1 becomes $$W = CM\sqrt{2ghd} \qquad (2)$$

where

W = rate of flow in pounds per sec.
d = density in pounds per cu. ft. of flowing fluid.
h = differential head in inches of a standard liquid such as water.
M = meter constant now including a correction between the density $d$ of the flowing fluid being measured and the density of the liquid in the manometer which is some standard such as water.

Assuming the same weight rate of flow passing successively through two similar spaced orifices 5, 12 and with a change in density as caused by the heating means 2, then the density at the second orifice 12 may be determined as follows:

$$W_{12} = W_5 \quad (3)$$
$$\sqrt{2gh_{12}d_{12}} = \sqrt{2gh_5 d_5}$$
$$\sqrt{h_{12}d_{12}} = \sqrt{h_5 d_5}$$
$$d_{12} = d_5 \times \frac{h_5}{h_{12}}$$

Thus it will be observed that, knowing the density of the fluid passing the orifice 5, we may readily determine the density of the fluid passing the orifice 12 from the relation of differential pressures indicated by the meters 3, 4.

As previously indicated, Fig. 2b illustrates a system wherein a condition change occurs because of chemical action, in this case illustratively shown as occurring in a system wherein one substance is fed through pipe 1 and another through pipe 1a and the two are commingled in pipe 1b. (An amplification of this system is hereinafter described with reference to Figure 16, and a further modification thereof is hereinafter discussed in connection with Figure 17.) The measurements at the inlet and outlet, that is, before and after condition change, are ascertained in the same manner as explained in connection with the showing of Fig. 2a, it being observed that the measuring instruments are for simplicity only fragmentarily indicated by the pressure tubes on either side of the adjustable orifices. Another "condition change" may result if an electrolyte is added to water and the mixture passed through the tube shown in Fig. 2b, the density change which occurs in connection with electrolysis being determined in accordance with the present invention.

Figure 2C:
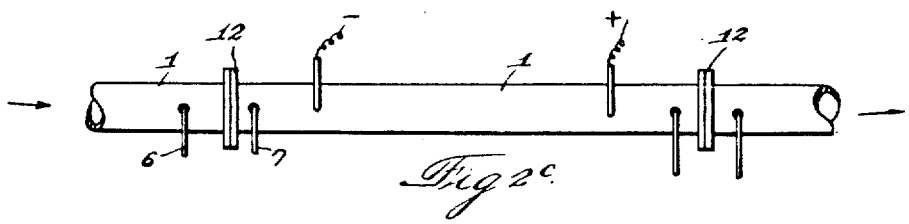

A density change occasioned by the passage of an electrical current through a fluid has also been mentioned and Fig. 2c illustratively represents a determination of the density variation in said fluid under these conditions. In the latter figure, the condition change is represented schematically as occasioned because of the positioning of two electrodes in the substance passing through pipe 1, and here again the adjustable orifices are positioned before and after the condition change.

Referring now to Fig. 3, wherein like parts bear the same reference numerals as in Fig. 2a, the fluid after passing through the orifice 12 is returned to a further heating section 15 of the still, from which it passes through a third differential pressure producing orifice 13. The heating coil 14 will be hereinafter referred to as a first heating section, while the coil 15 will be referred to as a second heating section. In the preferred arrangement and operation of the still, the section 15 is the conversion or cracking section and the one in which it is primarily desirable to continuously determine the mean density of the fluid, as well as its time of detention or treatment in this section. For that reason it is desirable to determine the mean density of the fluid in the section 15. This is accomplished through an interrelation of the differential pressures produced by the same weight flow successively through the orifices 5, 12, and 13.

The same total weight of fluid must pass through the three orifices in succession so long as there is no addition to or diversion from the path intermediate the orifices. It is equally apparent that in the heating of a petroleum hydrocarbon, as by the coil 14 between the orifices 5 and 12, there will be a change in density of the fluid between the two orifices, and furthermore that an additional heating of the fluid, as by the coil 15, will further vary the density of the fluid as at the orifice 13 relative to the orifice 12.

Assume now that the conduit 1 is of a uniform size throughout and that the orifices 5, 12, and 13 are of uniform diameter and coefficient or characteristic. Through the agency of the meter 16 the differential pressure existing across the orifice 13 is continuously indicated upon an index 18 by an indicator 17. The mean density of the conversion section 15 is then obtained by averaging the density at its inlet and outlet, i. e., $$md_{15} = \frac{d_{12} + d_{13}}{2} \quad (4)$$

The density of fluid at the orifice 13 may be obtained in the same manner, relative to the density of the fluid at the orifice 5, as was previously determined for the density of the fluid at the orifice 12. Simplifying this into a single operation, we have:

$$md_{15} = \frac{d_5 \times \frac{h_5}{h_{12}} + d_5 \times \frac{h_5}{h_{13}}}{2} \quad (5)$$

$$= d_5 \frac{\frac{h_5}{h_{12}} + \frac{h_5}{h_{13}}}{2}$$

Thus the mean density of the fluid in the conversion section 15 (knowing the density or any function of density, such as specific gravity, for example, of the fluid entering the system) may be directly computed from the readings of the indexes 9, 11, 18. This, of course, on the basis that the orifices 5, 12, 13 are the same, and that the capacity of the float meters 3, 4, 16 is the same.

If the meter 3 is on a weight rate basis and indicates in terms of $W = \#/hr$. then $$d_{12} = K\frac{W^2}{h_{12}}$$

Where $K$ = a constant and $$md_{15} = \frac{K\frac{W^2}{h_{12}} + K\frac{W^2}{h_{13}}}{2}$$

In this event it is not necessary to determine the density or related property of the fluid entering the system, as at the orifice 5, unless it departs from that for which the flow meter 3 is calibrated, in which case the meter reading must necessarily be corrected to design condition.

In the just preceding discussion it has been assumed that the mean density is obtained by averaging the densities calculated from the variables measured by the flow metering elements 4 and 16, but, as hereinafter pointed out in connection with the explanation of the system as used in Fig. 10, under certain circumstances it may be found desirable to explore the conversion section and thus determine the proper location for a single similar flow metering element which would directly respond to variations in the mean density of that section.

It is deemed convenient at this point to discuss the application of the invention herein described to the system shown in Fig. 4a because it is of particular value in such system. The invention enables one to ascertain the characteristics of the reactions and/or degree of treatment in individual units despite the combining of the products therefrom into a single zone, here represented as a vapor separating apparatus. It will be observed that the instrumentalities used to measure the density of the streams flowing in the various portions of the apparatus of Fig. 4a are similar to those described in preliminary diagrammatic discussion of the manner of density measurement which is utilized and furthermore that the arrangement of the treating and other sections is similar to that discussed in connection with the previous figures. However, the structure shown in this figure is quite an accurate delineation of a commercial apparatus.

Fig. 4a illustrates three furnaces arranged in a battery with the treated fluid from all of said furnaces being combined in a single vapor separator V. S. The furnaces containing the cracking coils are indicated at A, B, C, coil 14 in lowermost furnace A being charged with the fresh stock (or at least one which is not a recycled product) while the charge for furnace B is taken from the bottom of the first fractionating tower $T_1$, and that for coil 14 of furnace C being the material gathered in tower $T_2$ as a result of a side cut from tower $T_1$, all as clearly shown in the figure. Moreover, as indicated, the measuring devices which have hereinbefore been diagrammatically indicated are positioned as heretofore explained. The treated stocks from coils 15 of all the furnaces are fed to vapor separator V. S. wherefrom it is of particular value to be able to ascertain the characteristics of the stock fed to, and the product derived from, each furnace.

At a later point in this description, the manner of applying the herein disclosed invention in connection with individual furnaces has been fully discussed and the present battery operation is described at this point more to acquaint the reader with some of the applications of the invention to battery operation before passing to the various individual controls which are utilized. It is furthermore deemed convenient at this point to discuss the particular showing of Fig. 4a in connection with an exploratory method of approach to the problem solved herein, which method may be utilized in connection with furnaces either when arranged in a battery or when used as single units.

As will be noted, as the present description is developed, many of the hereinafter described controls involve the utilization of compensatory factors eliminating the necessity of making the about-to-be-explained explorations. However, such exploratory application of some of the phases of the herein-described invention may at times commend itself to a company utilizing the present invention because some of the factors, which have hereafter been indicated as varying and therefore requiring control in accordance therewith, may be more or less constant. Sometimes, moreover, an operator may wish to make the presently-to-be-discussed explorations rather than depend upon the integration of certain compensatory figures to take care of variations.

For instance, as an illustration of one application of the present invention, the about-to-be-described explorations are described as undertaken because of the probability of variation in the charging stocks which are used in various portions of the equipment. It is, however, not at all necessary to make an exploration to determine the constants of any particular equipment merely when stocks of different qualifications are employed; in fact, a method of control incorporating a compensation for variations in stock factor is hereafter discussed. It will therefore be understood that the present discussion of an exploratory approach to the solution of the problem hereinbefore set forth is not necessary unless an operator chooses so to avail himself thereof.

Having reference to the particular type of furnace which is shown in Fig. 4a, the operation therefor may be divided into two parts: First, the heating and conversion which occurs in the radiant section and, second, the heating and conversion which occurs in the conversion section.

In the initial exploration of the still for the purpose of determining the optimum operating condition for a particular stock, the still is first explored in the radiant section. For this purpose the still is charged with a certain stock and at a constant rate of feed with definite temperature and pressure readings, and these are recorded together with the reading of the density meter in the outlet of the radiant tubes. The conditions of operation which will change the amount of heat input to the radiant section are varied and the readings recorded for a number of such runs.

Having ascertained this optimum condition for the radiant section and the density and temperature reading at the outlet of said radiant section for said optimum conditions, it next becomes desirable to explore the conversion section. In the exploration of this conversion section a number of runs are made under varying conditions of heat input to the coil in order to obtain the optimum conversion for the particular apparatus with the particular charging stock and rate of feed.

In these runs exploring the conversion section, the density meter and the temperature at the outlet of the roof tube are maintained constant for the optimum condition of radiant section operation previously determined.

To effect the quantity of heat input to such conversion section in arriving at optimum conversion per pass, the operator will have available one or more of the well known and understood instrumentalities available for such purpose; i. e., variations in flue gas recirculation, excess air, etc.

After the exploration run is completed, the operator will then be in possession of the necessary density and temperature readings for the outlet of the radiant section and the outlet of the conversion section to give optimum conditions of operation for the particular still at the particular rate of charge and for the particular stock.

The above procedure is then followed and the same data empirically determined for maximum, minimum, and an intermediate rate of charge. In acquiring this data, the extent of conversion in the radiant and conversion sections may be determined from samples taken from the outlets of the radiant and conversion section in sufficient number to arrive at optimum conditions. These samples need primarily to be subjected only to analyses, well known, to determine the extent of conversion which has occurred and the character of the converted products. Having explored the still for the optimum conditions of operation for a particular charging stock on which it is now desired to run the still commercially, the following procedure is followed:

With this data, two curves are now constructed for the particular per cent conversion per pass. The first curve, illustrated in Fig. 4b, is the curve for the radiant section, and in this curve the rate of charge is plotted against density for optimum operations, the required temperature for each point on the curve experimentally determined being recorded at said points on the curve. The minimum, for example 5,000 barrels per day; maximum, for example 10,000 barrels per day; and intermediate, for example 7,500 barrels per day, charging rates give three points on this curve, and the corresponding densities (and temperatures) are recorded and a curve drawn through the density points. For other intermediate charging rates, the density and temperature can then be estimated from the curve.

Figs. 4b and 4c are here shown merely for the purpose of illustrating the application of the invention, it being understood that these curves will change with every apparatus, type of charging stock, etc.

If now it is desired to operate the still at an intermediate rate of feed not determined empirically, the following procedure would be followed:

The curve of Fig. 4b would be utilized to obtain the desired density and temperature reading for optimum operation in the radiant bank, and the still would then be operated at this density and temperature for the outlet of the radiant bank.

Curve, Fig. 4c, would likewise be used to show the desired density and temperature for the outlet of the conversion bank and the still would be operated for this density and temperature condition.

Since the curve reads in density and inasmuch as the density meter reads in differential pressure, it is necessary to convert this density reading into the reading as read on the meter. This can be conveniently done in Formula 2* hereinbefore

*See page 9.

discussed by inserting into the said formula the known figures and solving for meter reading. In the previous discussion of the formula the density was the unknown and the meter reading was a known figure and the formula was solved for density. In the commercial operation of the still this procedure is reversed.

Since the curves of Figs. 4b and 4c have been plotted from three points empirically determined, it will be well recognized by those skilled in the art that the absolutely true figure for the optimum condition might not be found directly on said curve. Accordingly, it is suggested that, if the operator desires to be certain that he is operating at the closest attainable optimum condition, he withdraw samples and obtain the conversion rate for the conditions under which he is operating. If this conversion rate is the optimum, then a new point can be plotted on the sheet which will undoubtedly lie in very close proximity to the curve previously determined by interpolation. The density and temperature thus noted will be thereafter used whenever the particular rate of charge is again employed.

This precaution is here mentioned because the points for varying rates of charge on the curves as initially plotted from the points initially determined might not be absolutely true throughout the length of the curves (as is ordinarily the case with indicating curves plotted from empirical data). These corrections can be readily made during the commercial operations as the initial curves will give very close approximations.

In commercial practice it may also be desirable to construct a chart in which density figures can be readily converted into meter readings, thereby obviating the calculation at the time of the operation. This procedure can readily be accomplished by making the mathematical calculation for all the density points at one time and constructing a chart to convert density into meter readings. The meter is not calibrated to read in density figures directly and this conversion becomes essential because, with changing rate of flow through the coil, it is necessary to vary the size of the segmental orifice, and hence the range of scale reading on the meter is not sufficiently large to record the readings obtained with a small orifice as well as a large orifice.

In the foregoing description the exploration and commercial operation of the still for optimum conditions of yield is described. It is obvious that the still might readily be operated to obtain any other desideratum as, for example, optimum conditions for the procurement of anti-knock fuel. Whatever optimum condition is desired, the still can be explored experimentally for that purpose, as hereinbefore described, curves plotted for said data giving the required density and temperature readings at the outlet of the roof and conversion sections and the still then operated and regulated by said density and temperature readings to get said optimum conditions for said desired results.

Figure 5:
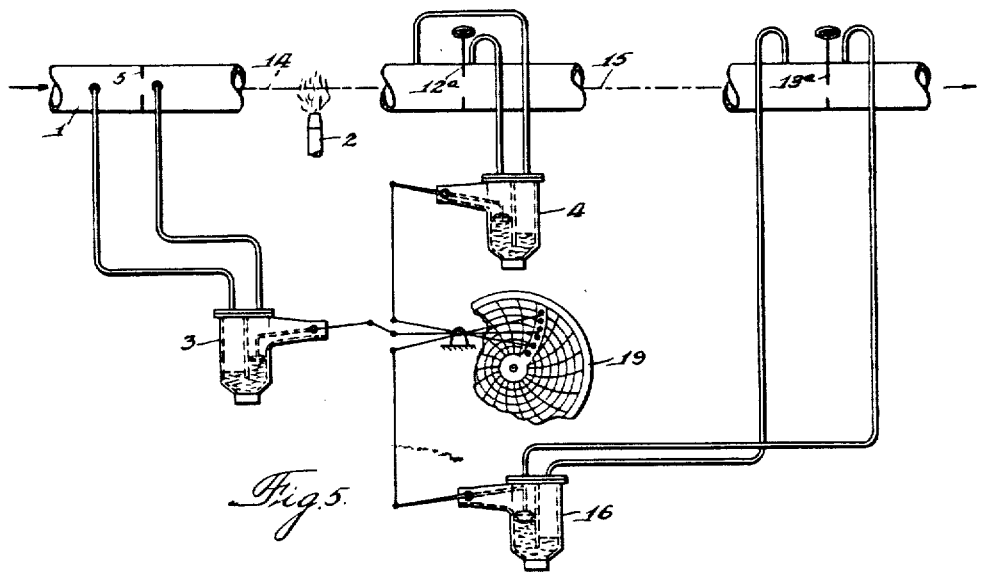
Fig. 5 is similar to Fig. 3 but illustrates the manner in which the variations may be physically indicated.

Having described an exploratory method but additionally having indicated that such approach is not necessary in view of the hereafter described incorporation of such varying elements as stock factor into the control equation, it is proper now to proceed with a description of the manner in which the control methods may be used with actual recordation of the figures which are utilized in control. Accordingly, Fig. 5 shows an arrangement similar to that of Fig. 3, but additionally provides for the continuous recordation in desired interrelation of the readings of differential pressure upon a single recording chart 19, thereby making these readings available for ready comparison and permanent record.

As the specific volume of a flowing fluid increases progressively from locations 5 to 12 to 13, the differential pressure across these orifices increases in like manner, and in the operation of such a cracking still it may be that the differential pressure across an orifice 13 will be several times that across the orifice 5 if the orifice sizes are equal. At 12A and 13A of Fig. 5, therefore, it is indicated that these orifices may be of an adjustable type whereby the ratio of orifice hole to pipe area may be readily varied externally of the conduit through suitable hand wheel or other means. The actual orifice design in terms of pounds per hour is (A. S. M. E. report "Fluid Meters"):

$$W = 360 c f D^2 \sqrt{\frac{\max h}{\text{sp. vol.}}} \quad (6)$$

where
$W = \#/\text{hr.}$
$D =$ diameter of equivalent circular orifice hole in inches.
$c =$ coefficient of discharge.
$f =$ factor of approach.
sp. vol. $=$ cu. ft./lb.

Now considering that orifice 12A is so adjusted that its $cfD^2$ is different from that of orifice 5, we may then determine the density at 12A as follows:

where
$$d_{12A} = CR^2 \quad (7)$$

$$C = d_5 \left(\frac{cfD_5^2}{cfD_{12A}^2}\right)^2$$

$$R = \frac{\sqrt{h_5}}{\sqrt{h_{12A}}}$$

$$d_{12A} = d_5 \left(\frac{cfD_5^2}{cfD_{12A}^2}\right)^2 \times \left(\frac{\sqrt{h_5}}{\sqrt{h_{12A}}}\right)^2$$

In similar manner the density at the orifice 13A may be determined regardless of the orifice area so long as one takes into account the $cfD^2$ of the orifice in the above manner. It will thus be seen that, if the specific volume of the flowing fluid increases so rapidly that the differential heads at successive orifice locations (for the same design orifice) become many times the value of the differential head at the initial orifice, it would be impractical to attempt to indicate or record such differential heads relative to a single index or record chart without one or more of the indications or records going beyond the capacity of the index or chart.

There are two ready means of overcoming this practical difficulty, the first being an adjustment of the successive orifices, such as 12A, 13A to have new values of $cfD^2$ such that the indicator or recording pen will be kept on the chart; and the second through varying the basic capacity of the meter 4 or 16 relative to the meter 3. This latter method consists of so arranging the meter 4, for example, that it requires 50% greater differential pressure to move the related pointer over full index range than in the case of meter 3. This may readily be accomplished by properly proportioning the two legs of the mercury U-tube, on one of which the float is carried. Of course, it will be necessary to take such change in capacity into account when utilizing the differential head readings in determining density or mean density.

For example, the reading of the pointer relative to the index should be on a percentage basis of whatever maximum head the meter is designed for. Then the total head corresponding to the indicator reading will be available or the proper correction may be applied. Assume that the meter U-tube 3 is so shaped that it requires 120″ water differential applied thereto to move the indicator 8 from 0 to 100% travel over the index 9, and that for meters 4 and 16 it requires 250″ water differential to cause the indicator 10 to move from 0 to 100% over the index 11, and 17 relative to 18. Then:

$$F_3 = \% \text{ float travel of meter 3} \quad (8)$$
$$F_4 = \% \text{ float travel of meter 4}$$

$$\frac{h_5}{h_{12}} = .48 \frac{F_3}{F_4}$$

substituting in (7)

$$d_{12A} = d_5 \left(\frac{cfD_5^2}{cfD_{12A}^2}\right)^2 \times 0.48 \frac{F_3}{F_4}$$

and $$md_{15} = \frac{.48 d_5}{2}\left[\left(\frac{cfD_5^2}{cfD_{12A}^2}\right)^2 \frac{F_3}{F_4} + \left(\frac{cfD_5^2}{cfD_{13A}^2}\right)^2 \frac{F_3}{F_{16}}\right] \quad (9)$$

Fig. 6 shows similarly in diagrammatic fashion an arrangement similar to that of Figs. 4 and 5. However, the Fig. 6 showing is adapted to give further indications valuable as a guide to operation of the system and with means for automatic control of the process from certain of such indications.

The fluid after passing the orifice 5 enters a heating section 20 having a hand actuated regulating means 21. The fluid then passes the orifice 12A and enters a heating section 22 wherein the heating is regulated by a control device 23. I have shown herein in diagrammatic fashion that the values $h_5$ and $h_{12A}$ are applied to a mechanism 24, and the values $h_5$ and $h_{13A}$ are applied to a mechanism 25. The resultant value of density of the fluid at the orifice 12A from the mechanism 24, and the resultant value of density of the fluid at the orifice 13A from the mechanism 25, are applied to a mechanism 26 which indicates by the pointer 27 upon the index 28 the value of mean density of the fluid passing through the heater 22. Mean density and $h_5$ are then applied to a mechanism 29 from which is indicated a resultant in terms of time by a pointer 30 upon an index 31.

In the operation of such a cracking still it is of considerable importance to determine the time-temperature relation of the conversion section. For example, the time that any particle remains in this section and the temperature to which it is subjected. To determine such temperature there is indicated in Fig. 6 at 32 the bulb of a gas-filled thermometer system of which 33 indicates the connecting capillary and 34 a Bourdon tube whose free end is positioned responsive to the temperature at the bulb location.

The temperature sensitive means 34 and the time indicating means 30 then act through a mechanism 35 to move an indicator 36 relative to an index 37 to indicate directly the time-temperature relation of the fluid through the heating section 22.

The control mechanism 23 may be positioned in accordance with mean density, time, or time-temperature relation. To accomplish this, air pilot valves 38, 39, 40 are provided and are positioned respectively by the indicators 27, 30, 36 for controlling a pressure fluid and selectively made effective upon the control mechanism 23 by means of the valves 41.

The air loading pressure from the pilot valves 38, 39, 40 may be selectively made effective upon a fluid flow control valve in the conduit 1 through the agency of hand valves 41A and the pressure line 41B. Such a fluid flow control valve has not been shown but may be located in conduit 1 before orifice 5, for example.

The air pilot valves 38, 39, 40 are of known type wherein axial movement of a pilot stem relative to fixed ports controls the pressure of a control fluid such as air at the outlet of the assembly. Such pilots are more fully described and claimed in United States Letters Patent to Clarence Johnson, No. 2,054,464.

Fig. 7 illustrates the actual mechanism which is preferably employed to accomplish the results which are described as diagrammatically illustrated in Fig. 6. For instance, it will be observed that according to Formula 5 it is necessary, in determining the mean density of the conversion section, first to obtain the ratio of the differential heads at orifices 5 and 12A, then to obtain the ratio of the differential heads at orifices 5 and 13A, and finally to average these ratios. The method is based on the use of logarithms, a process well known in mathematics, whereby it is possible to obtain a quotient by subtraction or a product by addition. In connection with logarithmically designed cams, there are employed self-synchronous motors which lend themselves readily to addition or subtraction through differential windings, as well as having the feature of ready grouping at remote locations.

Such self-synchronous generators for transmission of position are indicated at 42, 42A, 43, 44, 45, 46, and 47, while the self-synchronous receiving motors are indicated at 48, 49, 50, 51—52, 53—54, 55—56, 57, and 58. The transmitting generator in each case is operated at a suitable angular rotation through the angular position of the rotor or single phase field winding. The stator or armature is in each case provided with a 3-phase winding. The field windings of each transmitting generator are energized from a suitable source of alternating current supply.

The operation of systems of this general character for the transmission of angular movement is well known in the art. Voltages are induced in the 3-phase stator windings of the transmitter or receiver by the single phase field winding on the associated rotor. When the rotor of one of the transmitters is moved from a predetermined position with respect to its stator, a change is effected in induced voltage in the armature winding and the rotor of the receiving motor assumes a position of equilibrium relative to the transmitting generator, wherein the induced voltages in the 3-phase windings are equal and opposite, and consequently no current is set up in the armature winding. If the rotor of one of the generators is turned and held in a new position the voltage is no longer counterbalanced, whereby equalizing currents are caused to flow in the armature windings which exert a torque on the rotor of the receiving motor, causing it to take up a position corresponding to the position of the transmitting generator.

The receiving motors 48, 49, 50 are individually positioned in synchronism with the transmitting generators 42, 43, 44. Between the indicator arm 8 and the transmitting generator 42, I interpose a cam 59 having a rise proportional to the logarithm of its angular motion to the end that the receiving motor 48 and the recording indicator 60 positioned thereby assume a position corresponding to log $h_5$. Similarly the indicator arm 61 is positioned by the receiving motor 49 in accordance with the value of log $h_{12A}$, while the indicator 62 is positioned in accordance with the value of log $h_{13A}$.

Actually the design is such that the transmitting generator 42 (positioned in accordance with log $F_5$) attains maximum desired rotation with from 10–100% full float travel. No motion of the generator 42 occurs when the float of the meter 3 moves over 0–10% of its travel range. This because it is impossible to have a logarithmic cam start at zero; also because the logarithmic characteristics are such that there would be as much cam rise for from 1% to 10% of float rise as for from 10% to 100%. Thus the cam 59, and the similar cams of the meters 4 and 16 are made of practical size and proportion by sacrificing only the first 10% of the float travel of the meters and with the expectation that the operation will not normally be below 10% of full float travel.

In addition to indicating and recording in interrelation upon the record chart 63 the values of the log of the differential pressures at the three orifices, the position of the transmitting generators 42, 43, 44 is utilized through the agency of differential self-synchronous devices to algebraically add the value of the log $h$ for the different orifices and thus accomplish the ratio operation. Angular movement imparted mechanically to the rotors of the transmitting generators 42, 43 will result in an angular positioning of the rotor of the receiving motor 51—52. Similar action occurs between the transmitting generators 42, 44 and the receiving motor 53—54; and between the transmitting generators 42A, 46 and the receiving motor 55—56.

The receiving motors 51—52, 53—54, and 55—56 have 3-phase rotor windings and 3-phase stator windings and are commonly known as differential self-synchronous motors, for in each case they are responsive to two of the transmitting generators and assume a rotor position corresponding in differential effect from the two related transmitters. For example, the receiving motor 51—52 has its rotor positioned responsive to a differential between the position of the rotor 42 and that of the rotor 43, or according to log $h_5$—log $h_{12A}$, thus performing the mathematical operation:

$$\log \frac{h_5}{h_{12A}} = \log h_5 - \log h_{12A}$$

Correspondingly the receiving motor 53—54 has its rotor positioned responsive to a differential between the position of the rotor 42 and that of the rotor 44, thus performing the mathematical operation:

$$\log \frac{h_5}{h_{13A}} = \log h_5 - \log h_{13A}$$

From Formula 5 the mean density of the fluid in the conversion section is the density of the fluid at orifice 5 multiplied by the average of the ratio of heads for the different orifice locations 12A and 13A. In designing the apparatus, an average expected value of density or related property of the fluid at the orifice 5 is incorporated in the transmitted motion of the rotor of 51—52 and of the rotor of 53—54. Thus, if the expected density exists at the orifice 5, the indicator moved by the rotor of 51—52 will indicate relative to the index 64 the instantaneous value of log $d_{12A}$ while on the index 65 may be read the instantaneous value of log $d_{13A}$.

The rotor of 51—52 angularly moves a cam 66 having a rise proportional to the antilog of its angular motion; likewise the rotor of 53—54 angularly moves an antilog cam 67. Thus the vertical movement of a roller at the lower end of a link 68, riding on the cam 66, is proportional to $d_{12A}$ and that of 69 to $d_{13A}$.

To obtain the mean density through the conversion section 15 it becomes necessary to solve Formula 4 and this is accomplished through a differential mechanism 76 adapted to position an indicator 77 relative to an index and recording chart 78 to continuously record thereon the value of $md_{15}$.

It is to be understood that, if the basic capacity of meters 3, 4, 16 vary one from the other, then, as previously brought out, this may be taken care of as in 8. The linkage through which the arm 10 positions 43 and the linkage through which the arm 17 positions 44 may incorporate the necessary correction values. Or it might be taken into account as at (9) at the outlet side of antilog cams 66, 67. Furthermore, the orifices 12A and 13A are illustrated and described as being adjustable as to $c/D^2$ value and (9) such may be taken into account at the same time.

Referring to Fig. 7, means are provided at 70—72 for manually adjusting the effect of angular positioning of cam 66 upon one-half of differential 76. Thus cam 66 which is angularly moved proportional to $$\log \frac{F_s}{F_4}$$

or $$\log \frac{h_s}{h_{12A}}$$

will position the arm 72 relative to the index 74 according to $$d_s \left(\frac{cfD_s^2}{cfD_{12A}^2}\right)^2 \frac{h_s^2}{h_{12A}^2} \text{ or } d_{12A}$$

Likewise on 75 may be indicated $d_{13A}$. The differential 76 then positions the arm 77 according to $$\frac{d_{12A} + d_{13A}}{2}$$

or $md_{15}$.

At 79 is indicated a manual adjustment of the motion of arm 77 to take into account deviations in value of $d_s$ of (9) from design conditions, as might be attributed to changes in density, temperature, etc.

The arm 77 is adapted to position a logarithmic cam 79A for moving a transmitter 46 proportional to log $md_{15}$, which of course is proportional to log (V times $md_{15}$), since the volume (V) of the system between 12A and 13A is constant. The meter 3 positions a cam 59A for moving a transmitter 42A proportional to log $\sqrt{h_s}$, which, so long as $d_s$ remains constant, is proportional to log W where W is rate of flow in lbs. The differential motor 55—56 is then under the influence of the transmitters 42A, 46 representative of log W and log V $md_{15}$ and the resulting angular motion of cam 80 is: log $T$=log V $md_{15}$−log W. Cam 80 is of antilog design and the arm 81 is moved relative to record 82 to indicate the time of detention of any particle of fluid in the heating section 15, from:

$$T = \frac{V md_{15}}{W}$$

where $T$=time any particle is in section 15.
$V$=volume between 12A and 13A (cu. ft).
$md_{15}$=mean density (lbs. per cu. ft.).
$W$=rate of flow (lbs. per unit T).

The position of the arm 81 is used to angularly position a transmitter 45, in turn positioning a receiver 57 and cam 83. Closely related is a cam 84 positioned by a receiver 58 under the control of a transmitter 47 responsive to mean temperature of the fluid mixture. Temperature responsive bulb 86 is located in the fluid at the outlet of the heating section 15, while bulb 87 is located at the inlet to the section. The corresponding Bourdon tubes 88, 89 are arranged to position the transmitter 47 according to the mean temperature of the fluid through the section 15. The cams 83, 84 may be designed as uniform rise cams or to take care of any characteristics or relationship as may be desired. Through their interrelation an indicator 85 is continuously positioned relative to an index and recording chart 86 to advise the time-temperature relationship for the conversion section 15.

An indicator pen 90 is positioned with the indicator 85 by time-temperature relation but is further provided with a stock factor adjustment 91 so that the pen 90 records on the chart 86 the yield per pass. The stock factor adjustment 91 is available to correct for deviations in density, Anilin Number, and such other variables as may affect the charge or fluid entering the conduit 1.

In Fig. 7a is illustrated a further arrangement to indicate or record time of detention or treatment. A rate-of-flow meter 3A is of a type having a shaped liquid sealed bell adapted to correct for the quadratic relation between differential head and rate of flow and positions a cam 100 directly in accordance with W or pounds per unit of time. The transmitter 101 moves proportional to log W.

The differential receiver 102—103 is sensitive to log W and log $h_{12A}$ positioning the antilog cam 104 according to $$\log W - \log h_{12A} = \log \frac{W}{h_{12A}}$$

Likewise the receiver 105—106 is sensitive to log W and log 13A positioning the antilog cam 107 according to $$\log W - \log h_{13A} = \log \frac{W}{h_{13A}}$$

The pointer 108 then indicates relative to the index 109 the value of $$\frac{W}{h_{12A}}$$

and pointer 110 relative to index 111 the value of $$\frac{W}{h_{13A}}$$

The two are algebraically added through the mechanical differential 112 and the pen 113 indicates and records time of detention or treatment, from:

$$W = 360 cfD^2 \sqrt{h_s d_s}$$

$$= K_s \sqrt{h_s d_s}$$

$$d_{12A} = d_s \frac{K_s^2}{K_{12A}^2} \times \frac{h_s}{h_{12A}}$$

$$W_{12A} = W_s = K_{12A} \sqrt{h_{12A} d_{12A}}$$

$$d_{12A} = d_s \frac{K_s^2}{K_{13A}^2} \times \frac{h_s}{h_{12A}}$$

and $$md_{15} = \frac{d_{12A} + d_{13A}}{2} = \frac{d_s}{2}\left[\frac{K_s^2 h_s}{K_{12A}^2 h_{12A}} + \frac{K_s^2 h_s}{K_{13A}^2 h_{13A}}\right]$$

$$T = \frac{V md_{15}}{W}$$

$V$ = volume (a constant)

$$W = K_s \sqrt{h_s d_s}$$

$$T = \frac{V}{2}\left[\frac{W}{K_{12A}^2 h_{12A}} + \frac{W}{K_{13A}^2 h_{13A}}\right]$$

Having now discussed the manner in which the variables occasioned by the treatment of the fluid and particularly the density may be made manifest and the several variables along the path of flow correlated by the instrumentations just described, attention is directed to the manner in which the aforesaid variables may, by correlation with automatic controlling devices, be caused to assert control in accordance with the invention. The manner in which the flow through an orifice produces a differential pressure head which may be used to calculate density and which is proportional to density has been heretofore described. Moreover, the use of differential Selsyn motors has been sufficiently outlined and their manner of operation has been so explained that it is not now necessary, in referring to these flow metering elements and the various interrelation therewith of the Selsyns, repeatedly to explain why the operation thereof moves the hereinafter described elements, and it will accordingly be understood that the same are not further described for this reason. Furthermore, the pilot valves which are used in connection with the application of the invention to cause automatic operation in response to changes in the value of certain variables will be fully described as to structure hereinafter, although it will be understood that the actual structure of these valves forms no part of the present invention, they being one of the elements whereby applicant causes his novel method to be applicable automatically in the treatment of a fluid.

Referring now to the structure shown in Fig. 8, it will be observed that the once-through path comprises the same tube or pipe 1 which has been previously described and that the coils 14 and 15 are the same as those heretofore described in Fig. 2. Moreover, the burner 2 causes heat to be applied directly to the coil 14 while the coil 15 may be considered as a conversion section. The flow metering elements 3, 4, and 16 are positioned, respectively, at the charge inlet to the coil as a whole, at the inlet and at the outlet of the conversion coil.

The control elements in Fig. 8 are arranged to provide for the automatic control of the heating of the fluid through the control of the fuel fed to the burner 2 or the air which passes through flue 113 into the combustion chamber 114' of the furnace. A damper 115 is positioned in the flue 113 and is arranged to be operated by any desired pressure responsive device 116.

The fuel is fed to the burner 2 through pipe 117 controlled by valve 118, which latter is also arranged to be pressure responsive when conditions are altered as hereinafter pointed out.

This type of control of the heating by varying either the fuel or the air, or both, is shown as used in an oil still or cracking apparatus, where the mean density of the fluid in the conversion section dictates the temperature to be maintained at the entrance to the conversion section. In order desirably to associate the last mentioned temperature with the density manifestations, a thermo-couple 119 is shown as diagrammatically situated to respond to the temperature at the inlet to the conversion section. This thermo-couple is shown as connected through leads 120 to a potentiometer pyrometer 121, it not being deemed necessary to describe in detail the construction of such pyrometer for the reason that any standard make of instrument, such as that disclosed in Ryder, United States Patent 2,015,-968, for example, may be utilized at the point indicated. The pyrometer, however, comprises an agency through which a reversing Warren self-starting, synchronous A. C. motor 122 is actuated in one direction or the other to move a pen arm 123 around the pivotal support thereof 124. The pen arm 123 records upon an associated chart 124' a continuous indication of the absolute value of temperature at the thermo-couple location.

At the same time, the movement of the rotor of the motor 122 varies the position of the right hand end of a lever 125, which is pivoted at 126, the movement of the said right hand end of the lever 125 being, of course, vertical in accordance with the variations in the absolute temperature value. As said lever 125 pivots about point 126, a point 127 (the end of a pilot valve stem 128 which is part of pilot 128a) is moved vertically to control the air loading pressure through line 129.

The differential Selsyn 130 is controlled as to position by the manifestations of the differential-head meters 3 and 16 to move an arm 131 in accordance with the density at the outlet of the conversion section, i. e., the adjustable orifice 13, it being noted that the variations at orifices 5 and 13 are integrated by the joint action on the Selsyn 130 of the values from the arms 8 and 17, which respectively indicate the variations in the flow metering elements 3 and 16.

Similarly, the Selsyn 132 is jointly acted upon by the proper flow meter devices to position an arm 133 in accordance with variations in the density at the inlet of the conversion section, i. e., the adjustable orifice 12, the variations of the differential head across which are made manifest in the flow metering device 4.

A mechanical differential 134 is thus responsive to the mean density of the fluid in the conversion section and this, in turn, causes variations in the vertical position of the pivot point 126 as the mean density in the conversion section varies. It will, accordingly, be apparent that the lever 125 is affected by both the temperature at the inlet of the conversion section and by the mean density of the fluid in that section, and that the combination of the two may be utilized through the movement of point 127 on the lever 125, with the consequent movement of the pilot valve stem 128, to effect desirable control.

The varying air pressure through line 129 passes through valves 135 and 136, which are respectively connected through lines 137 and 138 to operating mechanism 116 and 118, respectively. In short, valve 136 may be closed, wherefrom the control pressure from pilot valve 128a may pass through valve 135 and cause means 116 to vary the position of damper 115, thereby to control the amount of air admitted to the combustion chamber.

On the other hand, with valve 135 closed and valve 136 open, the pressure variations are transmitted to move valve 118 to vary the amount of fuel fed to burner 2. Or, if desired, the valves may be both opened in predetermined proportions to control both the fuel and the air.

In utilizing the control shown in Fig. 8, the operation may be such that a uniform yield per pass may be maintained. If there is a variation in mean density, then the firing must be so controlled as to set up and maintain a new temperature standard. Not only the pressure, but a change in the rate of charge, might effect the mean density in the conversion section. When the mean density does thus vary and it is desired to maintain a uniform yield per pass, a new temperature standard can be established and maintained by moving the pivot point 126 about which the lever 125 pivots.

If, for example, the pressure or rate of charge changes in such manner that the mean density in the conversion section is varied, then the pivot point 126 is, for instance, moved upwardly. Such a change causes movement of the stem 128 of the pilot valve 128a and results in a change in the rate of firing. This, in turn, varies the temperature at the thermo-couple location in such direction that the motor 122 is so actuated that the bar 125 pivoting around 126 is so moved that the end of the pilot stem 128 (where the pilot stem is joined to lever 125 at 127) is moved back to its original position.

The arrangement of Fig. 8 may be used in substantially identical arrangement wherein the fluid being processed is water admitted at the entrance of conduit 1, and it is desired to produce saturated or superheated vapor (steam) at the exit of the once-through fluid path. The qualitative condition of the steam leaving the heating section 15 is dependent upon the rate of combustion of the fuel and air supplied to the furnace; the rate of supply of which is controlled responsive to density and temperature as previously explained. The arm 133 is positioned in accordance with density of the fluid (which may be water, steam, or water-steam mixture) at location 12, and may be indicated or recorded if desired, in addition to being effective in control. Similarly the arm 131 is positioned in accordance with the density of the fluid at location 13. In this example the condition change or processing of the fluid being treated is purely a physical change of heating and vaporizing.

In Fig. 9 is shown another system of control in which the firing is varied by variation in the amount of fuel supplied in much the same manner as shown in Fig. 8, but wherein a control of the recirculation of the products of combustion around bridge wall 139 in furnace 114' is utilized to control the heat supplied to the conversion section 15. Moreover, the furnace of Fig. 9 is shown as provided with a set of roof tubes 15', these latter being frequently referred to in a furnace of this type as the radiant tubes.

The recirculation is varied by altering the speed of fan 140 which is driven by motor 141, the latter having a rheostat 142 in the control circuit thereof. The rheostat is moved in and out of circuit by an air actuated mechanism 143, which latter is, in turn, controlled by the variations in pressure from the pilot valve 128a.

As hereinafter pointed out, the alternative controls for the heating may be utilized either independently or jointly and sequentially as desired.

The various recording, responsive, and operating instrumentalities are arranged in substantially the same manner as in Fig. 8, particularly so far as the adjustable orifices, the fixed orifice, and the differential Selsyn motors are concerned. The vertical positioning of the pivot point 126 is controlled by the mean density through the conversion section, i. e., by the movement of the differential 134 as heretofore explained.

In Fig. 9, however, the temperature measured by the pyrometer, as well as that recorded on the chart, is a mean temperature through the conversion section, which mean temperature is obtained through the averaging of the temperatures taken from two thermo-couples, one that already described, 119, at the inlet to the conversion section, and the other, 144, at the outlet from the conversion section, the potentiometer 121, therefore, so moving the motor 122 as to record mean temperatures through the conversion section and at the same time to position the right hand end of the lever 125 in accordance with such mean temperature.

Assuming that the mean density through the conversion section remains constant, a deviation in mean temperature through that section from desired established value will shift the pilot stem 128 and the point 127 to vary the pressure transmitted through pilot valve 128a to vary the recirculation of the flue gases. This, of course, is accomplished because such variations in the position of the pilot valve stem 128 and the consequent variation in the port openings in the valve 128a will alter the speed of fan 140 and concurrently the recirculation of the flue gases. Such variation in recirculation will, in turn, vary the mean temperature of the fluid passing through the conversion section and will cause lever 125 to re-set the pilot to its original predetermined position.

On the other hand, if for some reason, such as variation in pressure, rate of charge, or other variable, the mean density through the conversion section should vary, it would be desirable to establish a new mean temperature as a standard. Such a new mean temperature may be established by virtue of the fact that the change in mean density in the conversion section will cause a vertical shift in the pivot 126 about which lever 125 moves, and this, in turn, will vertically move the stem 128 of the air pilot valve 128a again to alter the speed of fan 140 and thus, as heretofore indicated, vary the temperature in the conversion section.

The diaphragm operated valve 118 which controls the supply of fuel to the burner 2 may also be moved as the heretofore explained variables change, so that the fuel supply may be varied as desired, it being understood that valves 135 and 136 are provided in order that either one or both of the just-referred-to means for varying the applied heat may be used.

However, the use of the just-referred-to valves and the motor controlling recirculation in connection with the diaphragm valve controlling the fuel supply is particularly advantageous in permitting a sequential control of flue gas recirculation and of the rate of firing.

As above indicated, when the relation of temperature and pressure departs from optimum conditions with, for instance, the temperature decreasing, the density in the conversion section increases and an increase in the rate of flue gas recirculation may not be sufficient to take care of the required change, wherefrom it is desirable that the variations in flue gas recirculation may be effected within the range of the change which can be effected thereby and that thereafter the fuel supply may be increased through valve 118 to provide for control outside the range of the flue gas recirculation control. After the fuel has thus been increased, it is desirable that the flue gas recirculation fan or damper should be "backed off" into the normal controllable range for such fan. The operation just referred to is defined as a sequential control of flue gas recirculation and rate of firing.

This may be accomplished by using two loading pressures from the pilot either of the two land or three land type (128a and 128b) and the control loading pressure lines may have selective valves or shut-off valves in them. The arrangement is such that a hand actuated valve in the fuel supply line would be adjusted for a given rate of charging to a maximum of, say, 75% of the fuel supply capacity and then the diaphragm regulating valve 118 would be adjusted to operate over a range of 70 to 75% of fuel capacity.

When the temperature decreases and density increases, the loading pressure will first cause an increase in rate of recirculation to its maximum and then sequentially the firing control valve 118 will pick up from its normal adjustment of about 70% of rate and carry on up to 75%. When operating in this range, the loading pressure from the same or another land of the pilot valve will at the same time cause a backing off of the rate of recirculation in proper proportion so that one may normally adjust the recirculation while the fuel is fed at the new or increased rate. It is possible that with a different rate of firing the hand control valve in the fuel line will be set so that the regulating valve 118 will operate over the range of say 80-85% of its capacity.

The particular pilot valve assemblies which are generally referred to above are shown in detail hereafter when Fig. 17 is discussed.

Referring now to Fig. 10, only one differential-head recorder is shown associated with the conversion section. In other words, differential recorder 4/16 is utilized and is so designated because it is intended to take the place of heretofore-discussed flow metering elements 4 and 16. The proper location for such a single mean-density responsive flow meter element 4/16 is ascertained by exploration of the conversion section of the particular furnace in connection with which the herein described method of control is to be used. There may be many instances where the rate of conversion is sufficiently progressive to permit the determination of the point of mean density by exploration, but it is to be understood that the invention herein described is of particular advantage because it recognizes that mean densities cannot be always so determined and provides as an alternative the determination of such mean density by use of the meters 4 and 16 as hereinbefore described.

The mean temperature is also taken at the same point at which the mean density is measured, said temperature being measured by a thermo-couple similar to that hereinbefore described associated with a potentiometer and Selsyn in the same manner as indicated previously. One of the advantages resident in the use of a single flow meter device 4/16 is the elimination of the differential mechanism 134, it being observed that but one Selsyn is required to effect the movement of the pivot point 126 of lever 125.

It will be further observed that the fan for controlling the flue gas recirculation and the damper for controlling excess air are both shown in this figure and, for purposes of illustration, the excess air control is shown as capable of utilization alternatively with the direct control of the fuel supply. The means whereby the heating is controlled are thus shown to emphasize the flexibility of control which is obtainable in connection with the present invention.

In Fig. 11 a system embodying a heated coil and a so-called reaction chamber has been illustrated. For simplicity of illustration, only two differential-head recorders are shown, one at the inlet to the coil, wherefrom the charge characteristics may be determined, and the other at the outlet of the furnace coil. These two recorders are integrated as shown to move the pivot point 126 of lever 125. For sake of simplicity, indicators which may be used in connection with said lever have been omitted, it being understood that the showing in previous figures is sufficient to illustrate the possibilities in this connection.

A reaction chamber 145 is positioned to receive the fluid after it has been heated and after it has passed through the adjustable orifice 13. At the outlet of this reaction chamber, a back-pressure control valve 146 is positioned in a fluid line 147, through which latter line the treated material is passed from the chamber into a vapor separator 148. The pressure of the fluid leaving reaction chamber 145 affects, through line 149, a Bourdon tube 150, which latter is connected to the right-hand end of the lever 125. Accordingly, the stem of pilot valve 128a is moved either in response to the change in position of the point 126, following a change in the density at the outlet of the heated section, or of the mean density therein (when such latter measurement is used), or it may be moved in response to movement of the Bourdon tube 150.

With the instrumentalities arranged as just described, it is possible to utilize the density as it affects the left-hand end of the lever 125 to establish a new back-pressure standard by movement of the valve 146 and the consequent maintenance of that pressure because of its transmission through line 149 to the Bourdon tube 150, it being observed that the air pilot 128a is connected to act upon the diaphragm of pressure valve 146.

The density at the outlet of the heated section, i. e., at 13, may vary not only because of changes in back-pressure, but also because of variations in the heat supplied to the coil, as well as for other reasons. Assume, for instance, that the density at the meter element 13 is 10 lbs./cu. ft., whereas the back-pressure at the valve 146 is 300 lbs./cu. ft. If now, through variation in heating or some other factor, the density at 13 increases to a value of 12 lbs./cu. ft., it would, in order to return this density to the optimum figure of 10 lbs./cu. ft., be necessary to relieve some of the pressure at 146; that is, it would be necessary so to vary the effect of valve 146 that the back-pressure was held at some lesser figure than 300 lbs./cu. ft. This result is accomplished when, in response to the aforedescribed change in density, the left-hand end of lever 125 is moved with subsequent control through the air pilot valve 128a on the diaphragm of valve 146 and the establishment of a new pressure standard.

If (with the arrangement of Fig. 11) water is being heated and passed to the chamber 145 (in this case usually termed a flash chamber), the heated fluid entering chamber 145 may be all liquid or a liquid-vapor mixture. Upon entering the enlarged relatively quiescent zone 145, wherein there may be a reduced pressure, a considerable percentage of the liquid may flash into vapor, the vapor then passing to other apparatus 148.

The instrumentalities as above discussed in connection with Fig. 11, whereby a constant density may be maintained at 13 or the outlet of the tube in which the fluid is heated, may also be utilized to insure a desirable heat supply in that fluid.

Accordingly, one particular field in which the herein described invention is particularly useful is in connection with a fluid treating system wherein the fluid, after being treated in one zone, for instance in a heating coil, then passes into another zone, for example, an enlargement wherein the velocity is reduced without material change in pressure, such for instance as a chamber or an enlarged tube section, and wherein the fluid may or may not be subject to additional heat or treatment from an external source. The density of a fluid at the outlet of any zone wherein the fluid has been treated is a function of the change in heat content or of the total heat of that fluid irrespective of whether such heat is latent or sensible, other variables remaining constant.

Such heat supply is of particular importance when the fluid is to be thereafter passed through a reaction chamber wherein certain phenomena are secured wholly as a result of the heat already contained in that fluid and without having any additional heat imparted thereto. Such control is also desirable when the treating coil does not feed into a reaction chamber; that is, when the heated fluid is passed directly to a vapor separator. Under the latter conditions, a knowledge of the density at the outlet of the conversion section, such as 15 of Fig. 8, permits an associated control of the total heat which is in the fluid as the latter passes into a vapor separator; in other words, when the reaction chamber shown in Fig. 11 is omitted.

It has been found, for instance, that this control is of particular value when the residuum from the vapor separator is withdrawn to a vacuum unit for further treatment because even under these conditions it is possible closely to control the heat which governs the distillation effected in the vapor separator. Under either of the last-discussed conditions the control as to pressure would be as shown in Fig. 11a.

In some industries, following the terminology of the petroleum industry, the second zone is termed a "reaction" chamber wherein, without further treatment, as for instance without further heat being imparted to the fluid, the latter undergoes a change of condition. It has always been difficult in the past, because of the lack of some control element whereby what was occurring could be observed as "news rather than history", so to treat, i. e., so to apply heat to a fluid in a treating zone (such as a heating section) that optimum operating conditions would exist in another zone to which the fluid—after being treated—is passed, such for instance as the just described enlarged zone, whether the latter is a "reaction" chamber or merely a section in which the tubing is of enlarged diameter as compared with the diameter of the heating section tubing.

Another form of fluid treating apparatus to which the present invention is applicable is one wherein, after the fluid has been treated in a zone, such as a heating coil, it usually passes to a coil of enlarged diameter. Such apparatus and system differs from the hereinbefore described reaction chamber system in that heat is imparted to the fluid from an external source. For example, in Fig. 8 the fluid leaving coil 14 passes into coil 15 in which latter additional heat is imparted to the fluid and wherein the device 4—12 is utilized in the determination of density of the fluid leaving the zone 14. In some cases a pipe in a section such as 15 may be of greater diameter than a pipe in section 14, and in other cases it may be the same.

It will be understood, therefore, that through the instrumentality of the hereinbefore described invention as applied in the present instance, one may use the determined density in arriving at the total heat or change in heat in a fluid irrespective of the character of that heat and utilize such determination in controlling the operation of the fluid treating system, either so far as causing the heat to exist in the treated fluid or thereafter utilizing the heat which does exist therein.

In the above discussion and elsewhere herein, the term "latent heat" is used to mean that heat absorbed or liberated, required to maintain the substance or substances undergoing physical and/or chemical change at a constant temperature. Obviously "latent heat" does not include the heat necessary to maintain a substance at a constant temperature through heat interchanged with other substances, but is "heats" commonly exemplified as heat of cracking (the reaction of which is generally considered endothermic); heat of polymerization (the reaction of which is generally considered exothermic); heat of vaporization, transition, fusion, sublimation, reaction, solution, absorption, and the like.

Attention is directed to Fig. 11b comprising a plot of relations determined to exist between density in pounds per cubic foot and the B. t. u. per cubic foot for several representative fluids. Curve A treats of water in its liquid and vapor phases. Curve B treats of diphenyl in its liquid and vapor phases. Curve C is plotted from published information of an oil at 16.3° A. P. I. (above 60° F.) representative of the average charging stock used in tests forming the basis of curves D and E.

The charging stock represented by curve C was supplied to the inlet of a heating zone such as 14 of Fig. 8, thence passed through a density meter 4 and to a conversion zone 15 and then through a density meter 16. The determined density by the meter 4 of the fluid leaving the heating zone 14 is plotted as curve D relative to observed and calculated test values of heat content in B. t. u. per cubic foot. Similarly, the density of the fluid leaving the conversion zone 15 as determined by the meter 16 is plotted as curve E relative to test determinations of heat content in B. t. u. per cubic foot.

The fact that curves D and E lie in spaced parallelism clearly illustrates the effect of the heat of cracking over vaporization. The general trend of curves D and E clearly indicates within limits of experimental data (obtainable within the limits of the apparatus now available) the tendency to join up with curve C to a general total shape.

From the determinations and conclusions disclosed herein will be appreciated the wide application and value of the determination and utilization of density of a flowing fluid undergoing treatment in the exploration of fluid treatment processes and the control thereof.

In Fig. 12 controls operating to maintain an optimum time of detention or treatment are employed; that is, the velocity of the fluid through the conversion section is so governed that the time the fluid is undergoing treatment is desirably controlled. In this figure a density responsive control is utilized to control either the heat supply or the rate of charge, or both. In this connection, the formula will be recalled:

$$T = \frac{\text{vol.} \times md}{W}$$

T = time of a particle through the conversion section.
Vol. is fixed volume of the tube in the conversion section.
$md$ is the mean density through this section.
W is the rate of flow of the charge.

In this formula, volume is fixed and unchangeable while the two variables are mean density and rate of flow of the charge. If either of the variables change in value then the time of detention will change. Assuming that mean density may change for other reasons, as, for example, heating, temperature, pressure, etc., then the rate of charge may be controlled to return the time of detention to the desired value.

The system illustrated in this Fig. 12 is quite similar to that shown in Fig. 9 with certain exceptions which give effect to the considerations above outlined. It will be noted that the differential heads are so combined that the differential 134 is moved in accordance therewith through the instrumentality of the Selsyns which are, so far as this measurement is concerned, arranged in the same manner in Fig. 12 as they are in Fig. 9 in connection with which latter figure these instrumentalities have been described in detail. However, in addition, a cam 151 is actuated in accordance with rate of flow whence Selsyn 152 has one field positioned in accordance with the log of the mean density (which is transmitted from differential 134) while the other half or field is positioned in accordance with the log of the weight flow as transmitted from cam 151.

It will be noted that the output arm from differential 134 (the mean density figure) may be adjusted or corrected by a manually operated means 153 to compensate for changes in the charge.

The correction introduced by the manipulation of element 153 compensates for changes in the charge density and is required because said charge density is used in arriving at the inlet density, the outlet density, and the mean density of the conversion section. Incidentally, it should be noted that the correction introduced by 153 is distinguished (in the final determination of mean density) from that in which the A. P. I. gravity value is utilized to make up what is hereinafter referred to as "stock factor" and which latter is described as a control basis.

The resultant movement of Selsyn 152 is transmitted through a gear box 154, which latter not only incorporates an antilog cam, but also such gears as are necessary to incorporate the multiplication by volume, so that a recording pen 155 and an air pilot valve 156 are moved proportionally to the time of detention. A pressure line 157 transmits changes as caused by the movement of the stem of air pilot valve 156 either through valve 136 to vary the fuel supply, or through valve 158 to move a diaphragm valve 159, the latter controlling the amount of fluid which is admitted to the treating coil.

In Fig. 13 the system of Fig. 12 is further amplified to bring in the "time-temperature" relation, and there is shown a means for determining the temperature at the inlet and outlet of the conversion section with subsequent determination mechanically of the mean temperature in the conversion section. The mean temperature is obtained by transmitting the temperature 151 at the inlet of coil 15 and the temperature 150 at the outlet of said coil to Bourdon tubes at either end of a beam 160. Such mechanically obtained mean temperature is then interrelated, through the two links 161 and 162 at either end of beam 163, with the time value determined as shown in Fig. 12 so to actuate the pilot 156, by movement of stem 156', as to desirably maintain the rate of charge and/or of the firing. Those parts which have been illustrated in Fig. 12 are not, for sake of simplicity, here duplicated, it being understood that the lever 155 of Fig. 12, which in the latter figure is moved by member 154 in response to the time, has the mean temperature determination combined therewith so that its combined movement, as shown in Fig. 13, is used to actuate the stem 156' of the air pilot valve 156 through line 157 to control the firing and/or rate of charge as diagrammatically shown, in connection with "yield per pass" (for specific stock factor for which calibrated). The pointer attached to 155 reads "time", that secured to 161 reads "mean temperature of conversion section", and that secured to the stem 156' of valve 156 reads "yield per pass" (for specific stock factor for which calibrated).

The comparison of gasoline yield per pass with the density readings may be understood in connection with an explanation of the manner of computing yield per pass from known density determinations; that is, as indicating the effect of changes in density on yield per pass.

Attention is directed to the herein disclosed novel equation for arriving at yield per pass, knowing the relationship of time and temperature (for a constant quality of charging stock):

$$P = \frac{1}{\frac{1}{Kt2\left(\frac{T-850}{18}\right)} + C} \times 100$$

Where:

P = weight % gasoline + gas per pass.
K = 0.0072 as constant.
t = time of treatment in minutes.
T = mean conversion temperature in degrees F.
C = 2.5 a constant such that $$1 - C\frac{P}{100}$$

equals the equivalent amount of original charging stock remaining after P per cent of gasoline + gas has been formed.

The figures observed in three tests, together with the results of substituting these values in the above equation and solving the same, are as follows:

|  | Number 1 | Number 2 | Number 3 |
|---|---|---|---|
| Time of taking reading, p. m. | 5:00 | 7:45 | 10:20 |
| Inlet density | 27.3 | 22.1 | 29.5 |
| Outlet density | 8.3 | 6.6 | 12.0 |
| Mean density | 17.8 | 14.3 | 20.75 |
| Time (minutes) | 1.1 | 0.87 | 1.275 |
| Temperature—in (°F.) | 901 | 918 | 887 |
| Temperature—out | 922 | 940 | 912 |
| Temperature—mean | 912 | 929 | 900 |
| Weight percent per pass 380 E. P. gasoline plus gas (calculated) | 7.1 | 9.9 | 5.45 |

This operating data shows the changes in conditions resulting from a change in rate of firing sufficient to vary the density at the conversion section outlet as indicated. Inasmuch as the figures shown in the above recordation of the operating conditions,—at the three times the observations and tabulations were made,—were all arrived at in a period of less than five hours, it follows that an operator can vary the degree of conversion per pass when he has the added information of time of treatment as a result of density determinations for a given stock.

The just-discussed control involves a comparison of density readings with yield per pass without giving effect to variations in the characteristics (hereinafter called "stock factor") of the fluid passing through the system, which latter factor may, however, if desired, within the invention herein disclosed, be automatically given weight in the practice of said invention.

Fig. 14 accordingly illustrates a further development of the system shown in Figs. 12 and 13 and incorporates a control involving the varying characteristics of the fluid undergoing treatment. Here, again, only those added operating instrumentalities are illustrated which are necessary to indicate the methods of control which are available in connection with the Fig. 14 showing, in addition to those indicated in the Figs. 12 and 13 showing. In the system outlined in Fig. 14, provision is made whereby the above-described yield per pass relation may be combined with, or modified by, what applicant has designated as the "stock factor" with the final integration of the moving parts to show "yield per pass (corrected for stock factor)," which latter may not be only indicated as a quantitative figure but which may also be utilized as a base to control either the rate of charge, through valve 159, or the amount of fuel which is supplied through valve 118.

A suitable "stock factor correction" involves a correlation of values reflective of the average paraffinicity and average molecular weight of the cracking stock. If desired, the iodine number of a given stock may be used as a measure of the paraffinicity, but the aniline number is generally more convenient to employ in practice. Likewise, the average boiling point could be utilized as a measure of the average molecular weight. However, the A. P. I. gravity serves more conveniently for this purpose since this property is readily determined. Accordingly, the product of the aniline number and the A. P. I. gravity constitutes a preferred index of crackability of the given stock, and is useful in introducing a "stock factor correction" into the above mentioned equation.

For stocks of varying qualities, and consequently varying degrees of crackability, the following empirical formula may be used for per cent yield per pass:

$$P = \frac{1}{\frac{1}{KSt \cdot 2^{(T-850)/116}} + C} \times 100$$

where $P$ = weight per cent gasoline plus gas per pass;
$K = 0.025$;

$$S = 0.22 + \left(\frac{\text{Aniline No.} \times {}^\circ\text{A.P.I.}}{3300}\right)^2$$

$t$ = time of treatment in minutes;
$T$ = mean conversion temperature in $^\circ$F., and $$C = \sqrt[3.5]{\frac{10}{S}}$$

The foregoing formula expresses yield per pass corrected for stock factor. The results, however, are expressed in powers of 2, which may be less convenient to employ than powers of 10. Furthermore, the formula requires the use of the complex factor S in two different places. Accordingly, it may be found more convenient to employ the following formula wherein the results are expressed directly in powers of 10, the aniline number, and the A. P. I. gravity:

$$P = \left[\frac{1}{W + \frac{1}{t \cdot 10^{(T-850)/90}}} + a(NG-b)\right] \times 100$$

where:

$W = 0.025$;
$t$ = time of treatment in minutes;
$T$ = mean conversion temperature in $^\circ$F.;
$a = 8.9/1000$;
$N$ = aniline number;
$G$ = A. P. I. gravity, and
$b = 1400$.

The equation for the yield per pass "corrected for stock factor" is outlined only briefly above. For a more detailed discussion of this formula reference should be made to the copending application of Rude and Read, Serial No. 152,861, filed July 9, 1937.

For the purposes of this application, however, it should be noted that a determination of the stock factor will include consideration of such variables in the charge as the fluid to be treated, as the specific gravity, the anilin number, the iodine number, refractory index, and many other factors. Some of these factors are now being employed by applicant commercially to determine or produce a "stock factor" figure which is combined with the figures hereinbefore outlined so to evaluate another variable that it may be utilized in the control of fluid conversion processes. At the present time, the adjustment of the moving instrumentalities to compensate for stock factor variations is accomplished through hand-actuated compensation, and it will further be understood that, for purposes of illustration, it has here been assumed that the values of specific gravity, anilin number, and the other stock factor modifying variables are determined by sampling or similar methods. But it must be understood that such a discussion is for purposes of illustration only, because there are available automatic means for obtaining these various figures, and it is only necessary so to combine these automatic determinations of the attributes of the fluid being charged that the stock factor compensation is automatically added to the other values hereinbefore indicated and thereafter enters into the automatic control as indicated.

Accordingly, this being true, Fig. 14 shows diagrammatically the combination of such automatically determined stock factor with the other values to produce a basis of control which includes this feature. The above is believed an ample disclosure of the method which is hereinafter claimed and which incorporates the stock factor figure in the control. As a diagrammatic showing of how the same may be incorporated in the instrumentalities hereinbefore disclosed, Fig. 14 shows a moving member 164 so connected to beam 163 that the yield per pass relation of the latter may be modified by a stock factor relation imposed thereupon. This is accomplished by connecting the floating point on beam 163 to a similar float point on beam 164 through link 156'. The stock factor correction is applied, when manual compensation is desirable, by operation of stock factor element 164', comprising an adjustment of the pivot of 164 in accordance with "stock factor," or said pivot point of beam 164 may be moved in similar fashion by causing the automatically determined "stock factor" to vary the position of the same. This stock factor adjustment element 164' comprises means for varying the pivot point of beam 164, said point being moved as indicated and the variation being readable on a dial as shown, so that one may at any given time observe what stock factor is being used to obtain the final result or which is being used in the hereinclaimed control.

The just-referred-to quantities are then combined by transferring the movement of beam 164 through link 165 to beam 166, and the said lever 166 accordingly moves in response to a "yield per pass" figure, as modified by the stock factor compensation, which "yield per pass (corrected for stock factor)" may be recorded or indicated by a needle fixed to the beam 166. The latter beam 166 also moves stem 167 of an air pilot valve 168 which, through pressure line 157, may then operate either the valve 159 controlling the charge or the valve 118 controlling the fuel supply.

It will, of course, be understood that some method which contemplates substitution of actual weight measurement of the fluid entering the conversion section and, accordingly, eliminates the use of a differential head flow metering measuring device at said entrance would nevertheless still be employing the broad implications of the present invention. Under some circumstances those in the industries affected may find it more convenient to gauge the fluid flowing from a tank and, knowing the specific gravity or density of that fluid, utilize a flow metering device at the outlet of the conversion section to realize the essential advantages of the present invention.

A diagrammatic showing of such latter practice is set out in Fig. 15, wherein a charge tank 169 has a float 170 operating an indicator 171 relative to an index along the outside of the tank so that one may periodically observe the latter to determine the rate of flow of charge per hour or during some other time unit. A constant speed pump 172 is used to force the charge through the coil wherein the treatment takes place. It will, of course, be understood that the constant speed pump is used illustratively, it being only necessary that a pump be used whose control does not enter into the present operation.

Moreover, it will not usually be necessary to determine the specific gravity or density of the fluid as it enters the coil, but in case it is desirable to measure such property for any one tank charge, a sampling pipe 173 is shown.

The differential head flow metering device shown at the outlet of the coil is similar to that heretofore described and is positioned at the point indicated because of the presumed change in density effected by the treatment of the fluid in the coil.

Accordingly, three variables are utilized in the system just described, namely, tank gauging, specific gravity or density determination, and the differential head measurement at the outlet of the coil; these three factors are employed in determining the density of the fluid at the outlet of the coil.

The various instrumentalities whereby the said coil outlet density is utilized as a control basis are not included, in order to avoid complication. It will, however, be understood that a system in which tank gauging is employed may be operated in accordance with all the control instrumentalities which have heretofore been described, and the failure to illustrate each of the latter specifically in a system of this character is not intended to infer that they are not there usable.

Of course, in utilizing the hereinbefore described formula to this so-called tank gauging process the $$d_2 = d_1 \times \frac{h_1}{h_2}$$

is not directly applied, but rather the actual weight rate of flow of the charge is incorporated in a formula for use herein. That is:

$$d_2 = K_1 \frac{W^2}{h_2}$$

where $K_1$ = a constant.

$W$ is the weight rate of charge, determined by tank gauging and density or specific gravity.

The operation, of course, is visual and manual in that the readings and samples are taken and then the formula is worked through manually to determine the density $d_2$ of the outflowing fluid.

It has heretofore been indicated in the discussion of Figs. 4a, 4b, and 4c that under some conditions the exploratory phase of the present invention may be advantageously employed, and it should be here noted that such phase may be utilized in connection with the system shown in Fig. 15.

In order to illustrate the wide applicability of the present invention to the chemical process industries generally, reference is made to the attached Fig. 16 which is an amplification of the system diagrammatically shown in Fig. 2b. In Fig. 16 the process which it is desired to control involves the bringing together of two reactants. A preferred method of controlling such a process is as follows: One of the reactants, which may be either a liquid or a gas (or a solid with the arrangement as hereinafter described), is admitted into the system through the orifice 5a, and the differential pressure across this orifice is transmitted to the flow meter 174. The value of the differential head across orifice 5a positions the arm 174a and is transmitted through Selsyn 174a' to an illustratively shown receiving and integrating element 176.

Through the medium of the needle lever arm 174a, the linkage 174b, and the adjustable fulcrum 174c, the said arm actuates through pilot 174d the position of valve 175 to any desired predetermined rate of flow which may be adjusted by means of the aforesaid adjustable fulcrum. By such an arrangement the rate of flow of one of the reactants entering the system is held at a constant but adjustable rate. The position of the fulcrum 174c may, if desired, be varied automatically in response to selected conditions in the various parts of the system.

The other chemical stock, which may likewise be either a liquid or a gas, is admitted to the system through the orifice 5. The rate of flow through this orifice 5 creates a pressure differential which is indicated by the flow meter 3, the indicating arm of which is connected through a transmitting Selsyn 3a to a combination receiving and integrating element 176.

The two reactants are commingled in the reaction chamber or coil 177 which is submerged in a suitable heat-exchange medium in tank 178, which latter may consist, for example, of a cooling medium for absorbing the heat of reaction and for maintaining the commingled reactants at a desirable optimum temperature. The product of the reaction passes through the adjustable orifice 179, the value of the differential head across the latter being transmitted through elements 180 and 181, in the manner indicated, and thence to the hereinbefore-referred-to element 176, where the resultant differential heads of the sending elements 174a' and 3a are added together to produce total weight input, which latter is in turn combined with the differential head from 181 to obtain a variable corresponding to the density of the product delivered at 179, which variable is indicated by the movement of the indicator 182.

The temperature of the heat exchange medium surrounding the coil 177, and concurrently the temperature of the product leaving said reaction chamber or coil, are controlled by means of the adjustable valve 183 which regulates the rate of flow of the heat exchange medium through the heat exchange system. This valve is adjusted through the medium of the relay 184 selectively responsive either to the temperature of the effluent product, or to the density thereof, or both. Temperature control is accomplished by inserting a temperature-responsive element 185 in the exit line from the coil 177, which element 185 positions the pilot valve 186.

Another pilot valve 187 is regulated by the density of the effluent product through a connection of said pilot with the density indicator 182. The air pressure from the two pilot valves 186 and 187 is combinatively effective in the relay 184 to control the movement of the heat-exchange medium control valve 183 to regulate the flow therethrough.

The pilot valve 187 is also connected to the charge valve 188 to vary the rate of flow of one of the reactants, thereby to maintain an optimum density of the effluent product leaving coil 177.

The system which is generally described with reference to Fig. 16 may be employed in a large number of processes, particularly those of a chemical nature. In general, it is applicable to any process, whether chemical or physical, or both, so long as the total input of materials or reactants into the system may be ascertained and the product or products of the process are in a flowable condition under the operating conditions which obtain at the point where it is desired to ascertain the density.

Thus the system is not limited to those which involve only one or two charging materials, for any number of materials or reactants may be charged into the system. Furthermore, these materials or reactants may be charged into the system in any form or state or phase, including the liquid phase, the gaseous or vapor phase, the solid state, or any combination of states or phases, such as a mixed vapor-solid phase or a mixed liquid-vapor state, and the like.

In the individual cases the means employed to introduce the materials or reactants may vary widely, depending partly upon the physical state and characteristics of the reactants and partly on other factors, such as the operator's choice, and the like. Thus in individual cases involving liquids, gases, or vapors, or mixtures thereof, means substantially as illustrated above or equivalents thereof may prove satisfactory. In certain instances, however, it may be preferable to employ, in lieu of orifice meters, a positive displacement pump and displacement meter or blow case, by which means a definite and measured quantity of the fluid may be introduced into the system at a determinable rate. In still other instances, as where the charging materials or reactants consist either partly or entirely of solids, other means may be used to charge at a determinable rate, for example, screw conveyors, dust injectors, and the like. So long as the rate of charge of all the reactants entering the system is determined and the product or products exist in the fluid or flowable state as the materials pass the point at which it is desired to determine the density, the foregoing process may be employed, the instrumentalities for charging being selected to meet the individual requirements of the various materials or reactants introduced into the system.

The application of the present invention to a process involving a plurality of reactants which exist in different states is diagrammatically shown in Fig. 17. As indicated in this flow sheet, a solid S, a liquid L and a gas G are introduced into a suitable reaction vessel or chamber 189.

The reaction produces a flowable main product MP and a by-product BP, the rate of formation of which latter can be ascertained regardless of the state or phase of said by-product.

In order to determine the in situ density of the main product MP, it is necessary to ascertain the weight rate flow of the material through the metering element 190 which may consist of a fluid meter, for example. This weight rate through the element 190 is equal the sum of the weight rates of input of the individual reactants S, L, and G through the measuring instrumentalities $S_1$, $L_1$, and $G_1$ less the weight rate at which the by-product BP leaves the system through the measuring element 191.

In the operation just described the "by-product which leaves the system through the measuring element 191" is illustratively indicated as a fluid, but even though this by-product is formed as a solid, the amount of the latter may be measured and the proper calculation made, and by manual setting of an instrument at the point 191—191' the operation outlined may be similarly expeditiously carried out.

The solid reactant is charged into the system, for example, in pulverulent form, by means of the continuous charging hopper diagrammatically represented by 192, the rate of charging being variable by the operation of the control means 193 which in the diagram is regulated by fluid pressure. The liquid is charged into the system through the measuring element $L_1$, the rate being controlled by the valve 194 which is regulated by fluid pressure from the control mechanisms 194'.

The gas is introduced into the system through the metering element $G_1$, the rate being controlled by the valve 195 which is regulated in like manner by the control mechanism 196. The value of the rates of charge of the reactants S, L, and G is transmitted to the receiving and controlling element 197. The value of the rate at which the by-product is separated from the main product is transmitted from the transmitting element 191' to the receiving and controlling element 197. If, as above indicated, the by-product is in solid form, the just indicated "rate at which the by-product is separated from the main product" may be utilized in the transmitting element by manual setting, or, if desired, an instrument responsive to the rate at which the said solid by-product is separated may be suitably utilized to transmit a desired figure to the receiving and controlling element 197.

The value of the variable bearing a functional relation to the density and weight rate of the material passing through the element 190 is transmitted through the agency of the sending element 190' to the receiving and controlling element 197. The latter element may consist of any of the means herein described for determining the density of the effluent main product at point 190. When the density of the effluent main product varies from the optimum conditions, the means 193 regulating the rate of charge of the solid reactant is reset in order to vary the rate of charge and thereby automatically readjust the ratio whereby a product of desired density may be produced.

The system generally described above with reference to Fig. 17 is shown to illustrate the extreme flexibility of the present invention. If desired, all of the reactants may be introduced in solid state by making the necessary changes in the charging instrumentalities. The system substantially as illustrated may, however, find utility in various chemical processes, for example, in the production of sodium nitrite from solid sodium bicarbonate S, liquid water L and gaseous oxides of nitrogen G; the by-product BP in this case consisting of tail gases, and the main product MP consisting of an aqueous solution of sodium nitrite. The variations in the apparatus necessary to adapt the system to any given process will be apparent to anyone skilled in the art, in view of the foregoing examples, after the principles of the present invention have been fully mastered.

As a specific example of a process which may be carried out according to the general method described above with respect to Fig. 16, the preparation of ethylene dichloride may be mentioned. The properties of the various reactants and reaction product are indicated in the appended table:

|  | Name | Symbol | Density at atmos. press. and 60° F. | Boiling point |
|---|---|---|---|---|
|  |  |  |  | °C. |
| Stock charged through orifice No. 5 | Ethylene (gas) | $C_2H_4$ | 0.0724 | −103.8 |
| Stock charged through orifice No. 5a | Chlorine (gas) | $Cl_2$ | 0.1914 | −34.6 |
| Product at orifice No. 179 | Ethylene dichloride (liquid) | $ClCH_2CH_2Cl$ | 78.3 | 83.5 |

In this process two gases (ethylene and chlorine) are mixed together at a temperature of approximately 20° below zero, centigrade, at a pressure ranging from 30 to 100 pounds, producing ethylene dichloride, which is liquid at atmospheric temperature and has a density of approximately 78 pounds per cubic foot. The preferred method of controlling this process is as follows:

The chlorine gas is admitted into the system through one line 1a and the differential pressure through the metering device in this line is transmitted to actuate the position of valve 175 to any predetermined rate of flow. The other chemical stock (ethylene) is admitted to the process through the other line 1 and the rate of flow through the orifice in the latter line creates the hereinbefore described pressure differential which is transmitted to the receiver 176. These two raw stocks are commingled in coil 177 which is submerged in a suitable cooling medium 178 to absorb the heat of reaction and maintain the commingled stocks at a temperature of approximately 20° below zero, centigrade, under which conditions the raw stocks are chemically combined to produce ethylene dichloride. The ethylene dichloride passes through adjustable orifice 179, and the rate of flow through this orifice is transmitted to the same receiving element 176 where the resultant differential heads of the sending elements in the ethylene and chlorine lines (the latter as affected by the fixed adjustment of the fulcrum 174c) are combined to give the density at adjustable orifice 179. Indicator 174a is thus moved and thereby through the air actuated device 187 positions valve 188 to control the rate of flow of ethylene with consequent control of the density of the product at orifice 179.

As further examples of processes which may be carried out in the manner above described, the following may be mentioned for purposes of illustration: The combustion of sulfur in air to produce sulfur dioxide; the combustion of phosphorous in air to produce phosphorous pentoxide; the catalytic conversion of sulfur dioxide to sulfur trioxide with an oxygen-containing gas; the combustion of ammonia with an oxygen-containing gas; the conversion of the lower oxides of nitrogen to the higher oxides of nitrogen with an oxygen-containing gas; the production of anilin by the interaction of chlorobenzene and ammonia in the presence of a suitable catalyst; the production of phenol from the interaction of water and chlorobenzene in the presence of a suitable catalyst; the chlorination of hydrocarbons; the catalytic vapor phase oxidation of alcohols to aldehydes by means of air in the presence of a catalyst; the combustion of liquid, gaseous or solid hydrocarbons such as producer gas, petroleum and coal by means of an oxygen-containing gas; the catalytic synthesis of ammonia from nitrogen and hydrogen; the catalytic synthesis of acetaldehyde from acetylene and water; the catalytic polymerization of lower boiling hydrocarbons, as in the formation of "polymer gasoline"; and many other processes which will be readily apparent to anyone skilled in the art, in view of the foregoing illustrative examples and after he shall have come to a knowledge of this present invention.

The system described is of such wide utility that practically any continuous method of operation of a chemical process may be subjected to control in the manner illustrated. Many processes which are now carried out according to batch methods may be readily converted into continuous processes because of the control made possible by means of the present invention.

In the individual applications it may be necessary, in some instances, to insert a large section or reaction chamber in the line 1b (in place of coil 177) in order to provide, for example, a suitable catalyst chamber which may be necessary for a particular chemical reaction. Likewise, it may be necessary to employ heating means at some point during the course of the reaction. Furthermore, adjustable orifice 179 may be replaced in certain instances by a fixed orifice at this location. However, in most chemical processes an adjustable orifice admits of a desirable flexibility, particularly during the step of bringing the process on stream, which renders the fixed orifice installation less desirable.

Many chemical processes are now conducted in the batch operations which are slow and hazardous and involve expensive equipment due to the fact that special alloys are frequently necessary to avoid corrosion. It will be apparent that the foregoing method and apparatus render it possible to make many such processes continuous and automatic, not only with a material reduction in hazard and in the expense of equipment installation, but also with an accelerated and continuous production.

The structural features of the orifices and air pilot valves have been hereinbefore referred to only generally and it may be of value, even though the precise structure of these elements is not claimed herein, briefly to describe the same so that those skilled in the art may be read such description in connection with the various applied uses thereof hereinbefore emphasized.

Figure 18:
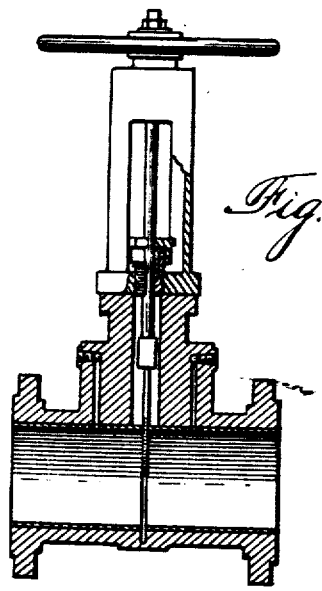

In Fig. 18 the adjustable orifice which has been frequently hereinbefore referred to is shown in partial elevational cross section in order that those skilled in the art may understand the structural features which permit the use of such element in the manner hereinbefore emphasized.

If it is desired to study in greater detail the heretofore-referred-to adjustable orifices and the associated metering elements, attention is directed to Bulletin No. 14 of the Bailey Meter Company wherein the orifice meters are discussed and to Bulletin No. 300 issued by the same company, wherein the manometer or differential-head indicator is disclosed.

One may ask whether or not, having given certain constants in connection with such segmental orifices, such constants are applicable when a fluid passing the orifice is subject to a condition change as hereinbefore pointed out. Experiments undertaken by applicant at the plant of his assignee demonstrate that a segmental orifice is just as useful in metering of "fluid", when the latter term is used as broadly as it is herein, as when such an orifice is used with liquid only, the latter being of sufficiently low temperature to permit the specific gravities or densities thereof to have been noted in published tables.

In the just-referred-to test the charge rate and the density at the inlet of the conversion section (this demonstration in connection with such a section being, of course, illustrative only because the tests were carried on in a cracking equipment) were maintained constant while several settings of the segmental orifice were used in the instrument at the outlet of the conversion section. The chart readings, the depth of the segmental setting, and the calculated density are as follows:

| Chart readings | Segmental settings | Density at conversion section outlet |
|---|---|---|
| | | #/cu. ft. |
| 40.5 | .9 | 5.38 |
| 48 | 1.1 | 5.35 |
| 55 | 1.3 | 5.37 |
| 63 | 1.5 | 5.36 |
| 71.5 | 1.7 | 5.37 |
| 82 | 1.9 | 5.31 |
| 94 | 2.1 | 5.34 |

It will be observed that, for all of the settings from .9 inch to and including 2.1 inches, the density reading (the weight per cubic foot of fluid passing the orifice) is substantially the same. Accordingly, the constants used are equally as applicable when the fluid passing through applicant's apparatus is metered as those constants are when the liquid with which the meter manufacturer calibrated the orifice is metered.

Figure 19:
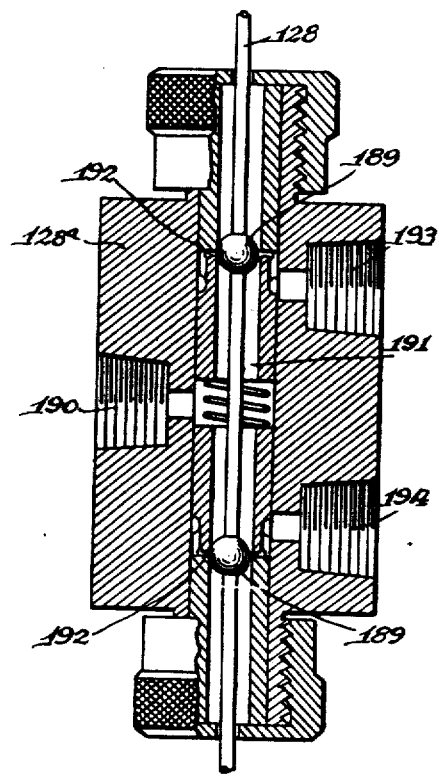

Fig. 19 is an elevational sectional view of the operating portions of a standard pilot valve, it being understood that the stem of this valve is that which has been heretofore referred to in the various operations, the first reference thereto, for instance, being at 128, and accordingly this latter reference figure is used at this point to associate this showing with the general reference heretofore made to air valves. The stem in question is moved vertically or rather its position vertically is determined in response to certain variables or relations of certain variables as shown diagrammatically in several of the preceding figures.

The stem 128 carries two enlargements or lands 189 having a very small clearance with respect to the interior of the sleeve sections of the valve. Air under pressure (entering through the opening 190) is admitted to the space 191 around the stem 128 and between the lands 189—189. These lands are, in turn, spaced relatively to openings 192 which communicate with outlets 193 and 194.

There is a continuous bleed of air past the lands 189 from the space 191 to atmosphere, this bleed serving to lubricate and center the lands within the sleeve sections so that there is little, if any, frictional resistance to the axial movement of the stem and its associated lands.

With an arrangement such as shown in Fig. 19, a movement upwardly of the stem 128 causes a pressure impulse to pass through outlet 192; that is, the pressure supplied through 190 is transmitted to whatever pressure responsive element is attached to 193, with the resultant operation of whatever device is governed by the pressure transmitted through the opening 193. If, on the other hand, the stem moves downwardly, the pressure at that point gradually decreases and correspondingly with the pressure which is transmitted through the opening 194. It is not deemed necessary here to enlarge on the air pilot valve just referred to because it is fully disclosed and claimed in the United States Patent No. 2,054,464 of Clarence Johnson.

Figure 20:
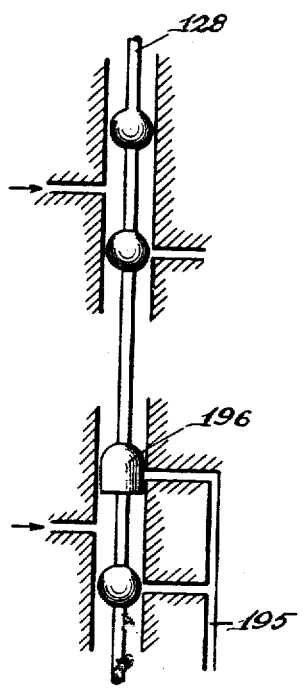

In some of the preceding figures, particularly Fig. 9, methods have been described (for instance, the double air pilot device 128a and 128b in that figure) which require operating instrumentalities having more than two lands to effect the desired controls. Fig. 20 illustrates how the air valve 128a of Fig. 19 may be modified to secure such desired compound control.

A total of four lands are spaced along the stem 128. Air under pressure is available as indicated by the arrows. The uppermost pair of lands form an assembly in connection with the positioning of a movable element, for instance, the fuel control valve 118 (Fig. 9). Of these two lands, the lowermost one controls the pressure available at the diaphragm valve 118 while the uppermost land is merely to make available the air pressure being controlled by the lowermost land.

Of the lower assembly of lands the conduit 195 leads to the diaphragm actuator 135 (Fig. 9) and is so arranged that with continued downward move of the stem 128 the pressure in the pipe 195 gradually builds up to a maximum and then decreases as the land 196 allows some of said pressure to bleed to the atmosphere.

The operation is as explained in the previous discussion of the above-referred-to figures, that for a continued downward movement of the stem 128 the fuel is increased over a total range of, say, 70–75% of its maximum capacity. The recirculation is increased up to a certain point of fuel supply and then is decreased while the fuel continues to increase. The arrangement and spacing of the lands of the pilot in Fig. 20 can, of course, be varied to meet desirable sequential operation.

Furthermore, throughout the foregoing discussion the description of the use of orifice meters at the indicated points has been emphasized as illustrative only, and it has been indicated that other equivalent means may be substituted at the points where the orifice meters are indicated. It is accordingly deemed wise briefly to illustrate such equivalent means and the manner of their inclusion in a system and operation of the character hereinbefore described. Accordingly, in Figs. 21 and 22 the use of displacement or volumetric-type meters are diagrammatically illustrated, sufficient of the instrumentalities being shown fully to acquaint those skilled in the art with the manner of employing such displacement meters, it being observed that the same are illustrated generally in connection with a showing quite similar to that of Fig. 5.

Figures 21, 22:
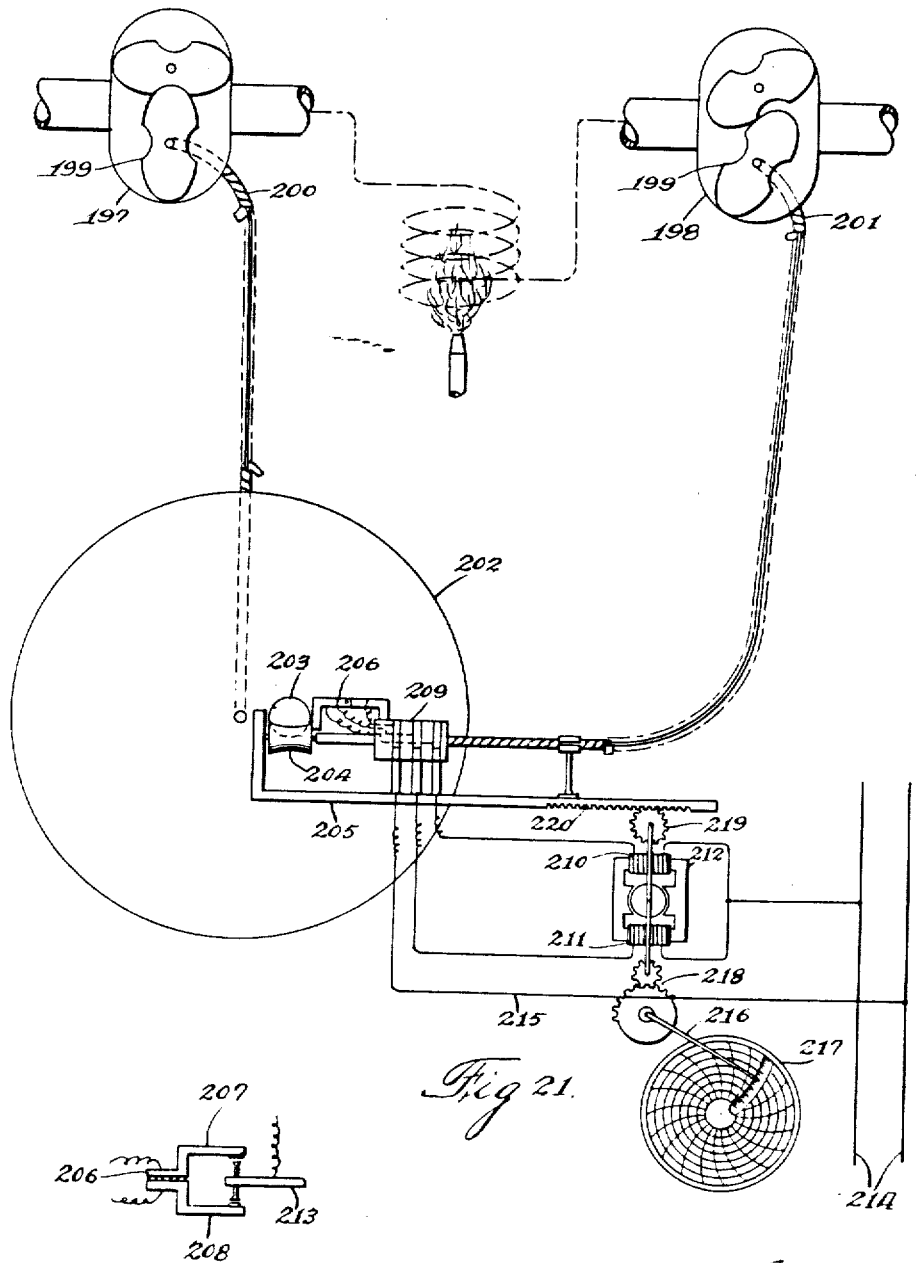

In Fig. 21 the volumetric or displacement type of flow meter 197 is located in the conduit 1 ahead of the heating means 2, while a similar flow meter 198 is located after the flowing fluid has been subjected to heating or to other treatment. This type of flow-metering element is more particularly disclosed and claimed in the copending application of Raymond D. Junkins, Serial No. 152,858, filed July 9, 1937.

As known, the total volume of fluid passing through a conduit in a given length of time is conveniently and accurately measured by positive displacement meters which have as a primary element a chamber or chambers through which the fluid passes in successive isolated quantities or volumes. These quantities may be separated from the stream and isolated by alternate filling and emptying of containers of known capacity and fluid cannot pass through without actuating the primary device. The secondary element of such a meter usually is a counter with suitably graduated dials for indicating the total quantity that has passed through the meter up to the time of reading. In Fig. 21, however, the rotatable shaft which normally actuates such a counter is herein adapted to drive or position the mechanism which functions to determine density of the fluid.

The primary elements 197 and 198 which are inserted in the conduit 1 each have complementary rotatable members 199 which are mounted for rotation upon shaft centers in such a manner as to be in sealing contact with the inner wall of the meter casing and with each other. Thus, an effective seal is provided across the conduit 1 at device 197 and at device 198. However, inasmuch as the elements 199 are rotatable, pressure of the fluid at the entrance to the device 197 causes rotation of the elements 199 therein, which causes the passage of definite trapped portions of fluid through the device 197 from the inlet to the outlet. The operation of the device 198 is similar.

For a given weight-rate of input, the speed of a flexible shaft 200 leaving the primary element 197 varies directly with rate of fluid flow, directly with variations in specific volume of the fluid, and inversely with variations in density of the fluid. The same is true of the speed of a shaft 201 leaving the primary element 198 in regard to the fluid flowing therethrough.

By interrelating or comparing the speed of the shafts 200, 201, the relative density between the two locations may be determined, or, for example, the density of the fluid before the heating means 2 may be compared with its density at a location after the heating means. This comparison will allow the ascertainment of the change in specific volume or density, due to the treatment or heating by the means 2 as well as to ascertain an indication of the heat change in the fluid.

While the speed of the shaft 200 as well as the speed of the shaft 201 will individually vary with the rate of flow of fluid, still if comparison of the speed of the shafts 200, 201 is made where the same fluid passes successively through the meters 197, 198, then variations in the rate of flow will have no more effect upon the one shaft speed than upon the other shaft speed, and may therefore be disregarded entirely. Thus the speed of the shafts 200, 201 will vary with variations in specific volume or density at the individual meters 197, 198.

As previously stated for the example illustrated herein, the fluid entering the meter 197 is considered the charge or relatively untreated hydrocarbon to the furnace, and at a substantially uniform density. Such may be determined periodically if desired to ascertain whether it has, in fact, departed from the design conditions for which the meter 197 and shaft 200 are calibrated. Assuming then for the moment that the density of the fluid in the conduit 1 entering the meter 197 remains constant, then the density of the fluid passing through the meter 198 may be determined as follows:

$$d_{198} = d_{197}\frac{S_{200}}{S_{201}} \qquad (3A)$$

where
$d_{197}$=density of fluid passing through meter 197.
$d_{198}$=density of fluid passing through meter 198.
$S_{200}$=speed of shaft 200 of meter 197.
$S_{201}$=speed of shaft 201 of meter 198.

This is, of course, predicated upon the fact that the meters 197 and 198 are of the same size and design so that if the same volume rate of fluid at the same density conditions is passing through the two, then the speeds of the shafts 200, 201 are the same.

As a practical means of mechanically solving the formula to determine the density of the fluid passing through the meter 198, the showing of Figs. 21 and 22 will now be described in detail.

A disk 202 is adapted to be rotated by the displacement meter 197 through the shaft 200. Frictionally engaging the disk 202 is a sphere or ball 203 likewise frictionally engaging a rotatable spool 204 supported by a carriage 205. The spool 204 is provided with an arm 206 as shown in Fig. 22 carrying a pair of contacts 207 and 208 connected through suitable slip rings in a drum 209 to opposed fields 210 and 211, respectively, of a motor 212.

The drum 209 is rotated by the meter 199 through the agency of the shaft 201 and carries a contact 213 co-operating with the contacts 207, 208. The contact 213 is connected through a slip ring in the drum 209 directly to the power source 214 through a conductor 215. The arrangement is such that upon engagement of the contact 213 with the contact 207 the field 210 is energized, and conversely upon engagement of the contact 213 with the contact 208 the field 211 is energized. The motor 212 is adapted to drive an indicating-recording pen arm 216 relative to a chart 217 through gears 218 and in unison therewith the carriage 205 through a gear 219 meshing with a suitable rack 220 carried in the carriage 205.

In operation, assuming the system to be in equilibrium, the contacts 207, 208 will be rotated at synchronous speed with the contacts 213 so that the fields 210, 211 of the motor 212 are deenergized. Upon an increase in the rate of firing through the burner 2 with a corresponding increase in specific volume and conversely a decrease in density of the fluid passing through the meter 198, the speed of the shaft 201 will increase relative to the speed of the shaft 200. Thus the rotative speed of the drum 209 and of the contact 213 will increase relative to the rotative speed of the disk 202, the spool 204 and the contacts 207, 208. The arrangement is such that the contact 213 will engage the contact 207 causing energization of the field 210 and rotation of the motor 212 in proper direction to move the carriage 205 to the right on the drawing, whereby the radius of contact of the sphere 203 with the disk 202 relative to the center of the disk 202 will be increased, and thereby the speed of rotation of the spool 204 and contacts 207, 208 will be increased relative to what it was previously, and such action will continue until the rotative speed of the contacts 207, 208 and the contact 213 is in synchronism and the contact 213 is not close circuited with either the contact 207 or the contact 208, whereafter rotation of the motor 212 will cease. The position of the carriage 205 and correspondingly (through the gear 218) of the indicator 216 relative to the chart 217 is indicative of the density of the fluid passing through the meter 198. This may be seen from the following:

Angular travel of 206 = ∠ travel of 200 × radius
Angular travel of 213 = ∠ travel of 201
But in equilibrium—
Angular travel of 206 = angular travel of 213
Therefore—
∠ travel of 200 × radius = ∠ travel of 201

$$R = \frac{\angle \text{travel of } 201}{\angle \text{travel of } 200}$$

and

When ∠ travel of 200 = 0    R = ∞
When ∠ travel of 201 = 0    R = 0

Thus the radial distance from the center of the disk 202 to the point of contact of the sphere 203 with the disk 202 is a measure of the ratio of the speeds of the shafts 200, 201, and knowing the density of the fluid passing through the meter 197, said radius is a measure of the density of the fluid passing through the meter 198. The value of the density of the fluid passing through the meter 198 is indicated and recorded relative to the chart 217 by the positioning of the pointer 216 through the agency of the motor 212.

Thus two somewhat dissimilar types of flow metering devices, as utilized in the determination of density of a stream of flowable material, have been illustrated and described. However, since it has not been deemed necessary to show both types of metering devices in each of the hereinbefore described systems and methods, the latter have, for convenience, been described in connection with the orifice metering device. It will, however, be understood that the hereinbefore illustrations could be readily changed to include the displacement metering device.

While the displacement meter showing has been illustrated only so far as a discussion of indication of values is concerned (in connection with a figure which parallels somewhat the Fig. 5 showing), it will, of course, be understood that the movements occasioned by the indicating means or by other parts of such displacement meter assembly may be utilized automatically to move control mechanism as, for instance, in connection with the system shown in Fig. 6, or any of the other systems herein illustrated.

While a plurality of applications of the present invention have been hereinbefore discussed, it follows that, with the understanding which those skilled in the art will gather from the general discussion, many other applications of the invention in the control of material processing, or in connection with the utilization of the hereinbefore discussed manifestations as criteria of existent conditions (which conditions have not heretofore been observable "as news rather than history"), may be made without departing from the broad spirit of the invention. Accordingly, the appended claims are intended to be read in the light of the general disclosure and the application thereof to specific problems as they later arise and should not be narrowly construed.

Furthermore, inasmuch as the invention involves processing wherein a chemical change or physical change or both jointly may be taking place and inasmuch as the broad invention herein outlined may be adapted to effect control or regulation of the processing irrespective of whether the change is chemical, physical, or both, it has been deemed convenient to utilize herein the term "physical and/or chemical change." It cannot be too strongly emphasized that the invention hereinbefore outlined is not confined to any one of the three conditions just mentioned, but is employable in processes whether the same be chemical, physical, or conjointly chemical and physical.

The term "density" as employed herein is an absolute term used to represent the mass per unit volume. The term "specific gravity," on the other hand, is a relative expression used to denote the relative masses of equal volumes of the fluid in question and a reference fluid, usually water, each liquid being at a definite temperature. The term "specific volume" is the reciprocal of density and is, of course, an absolute, rather than a relative, expression. It will be seen that any one of the foregoing properties is related to any other such property, and may be employed as a measure of such other property. Thus for example, knowing the density, the specific volume or the specific gravity may be computed, etc. Accordingly, even though the terms are not synonymous, and even though the numerical values may in fact be quite different, any one of these properties may be employed as a measure of any other of such properties, and therefore are to be understood as equivalents for the purpose of the present invention. In order, however, to avoid frequent repetition of alternative equivalent phrases, the term "density" is used in the specification and appended claims in a generic sense, this expression being clearly understood to embrace specific gravity, specific volume, degrees A. P. I., etc., as well as any other equivalent measure, expression, or indication of that property which is herein broadly designated as the "density" of the material.

In certain of the appended claims the expression "determining the weight-rate of flow" is employed. This expression is likewise used herein in a broad, generic sense, and is to be understood to include not only the ascertainment of the actual weight of material per unit of time entering or leaving the system, but any equivalent information, such as the factors from which such rate may, if desired, be ascertained, for example: the charge density and the inlet differential head; or the charge density and the inlet volume rate of flow; or the charge density and pump displacement data; and the like, all of which provide information equivalent to the actual weight of fluid per unit of time flowing past a given point in the flow path, within the contemplation of the present invention.

I claim:
1. A method which comprises effecting a change or conversion in fluid flowing in a continuous flow path, interposing in said path, at a point subsequent to the initiation of said change or conversion, at least one flow-responsive element, determining the weight-rate of flow of said fluid through said element, and correlating the manifestations of said flow-responsive element with the weight-rate therethrough, to determine the in situ density of the fluid at the locality of said element.

2. In the processing of a stream of fluid to effect conversion thereof, the method of determining the in situ density of said fluid while undergoing such conversion, which method comprises flowing said fluid in a continuous stream into and through a conversion zone, determining the weight-rate of flow of fluid in said zone, treating the fluid flowing through said zone to effect conversion thereof, passing said stream of fluid, after the initiation of said conversion, continuously through at least one flow-responsive element, and correlating said weight-rate with the indication or manifestation of said flow-responsive element, to determine the density of the fluid at the point where said flow-responsive element is located.

3. In the processing of a stream of fluid to effect conversion thereof, the method of determining the in situ density of said fluid while undergoing such conversion, which method comprises flowing said fluid in a continuous stream into and through a processing zone, determining the weight-rate of flow of the fluid in said zone, treating the fluid flowing through said zone, restricting the flow of said fluid at at least one selected point in said zone, determining the differential pressure across said restriction in the fluid stream as the fluid flows continuously therethrough, and correlating said weight-rate with said pressure differential to determine the density of the fluid at the point where said pressure differential is measured.

4. In the treatment of a stream of fluid to effect a change thereof, the method of determining the in situ density of the fluid at a plurality of points in said stream, which comprises maintaining a continuous stream of fluid flowing into and through a processing zone, determining the weight-rate of flow in said zone, treating said stream while flowing through said zone, passing said stream of fluid progressively serially through a plurality of flow-responsive elements positioned along the path of flow of said stream, and correlating the indications or manifestations of said flow-responsive elements with said weight-rate of flow, to determine in situ density of the fluid at the locations of said elements.

5. In the processing of a stream of fluid to effect a chemical conversion thereof, the method of determining the in situ density of said fluid while undergoing such change, which method comprises flowing said fluid in a continuous stream into and through a treating zone, determining the weight-rate of flow of fluid in said zone, treating or processing the fluid flowing through said zone to effect chemical conversion thereof, restricting the flow of said fluid at at least one selected point in said zone subsequent to the initiation of said change, determining the differential pressure across said restriction as the fluid flows continuously therethrough, and correlating said weight-rate with said pressure differential, to determine the density of the fluid flowing through said restriction.

6. An apparatus for the treatment of fluids to effect conversion thereof, comprising in combination, a continuous flow path including a zone wherein any selected fluid may be treated, means responsive to the weight-rate of flow of the fluid in said zone, flow-responsive means located at at least one predetermined point in said path subsequent to the entrance of said zone, and means for correlating the indication of said weight-rate-responsive means with the manifestation of said flow-responsive means, for indicating the in situ density of the fluid flowing through said flow-responsive means.

7. An apparatus for determining the density of a fluid flowing through a conduit wherein said fluid is subject to a change which will affect the density, which comprises, in combination, a conduit through which the fluid to be treated flows, means for subjecting the flowing fluid to treatment affecting the density, means for determining the weight-rate of fluid flowing through said conduit, means for determining the volume-rate of flow in the conduit at a point therein after the initiation of the treatment, and means for determining the ratio between the weight-rate of flow and volume-rate of flow, whereby to provide a measure of the density of the flowing fluid at the locality of said volume-rate determining means.

8. An apparatus for determining the density of any selected fluid flowing through a continuous flow system wherein said fluid is subject to a density change, which comprises, in combination, means for determining a volume flow-rate-factor of the fluid prior to said density change, means for determining a volume flow-rate-factor of the fluid after the initiation of said density change, and means for interrelating each of said flow-rate-factor-determining means with the density of the fluid before said density change to determine the density of the fluid passing through said second-mentioned flow-rate-factor-determining means.

9. A method which includes flowing a fluid in a continuous stream through a treating zone, determining the weight-rate of flow of said fluid in said zone, treating said fluid in said zone, passing said fluid through flow-responsive elements positioned at points selected as the inlet and outlet of a section in said zone, and correlating said weight-rate with the manifestations of said flow-responsive elements, to determine the mean in situ density of the fluid within said zone.

10. A fluid treating system comprising, in combination, a continuous flow path including a zone wherein any selected fluid may be treated, means responsive to the weight-rate of flow of the fluid in said zone, flow-responsive means located in said path on the upstream side of said zone, at least one other flow-responsive means located in said path at a point subsequent to the entrance of said zone, and means correlating the manifestation of said flow-responsive means with said weight-rate responsive means, for indicating the mean in situ density of the fluid in said zone.

11. Apparatus adapted continuously to determine the mean density of a selected fluid flowing in a continuous flow path, comprising, in combination, a weight-rate flow meter at the inlet of the flow path, a device responsive to differential pressure across a restriction in the path at a point selected as the inlet of a section thereof, a second similar device at a point selected as the outlet of said section, means interrelating the meter and said inlet pressure differential device adapted to determine density at said inlet, means interrelating the meter and said outlet pressure differential device adapted to determine density at said outlet, and means averaging said density determinations.

12. A method which includes flowing a fluid through a processing zone in a continuous flow path, effecting a change or conversion in said fluid while flowing in said zone, determining the weight-rate of flow of said fluid in said path, determining the mean in situ density of the fluid in said zone by passing the same through at least one flow-responsive element located in said zone, and correlating said weight-rate with the volume of said zone and said mean density to determine the time of detention or treatment of said fluid in said zone.

13. A method which includes flowing a fluid through a continuous flow path comprising a treating zone, determining the weight-rate of flow of said fluid in said path, treating said fluid in said zone, passing said fluid from said zone through a flow-responsive element at a point selected as the mean density point in said zone, and correlating said weight-rate with the manifestations of said flow-responsive element and the volume of said zone to determine the time of detention or treatment of the fluid within said zone.

14. A fluid treating system comprising, in combination, a continuous flow path including a treating zone of constant volume wherein any selected fluid may be subject to treatment, means for indicating the mean in situ density of the fluid within said zone, means responsive to variations in the weight-rate of flow of the fluid in said flow path, and means correlating the manifestations of said mean-density indicating means and weight-rate-responsive means to indicate the time of detention of the fluid within said zone.

15. A fluid treating system comprising, in combination, a continuous flow path including a treating zone wherein any selected fluid may be subjected to treatment, flow-responsive means located in said zone at a point where the existing in situ density is substantially representative of the mean density of the fluid in said zone, means responsive to variations in the weight-rate of flow in said zone, and means correlating the manifestations of said flow-responsive means with said weight-rate-responsive means, to indicate the time of detention of the fluid within said zone.

16. A fluid treating system comprising, in combination, a continuous flow path including a preliminary treating zone and a secondary treating zone wherein any selected fluid may be subject to treatment, means for determining the weight-rate of flow of said fluid in said zones, a flow-responsive element located in said path at a point intermediate said preliminary and secondary zones, another flow-responsive element located in said path adjacent the exit of said secondary zone, and means correlating the manifestations of said weight-rate-determining means with the manifestations of said flow-responsive elements to indicate the time of detention of the fluid within said secondary zone.

17. A fluid treating system comprising, in combination, a continuous flow path including a zone wherein any selected fluid may be subject to treatment, means for determining the weight-rate of flow in said path, means for determining a volume-flow-rate-factor at a point selected as the inlet of said conversion zone, means for determining a volume-flow-rate-factor at a point selected as the outlet of said conversion zone, means interrelating said weight-rate means with said first-mentioned flow-rate-factor-means to determine the density of the fluid at the inlet of said zone, means interrelating said weight-rate means with said second-mentioned flow-rate-factor-means to determine the density of the fluid at the outlet of said zone, means averaging the densities at said inlet and outlet to indicate the mean density of the fluid in said zone, and means interrelating said mean density indicating means with said weight-rate means and the volume of said zone, to indicate the time of detention or treatment of said fluid in said zone.

18. A fluid treating system comprising, in combination, a continuous flow path including a treating zone wherein any selected fluid may be subjected to treatment, means for continuously determining the time of detention of the fluid in said zone, means responsive to variations in the temperature of the fluid at at least one selected point in said zone, and means correlating the manifestations of said time-determining means and said temperature-responsive means to indicate the degree of conversion or yield per pass of a selected fluid passing through said zone.

19. The apparatus of claim 18 wherein said correlating means is provided with means for adjusting the response thereof in accordance with the characteristics of the fluid entering said system, whereby to provide an indication of the degree of conversion or yield per pass for various types of charging stocks.

20. In combination with a fluid heater having a once through flow path and a plurality of heating sections connected in series wherein any selected fluid may be treated, means for exhibiting the relationship between the temperature at a point in the fluid path and the time length of passage of the fluid through a section of said path, comprising, in combination, means for determining the mean density of the fluid in the section, means for determining the weight-rate of flow of fluid in such section, means for determining the ratio between said rate of flow and said mean density, means sensitive to the temperature at a point in said path, and indicating means sensitive to the relationship between the last two named means.

21. A fluid treating system comprising, in combination, a continuous flow path including a zone wherein any selected fluid may be subject to conversion, means for determining the weight-rate of flow in said path, means for determining a volume-flow-rate-factor as the inlet of said conversion zone, means for determining a volume-flow-rate-factor at a point selected as the outlet of said conversion zone, means interrelating said weight-rate means with said first-mentioned flow-rate-factor-means to determine the density of the fluid at the inlet of said zone, means interrelating said weight-rate means with said second-mentioned flow-rate-factor-means to determine the density of the fluid at the outlet of said zone, means averaging the densities at said inlet and said outlet to determine the mean density of the fluid in said zone, means interrelating said mean density with the weight-rate of flow and the volume of said zone to determine the time of detention of the fluid in said zone, means for determining the temperature of the fluid at at least one selected point in said zone, means interrelating said time-determining means and said temperature-determining means to indicate a time-temperature relation for said fluid in said zone.

22. The apparatus of claim 21 wherein sai time-temperature relation indicating means is provided with means for adjusting the response thereof in accordance with the characteristics of the fluid entering the system, whereby to provide an indication of the degree of conversion or yield per pass for fluids of different characteristics.

23. A method of operating a fluid treating system wherein a fluid undergoes a process involving a change in the density of the fluid in a continuous flow path, which method includes determining the weight-rate of flow of fluid in said path, determining a volume-flow-rate-factor at a selected point in said path subsequent to the initiation of said process where said weight rate of flow is known, and regulating the operating conditions substantially to maintain a selected relationship between said weight-rate of flow and said volume-flow-rate-factor.

24. In the processing of a stream of fluid to effect conversion therein, the method of controlling the extent or degree of said conversion, which comprises flowing said fluid in a continuous stream into and through a conversion zone, determining the weight-rate of flow of fluid in said zone, treating the fluid flowing through said conversion zone to effect conversion thereof, restricting the flow of said stream at at least one predetermined point in said conversion zone subsequent to the initiation of said conversion, determining the differential pressure across said restriction as the fluid flows continuously and at a known weight rate therethrough, and regulating the operating conditions substantially to maintain a selected relationship between said rate of flow and said pressure differential.

25. In the treatment of a stream of fluid subject to variations in convertibility characteristics while flowing in a continuous flow system, the method of controlling the extent of said treatment which comprises, flowing said fluid into and through a conversion zone, determining the weight-rate of flow of said fluid in said zone, effecting conversion of the fluid flowing through said zone, determining the temperature of the fluid at a selected point in said zone, passing said fluid, subsequent to the initiation of said conversion, at a known weight rate through a flow-responsive element, and regulating the operating conditions substantially to maintain a predetermined optimum relationship between the convertibility characteristics, the weight-rate of flow, the temperature, and the manifestation of said flow-responsive element.

26. In the conversion of a selected fluid in a continuous flow system, the method of controlling the extent or degree of said conversion, which comprises flowing said fluid in a continuous stream into and through a conversion zone, passing said fluid, at a point in said stream where the density of the fluid is known, through a rate of charge meter, treating said fluid in said zone to effect conversion thereof, determining the temperature of the fluid at at least one selected point in said zone, passing said fluid, after the initiation of said conversion, without diminution in quantity through a flow-responsive element, and regulating the operating conditions substantially to maintain a selected relationship between said temperature, the manifestations of said rate of charge meter and of said flow-responsive element, and the density of the fluid passing through said charge meter.

27. The method of operating a fluid treating system wherein a selected fluid undergoes a heating process involving a change in the density of the fluid while flowing in a continuous flow path without diversion therefrom, which includes determining the volume-rate of flow of a fluid of known density prior to processing, determining the volume-rate of flow of the fluid after initiation of the process, and adjusting the heat input to maintain a substantially constant relationship between said density before processing and said volume-rate of flow before and after the initiation of said process.

28. The method of processing a fluid, which includes, continuously supplying liquid under pressure to the entrance of the path in excess over vapor leaving the path, treating the fluid to effect a change therein, determining the in situ density of the fluid mixture at a selected point in said path, and regulating the processing from the in situ density of the fluid mixture in the path.

29. A method of regulating the processing of a selected fluid flowing through a continuous flow path wherein it is subject to treatment in a treating zone, which method comprises determining the temperature of the fluid at at least one point in said zone, continuously determining the in situ density of the fluid at at least one point in said zone, and regulating the operating conditions substantially to maintain said temperature and said density at predetermined optimum values.

30. The method of treating any selected fluid, which comprises establishing a continuous fluid pressure flow in a once-through path, determining the value of a density condition at progressive locations along said path subsequent to the initiation of the treatment, and regulating the treatment of the flowing fluid in a selected portion of the path by adjustment dependent upon said value of a density condition of the fluid at said progressive locations.

31. The method of regulating the treatment of a fluid undergoing processing in a continuous flow path, which method comprises determining, from the relation between the manifestation of a flow-responsive element located in said path and the weight-rate of flow therethrough, the in situ density of the fluid undergoing processing, and regulating the operating conditions in accordance with such density.

32. In the processing of a stream of fluid to effect a change thereof, the method of controlling the extent or degree of said change, which comprises flowing said fluid in a continuous stream into and through a conversion zone, determining the weight-rate of flow in said zone, treating the fluid flowing through said conversion zone to effect a conversion thereof, passing said stream of fluid, after the initiation of the conversion therein, continuously through at least one flow-responsive element, correlating said weight-rate with the indication or manifestation of said flow-responsive element to determine the in situ density of the fluid flowing therethrough, and regulating the treatment or processing of said stream of fluid in said zone substantially to maintain the density at a predetermined optimum value.

33. In the processing of a stream of fluid to effect a change thereof, the method of controlling the extent or degree of said change, which comprises flowing said fluid in a continuous stream into and through a processing zone, determining the weight-rate of flow of fluid in said zone, processing the fluid flowing through said zone to effect a change therein, restricting the flow of said stream at at least one predetermined point in said zone subsequent to the initiation of said change, measuring the differential pressure across said restriction as the fluid flows continuously therethrough, correlating said weight-rate with said pressure differential to determine the in situ density of the fluid flowing through said restriction, and regulating the processing substantially to maintain the density at a predetermined optimum value.

34. In the conversion of a selected fluid in a continuous flow system, the method of controlling the extent or degree of said conversion, which comprises flowing said fluid in a continuous stream into and through a conversion zone, passing said fluid, at a point in said stream where the density of the fluid is known, continuously through a rate of flow meter, treating the fluid flowing through said zone to effect conversion therein, determining the temperature of the fluid at at least one selected point in said zone, passing said stream of fluid, after the initiation of said conversion, continuously through at least one flow-responsive element, correlating the indications of said rate of flow meter and of said flow-responsive element with the known density of the fluid flowing through said charge meter to determine the density of the fluid passing through said flow-responsive element, and regulating said treatment substantially to maintain said temperature and said density at said flow-responsive element at predetermined optimum values.

35. In the art of heating a flowing stream of fluid, the method of controlling the operation in a flow path having a section wherein substantially all the heat absorbed is evidenced by a temperature rise and a section wherein a latent heat phenomenon takes place, which comprises arriving at the existing density of the fluid at the outlet of said first-named section and also at the outlet of said second-named section by causing all of said fluid to flow at a known weight-rate through flow-responsive elements positioned at said points and then utilizing the said density determinations to maintain optimum conditions in the flow path.

36. The method of insuring optimum conditions in a continuous flow path wherein a plurality of reactants are intermingled and caused to inter-react, which method comprises determining the total weight-rate of charge of reactants entering the flow path, passing the reactants after intermingling through a flow-responsive element, correlating the manifestations of said flow-responsive element with the total weight-rate of flow therethrough to determine the in situ density of the intermingled reactants, and regulating therefrom the operating conditions under which the reactants are fed and intermingled.

37. The method of obtaining optimum operation when two or more reactants are brought together within the influence of a heat-exchange medium, which comprises determining the total weight-rate of charge of the reactants entering a system, determining the in situ density and the temperature of the materials subsequent to intermingling and reaction, and automatically controlling the effectiveness of the heat-exchange as dictated by said determinations.

38. In a reaction system, a reactor, means for feeding a plurality of reactants to said reactor, means for withdrawing a main product and a by-product from said reactor, means for measuring the weight-rate of materials fed into said reactor, means for selectively determining the in situ density of the main product or of the by-product as desired, and means for interrelating the aforesaid determinations to maintain an optimum production of said main product and for maintaining the rate at which said by-product is separated from the main product.

39. In the operation of combining a plurality of reactants to produce a flowable main product and a withdrawable by-product, the method of insuring the optimum production of said products which comprises determining the weight-rate flow of the input material and the weight-rate flow of the products, transmitting the value of a variable bearing a functional relation to the density and weight-rate of the main product to a receiving and controlling center, and regulating the flow of said reactants to maintain an optimum density of main product and an optimum percentage relation between the main product and said by-product.

40. In the art of heating a flowing stream of a selected fluid, the method of controlling the operation in a flow path having a section wherein a latent heat phenomenon takes place, which comprises arriving at the existing density of the fluid at points selected as the inlet and outlet of said section by causing all of said fluid to flow at a known weight-rate continuously through flow-responsive elements positioned along the path of flow, determining the temperature at a selected point in said zone, utilizing the said determined densities at the inlet and outlet of said section as a basis for arriving at the mean density therein, and maintaining said mean density and said temperature at predetermined optimum values.

41. In the treatment of a stream of fluid to effect a change thereof, the method of controlling the extent or degree of said change, which comprises flowing said fluid in a continuous stream into and through a processing zone, determining the weight-rate of flow of fluid in said zone, treating the fluid flowing through said zone to effect a change therein, restricting the flow of said stream at points selected as the inlet and outlet of said zone, measuring the pressure differentials across said restrictions in the stream as the fluid flows continuously and progressively serially therethrough, correlating the measured rate of flow with the measured pressure differentials to determine the mean in situ density of the fluid in said zone, and regulating the treatment of said fluid substantially to maintain said mean density at a predetermined optimum value.

42. The method of regulating the conversion of any selected fluid within a continuous flow path wherein the fluid is subjected to treatment in a treating zone, which comprises effecting conversion of the fluid in said zone, determining the temperature of the fluid at a selected point within said zone, determining from the in situ density of the fluid in said zone the time of detention of the fluid within said zone, and regulating the treatment substantially to maintain a predetermined optimum relationship between said temperature and said time.

43. The method of regulating the treatment of a fluid within a continuous flow path wherein said fluid is subjected to heat interchange in a treating zone, which comprises determining the weight-rate of flow of said fluid, determining the mean in situ density of the fluid in said treating zone, determining the temperature of the fluid at a selected point in said zone, correlating said weight-rate and said mean density with the volume of said zone to determine the time of detention of said fluid within said zone, and regulating the heat interchange effected in said zone substantially to maintain a predetermined optimum relationship between said time and said temperature.

44. The method of regulating the conversion of any selected fluid within a continuous flow path wherein said fluid is subjected to treatment in a treating zone, which comprises determining, from the manifestation of at least one flow-responsive element located in said path at a point subsequent to the initiation of said conversion and the weight-rate of flow through said element, the mean in situ density and the time of detention of said fluid within said zone, determining the temperature of said fluid at at least one selected point in said path, and regulating the treatment substantially to maintain a predetermined optimum relationship between the time of detention, and said temperature.

45. The method of regulating the conversion of a selected fluid within a continuous flow path wherein said fluid is subjected to treatment in a treating zone, which comprises continuously determining—from the temperature at a selected point in said zone, the manifestations of a flow-responsive element in said path and the weight-rate of flow through said element—the yield per pass, and regulating the treatment in accordance with such yield per pass.

46. A method of regulating the conversion of a selected fluid within a continuous flow path wherein said fluid is subject to treatment in a treating zone, which comprises continuously determining,—from the temperature at a selected point in said zone, the weight-rate of flow through said zone and the mean in situ density of the fluid in said zone,—the yield per pass, and regulating the treatment in accordance with such yield per pass.

47. The method of treating a flowing fluid undergoing a condition change, which includes determining the weight rate of flow of the fluid compensated for variations in density of the fluid prior to treatment, continuously determining a flow rate factor of the fluid subsequent to treatment, correlating the determinations to evaluate density of the fluid subsequent to the treating, and controlling the treating from such evaluated density.

ROBERT L. RUDE.

Certificate of Correction

Patent No. 2,217,634.                          October 8, 1940.

ROBERT L. RUDE

It is hereby certified that errors appear in the printed specification of the above numbered patent requiring correction as follows: Page 1, second column, line 22, for "ssytems" read *systems*; page 2, first column, line 27, for "ocur" read *occur*; page 3, first column, line 40, for "utiliaztion" read *utilization*; lines 72-73, for "utimate" read *ultimate*; and second column, line 12, for "subtsantially" read *substantially*; page 5, second column, line 66, in the table, for "sention" read *section*; page 6, first column, line 35, for "of" read *at*; line 72, for "inevntion" read *invention*; page 8, first column, line 49, for "undregoing" read *undergoing*; page 10, second column, line 16, for "denisty" read *density*; page 15, first column, lines 12-14, in the equation, for $$\text{``}\frac{h_5^2}{h_{124}^2}\text{''} \quad \text{read} \quad \frac{h_5}{h_{124}};$$

page 16, first column, line 14, for "forms" read *form*; page 18, second column, lines 29 and 37, for "cu. ft." read *sq. in.*; page 21, first column, line 25, for "parafinicity" read *paraffinicity*; page 22, first column, line 34, for "is" first occurrence, read *as*; page 29, second column, line 53, claim 21, before "as" insert *at a point selected*; and that the said Letters Patent should be read with these corrections therein that the same may conform to the record of the case in the Patent Office.

Signed and sealed this 7th day of January, A. D. 1941.

[SEAL]

HENRY VAN ARSDALE,

*Acting Commissioner of Patents.* substantially to maintain a predetermined optimum relationship between said time and said temperature.

44. The method of regulating the conversion of any selected fluid within a continuous flow path wherein said fluid is subjected to treatment in a treating zone, which comprises determining, from the manifestation of at least one flow-responsive element located in said path at a point subsequent to the initiation of said conversion and the weight-rate of flow through said element, the mean in situ density and the time of detention of said fluid within said zone, determining the temperature of said fluid at at least one selected point in said path, and regulating the treatment substantially to maintain a predetermined optimum relationship between the time of detention, and said temperature.

45. The method of regulating the conversion of a selected fluid within a continuous flow path wherein said fluid is subjected to treatment in a treating zone, which comprises continuously determining—from the temperature at a selected point in said zone, the manifestations of a flow-responsive element in said path and the weight-rate of flow through said element—the yield per pass, and regulating the treatment in accordance with such yield per pass.

46. A method of regulating the conversion of a selected fluid within a continuous flow path wherein said fluid is subject to treatment in a treating zone, which comprises continuously determining,—from the temperature at a selected point in said zone, the weight-rate of flow through said zone and the mean in situ density of the fluid in said zone,—the yield per pass, and regulating the treatment in accordance with such yield per pass.

47. The method of treating a flowing fluid undergoing a condition change, which includes determining the weight rate of flow of the fluid compensated for variations in density of the fluid prior to treatment, continuously determining a flow rate factor of the fluid subsequent to treatment, correlating the determinations to evaluate density of the fluid subsequent to the treating, and controlling the treating from such evaluated density.

ROBERT L. RUDE.

---

Certificate of Correction

Patent No. 2,217,634.  October 8, 1940.

ROBERT L. RUDE

It is hereby certified that errors appear in the printed specification of the above numbered patent requiring correction as follows: Page 1, second column, line 22, for "ssytems" read *systems;* page 2, first column, line 27, for "ocur" read *occur;* page 3, first column, line 40, for "utiliaztion" read *utilization;* lines 72–73, for "utimate" read *ultimate;* and second column, line 12, for "subtsantially" read *substantially;* page 5, second column, line 66, in the table, for "sention" read *section;* page 6, first column, line 35, for "of" read *at;* line 72, for "inevntion" read *invention;* page 8, first column, line 49, for "undregoing" read *undergoing;* page 10, second column, line 16, for "denisty" read *density;* page 15, first column, lines 12–14, in the equation, for $$\frac{h_s^2}{h_{124}^2} \quad \text{read} \quad \frac{h_s}{h_{124}};$$

page 16, first column, line 14, for "forms" read *form;* page 18, second column, lines 29 and 37, for "cu. ft." read *sq. in.;* page 21, first column, line 25, for "parafinicity" read *paraffinicity;* page 22, first column, line 34, for "is" first occurrence, read *as;* page 29, second column, line 53, claim 21, before "as" insert *at a point selected;* and that the said Letters Patent should be read with these corrections therein that the same may conform to the record of the case in the Patent Office.

Signed and sealed this 7th day of January, A. D. 1941.

[SEAL]

HENRY VAN ARSDALE,

*Acting Commissioner of Patents.*